Dec. 3, 1963  W. D. HAILES  3,112,908
CENTRALIZED ZONE CONTROL SYSTEM
Filed April 24, 1958  32 Sheets-Sheet 3

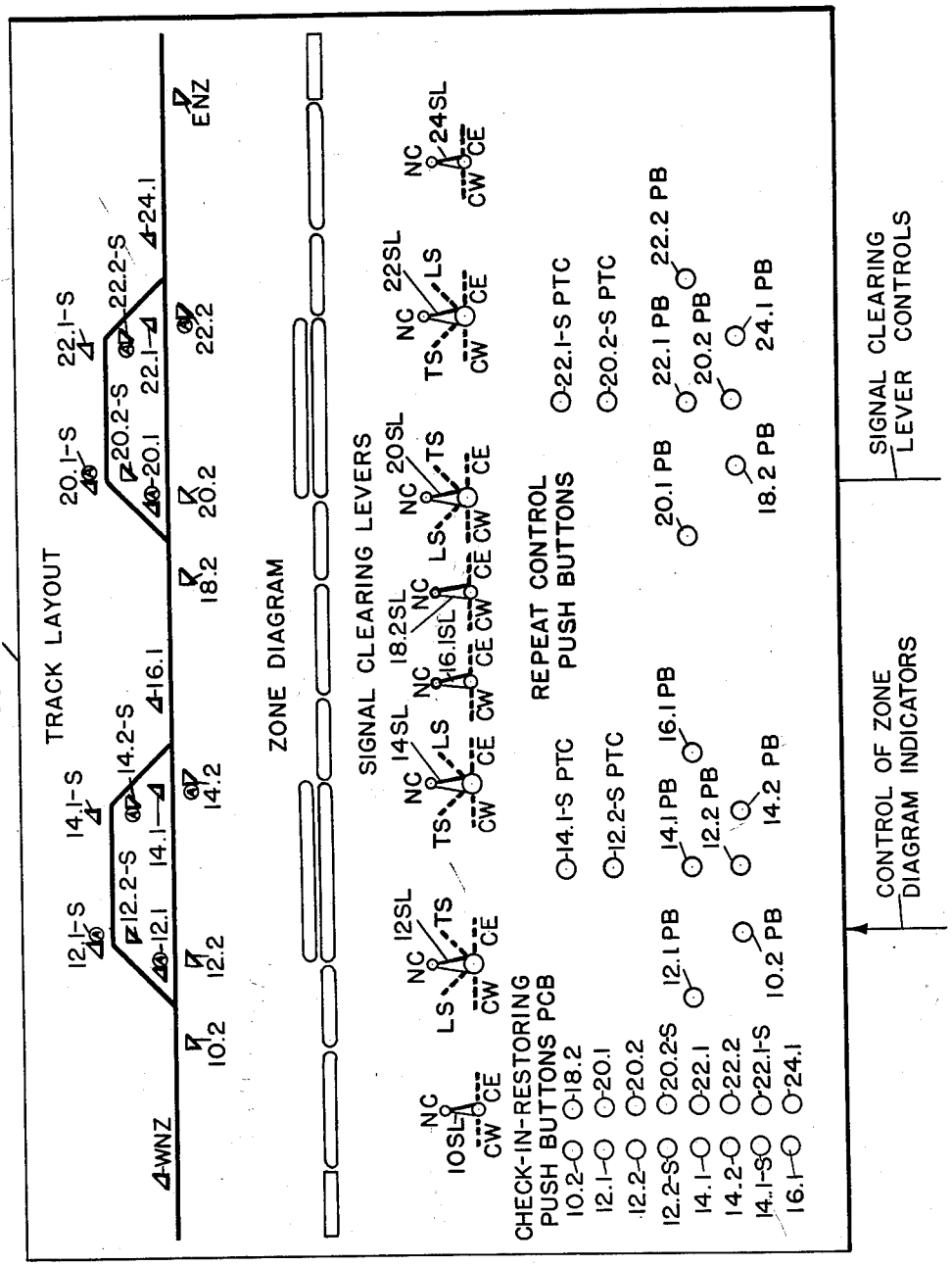
FIG. IA.

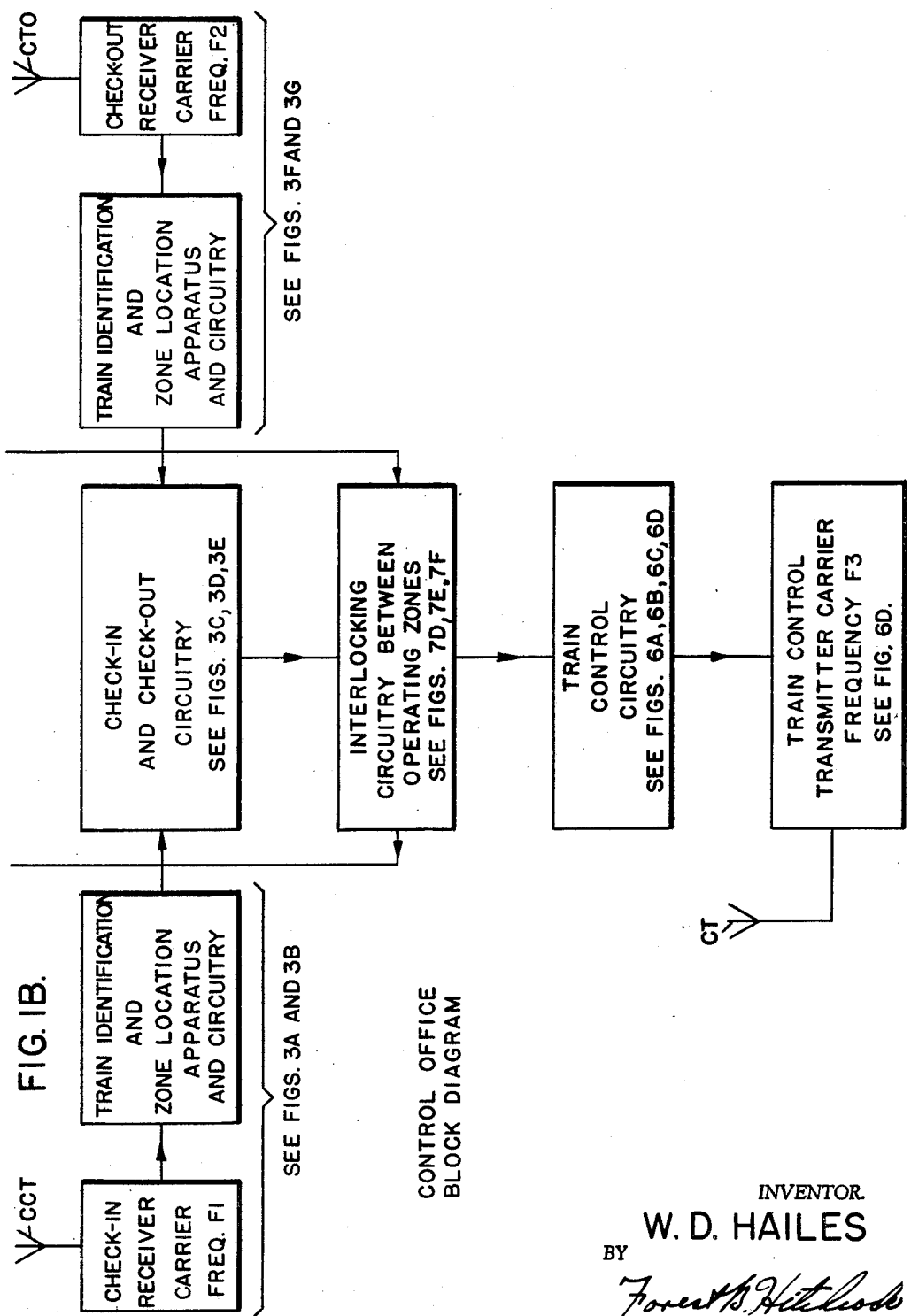

INVENTOR.
W. D. HAILES
BY
HIS ATTORNEY

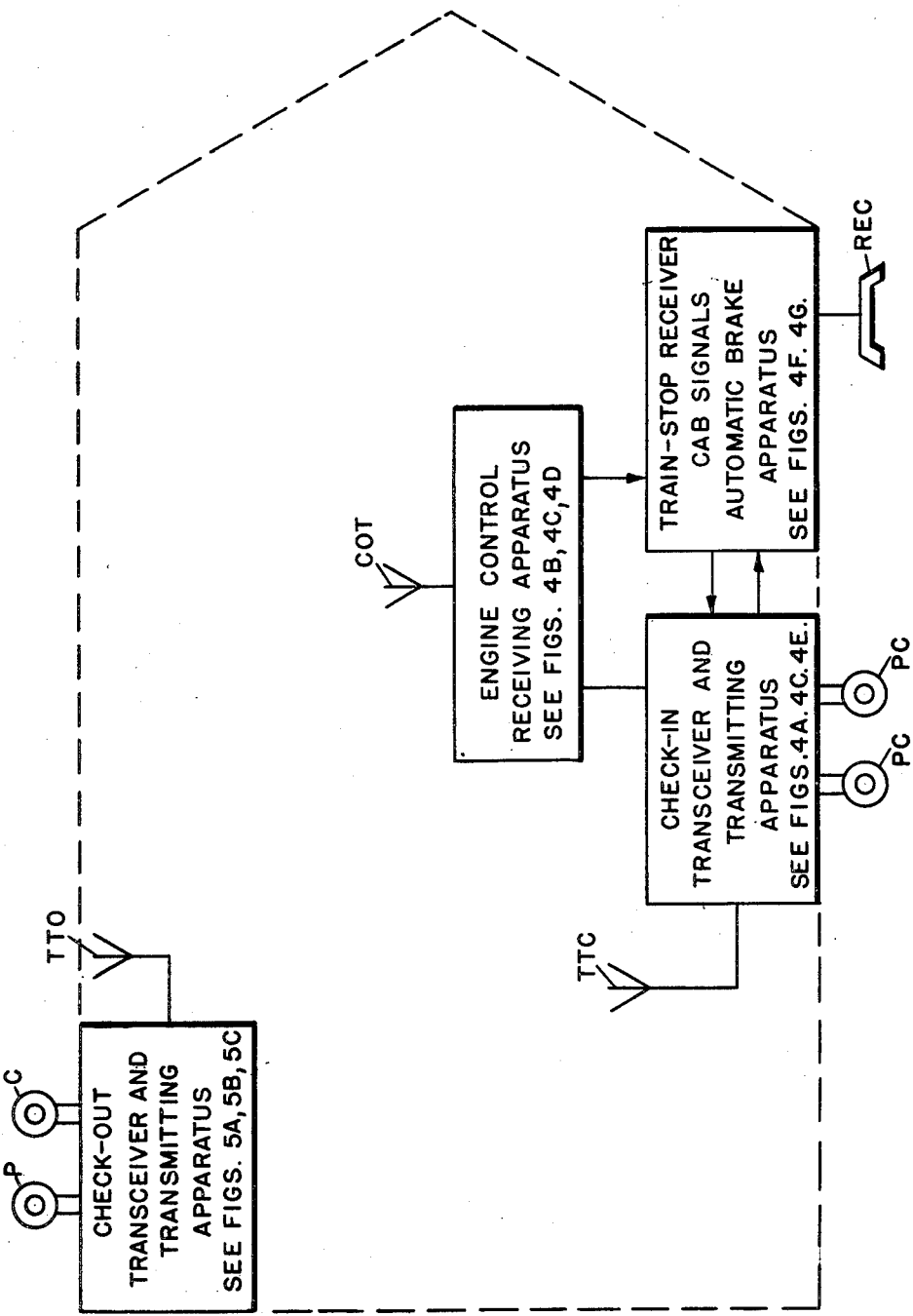

Dec. 3, 1963    W. D. HAILES    3,112,908
CENTRALIZED ZONE CONTROL SYSTEM
Filed April 24, 1958    32 Sheets-Sheet 5

INVENTOR.
W. D. HAILES
BY
Forest B. Hitchcock
HIS ATTORNEY

INVENTOR.
W. D. HAILES

Dec. 3, 1963 W. D. HAILES 3,112,908
CENTRALIZED ZONE CONTROL SYSTEM
Filed April 24, 1958 32 Sheets-Sheet 8

INVENTOR.
W. D. HAILES
BY
HIS ATTORNEY

Dec. 3, 1963  W. D. HAILES  3,112,908
CENTRALIZED ZONE CONTROL SYSTEM
Filed April 24, 1958  32 Sheets—Sheet 10

INVENTOR.
W. D. HAILES
BY
HIS ATTORNEY

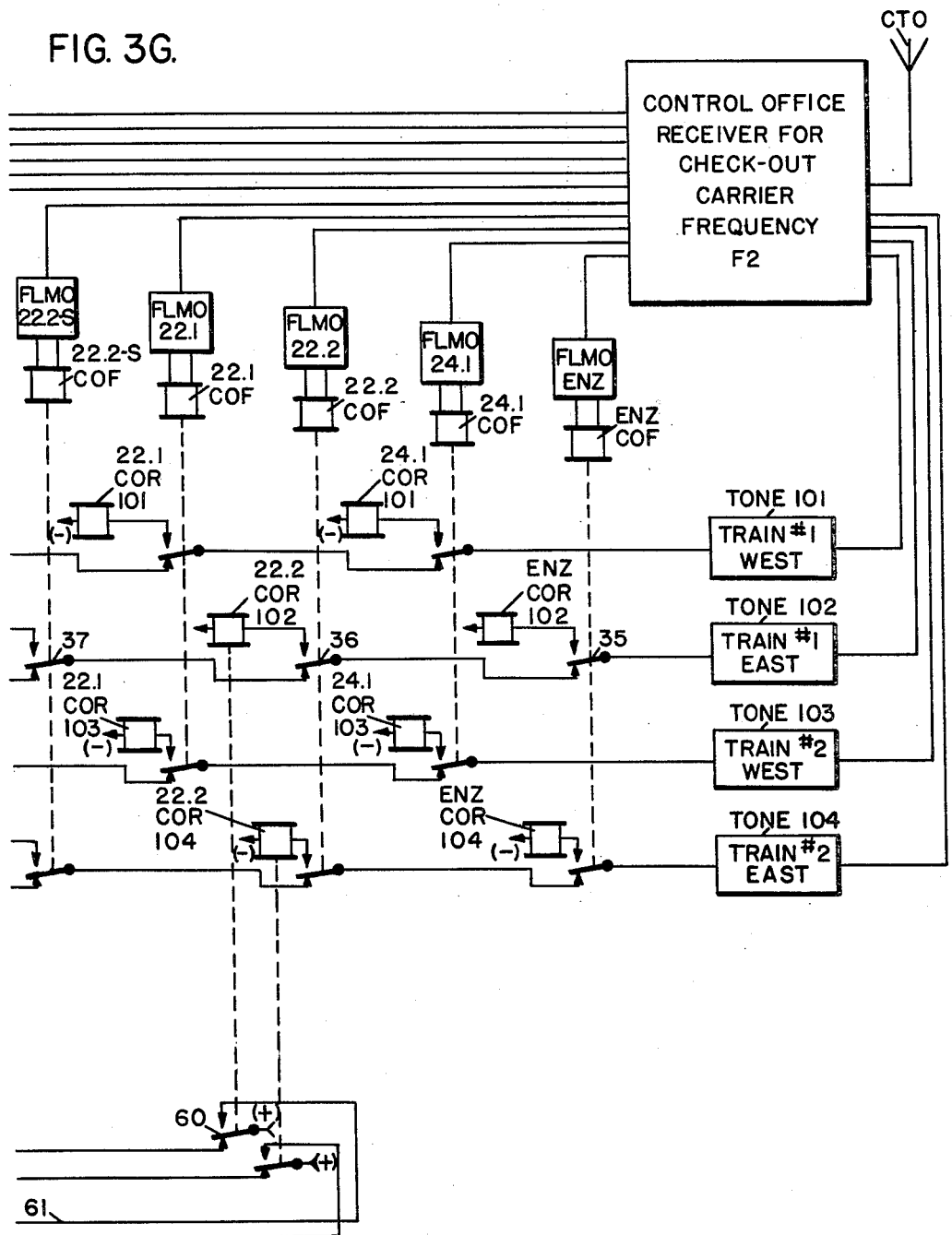

Dec. 3, 1963    W. D. HAILES    3,112,908
CENTRALIZED ZONE CONTROL SYSTEM
Filed April 24, 1958    32 Sheets-Sheet 12

INVENTOR.
W. D. HAILES
BY
HIS ATTORNEY

Dec. 3, 1963

W. D. HAILES 3,112,908

CENTRALIZED ZONE CONTROL SYSTEM

Filed April 24, 1958

INVENTOR.
W. D. HAILES
BY
Forest A. Hitchcock
HIS ATTORNEY

Dec. 3, 1963

W. D. HAILES 3,112,908

CENTRALIZED ZONE CONTROL SYSTEM

Filed April 24, 1958

INVENTOR.
W. D. HAILES
BY
*Forest B. Hitchcock*
HIS ATTORNEY

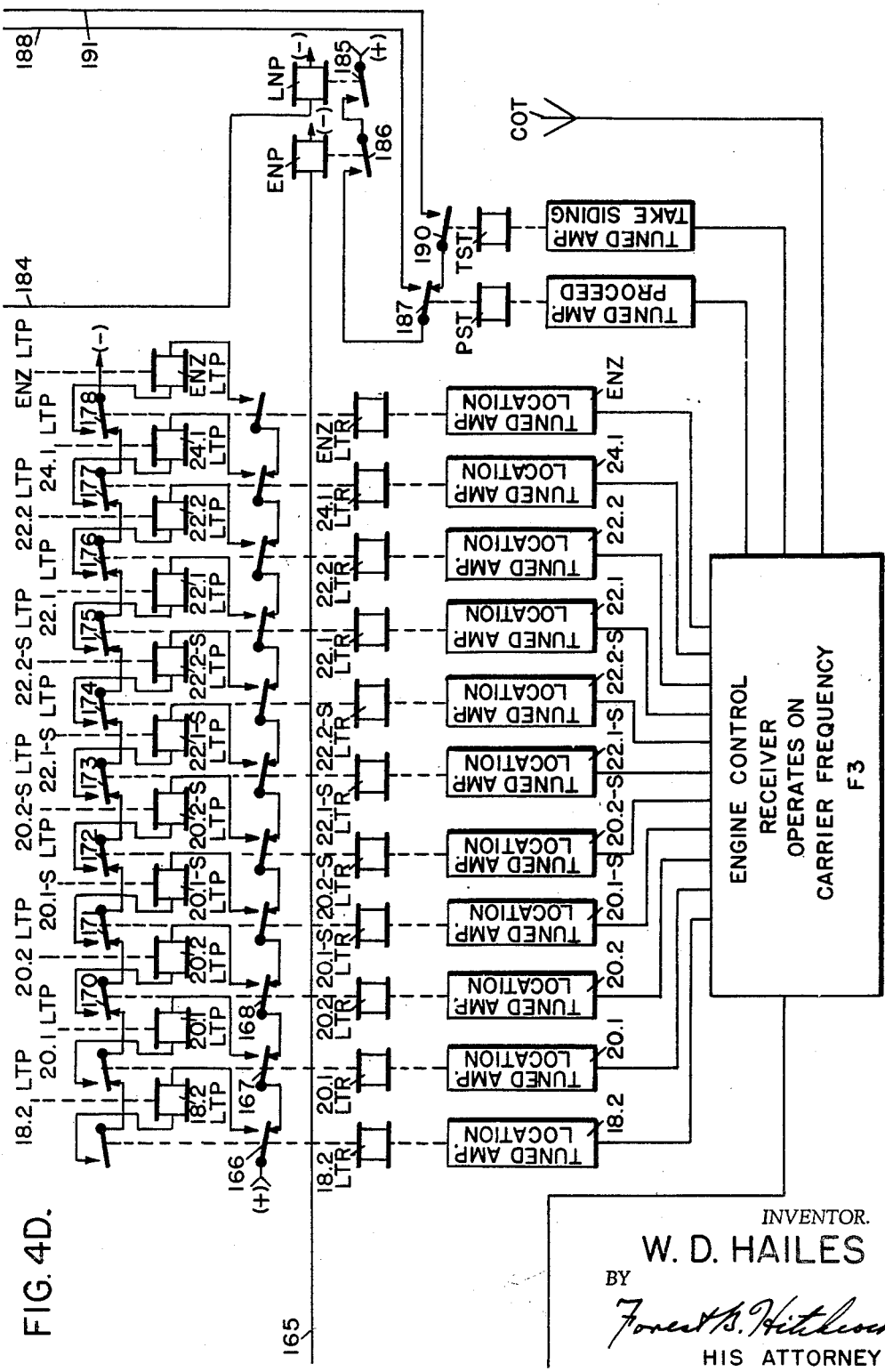

Dec. 3, 1963 W. D. HAILES 3,112,908
CENTRALIZED ZONE CONTROL SYSTEM
Filed April 24, 1958 32 Sheets-Sheet 17

INVENTOR.
W. D. HAILES
BY
HIS ATTORNEY

Dec. 3, 1963   W. D. HAILES   3,112,908
CENTRALIZED ZONE CONTROL SYSTEM
Filed April 24, 1958   32 Sheets-Sheet 18

INVENTOR.
W. D. HAILES
BY
Forest B. Hitchcock
HIS ATTORNEY

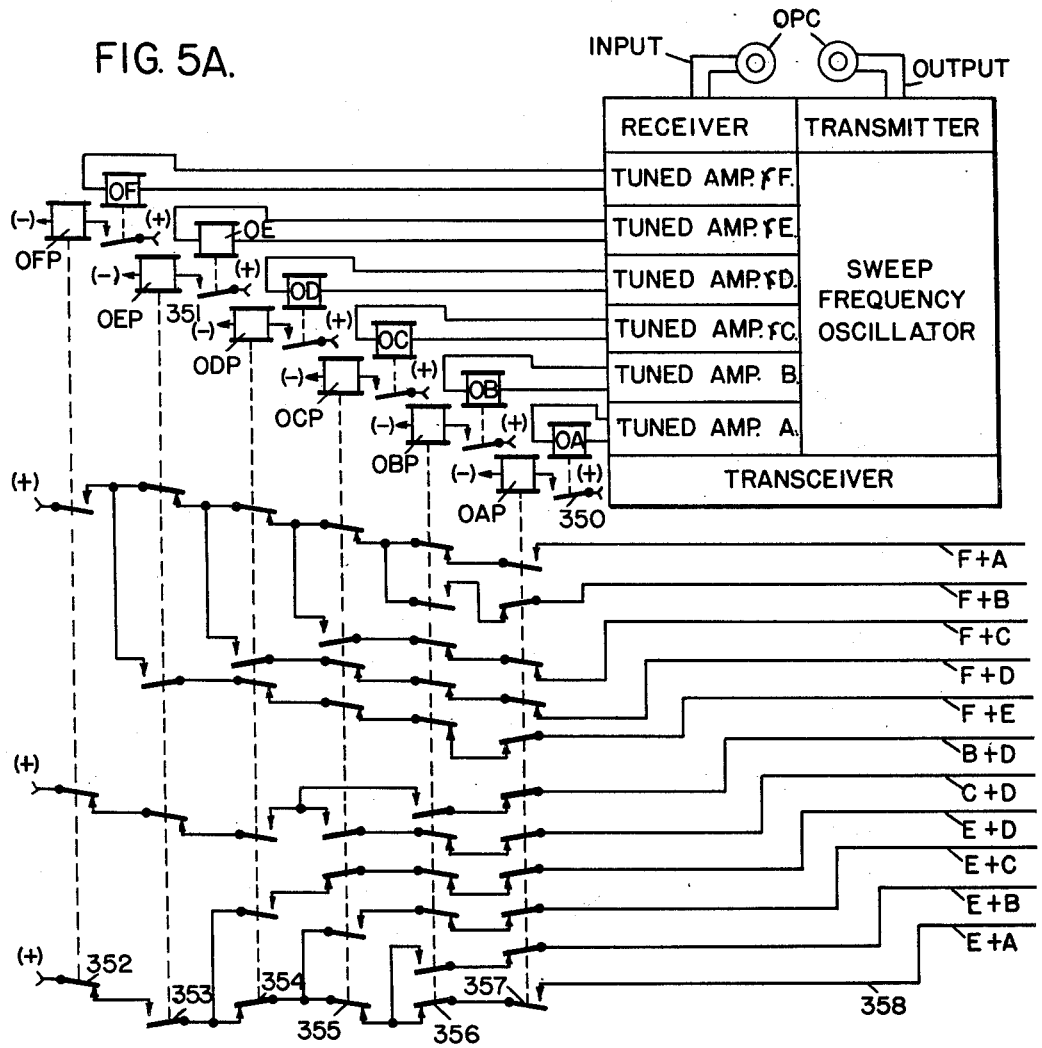

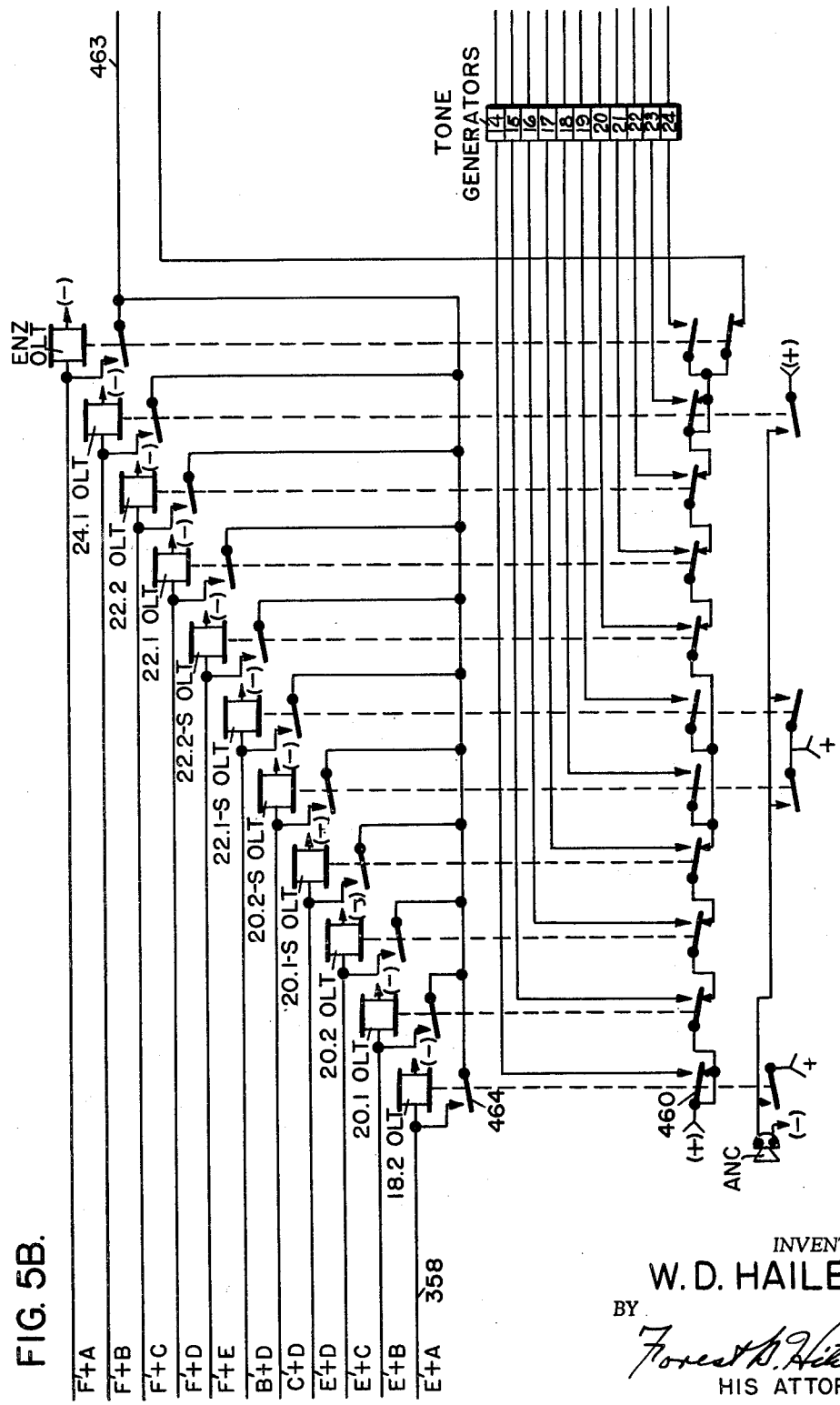

Dec. 3, 1963 W. D. HAILES 3,112,908
CENTRALIZED ZONE CONTROL SYSTEM
Filed April 24, 1958 32 Sheets-Sheet 21

INVENTOR.
W. D. HAILES
BY
HIS ATTORNEY

FIG. 6B.

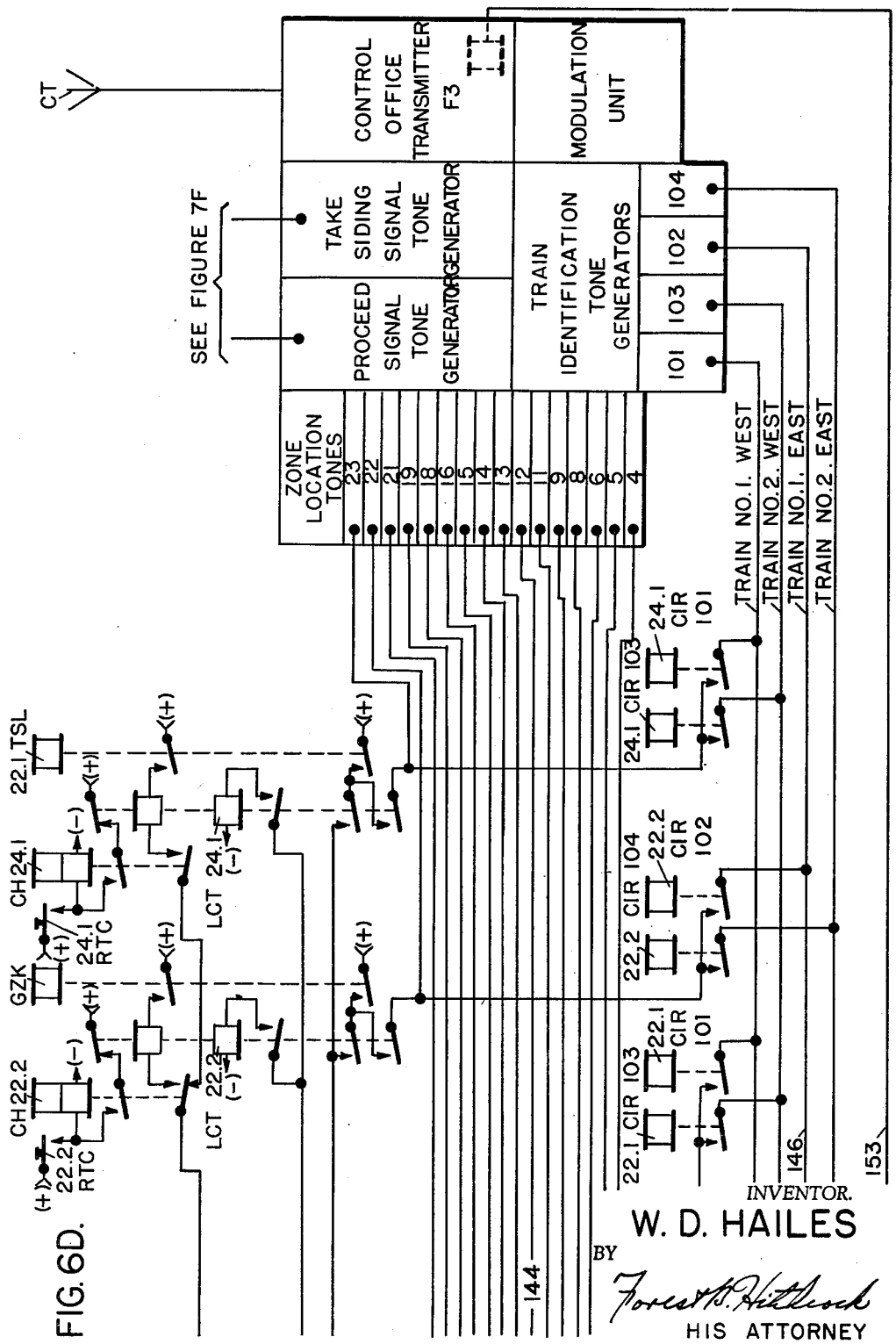

Dec. 3, 1963 W. D. HAILES 3,112,908
CENTRALIZED ZONE CONTROL SYSTEM
Filed April 24, 1958 32 Sheets-Sheet 26

FIG. 7A.

INVENTOR.
W. D. HAILES
BY
*Forest B. Hitchcock*
HIS ATTORNEY

Dec. 3, 1963 W. D. HAILES 3,112,908
CENTRALIZED ZONE CONTROL SYSTEM
Filed April 24, 1958 32 Sheets-Sheet 30

FIG. 7E.

INVENTOR.
W. D. HAILES
BY
Forest B. Hitchcock
HIS ATTORNEY

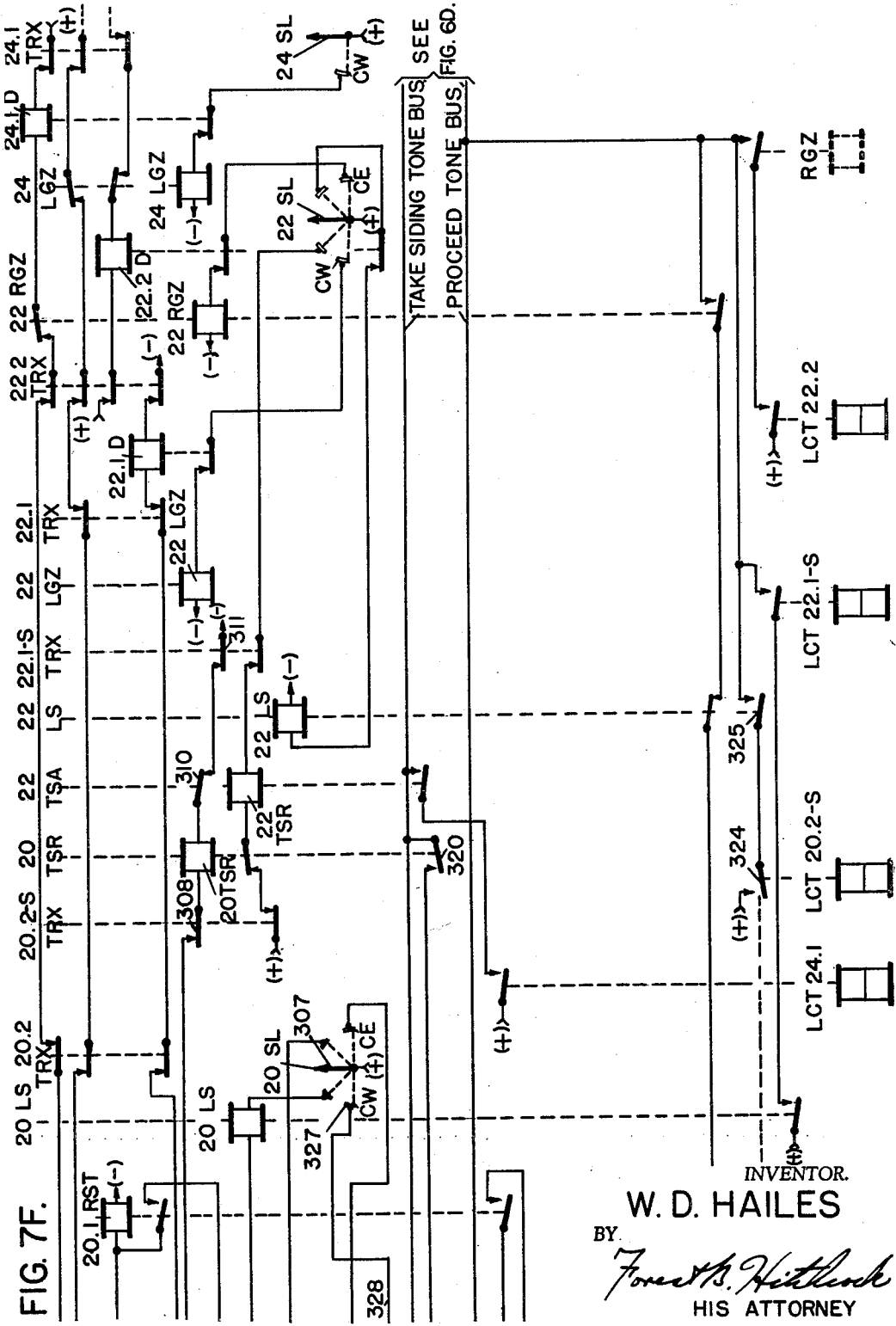

FIG. 8. TYPICAL FREQUENCY COMBINATION FOR ZONE LOCATION MARKERS

| MARKER | TONE NO. | FREQUENCY COMBINATION | EAST | WEST |
|---|---|---|---|---|
| WNZ | 1 | C & H | | LEAVE ZONE |
| 10.2 | 4 | F & G | MAIN | |
| 12.1 | 5 | E & G | | MAIN |
| 12.2 | 6 | D & G | MAIN | |
| 12.1-S | 7 | C & G | | SIDING |
| 12.2-S | 8 | B & G | SIDING | |
| 14.1-S | 9 | A & H | | SIDING |
| 14.2-S | 10 | A & D | SIDING | |
| 14.1 | 11 | B & C | | MAIN |
| 14.2 | 12 | A & C | MAIN | |
| 16.1 | 13 | A & B | | MAIN |
| 18.2 | 14 | A & E | MAIN | |
| 20.1 | 15 | B & E | | MAIN |
| 20.2 | 16 | C & E | MAIN | |
| 20.1-S | 17 | D & E | | SIDING |
| 20.2-S | 18 | C & D | SIDING | |
| 22.1-S | 19 | B & D | | SIDING |
| 22.2-S | 20 | E & F | SIDING | |
| 22.1 | 21 | D & F | | MAIN |
| 22.2 | 22 | C & F | MAIN | |
| 24.1 | 23 | B & F | | MAIN |
| ENZ | 24 | A & F | LEAVE ZONE | |
| ALL MARKERS | 25 | A & D | ANN CONT. | ANN CONT. |

INVENTOR.
W. D. HAILES
BY
HIS ATTORNEY

United States Patent Office 3,112,908
Patented Dec. 3, 1963

3,112,908
CENTRALIZED ZONE CONTROL SYSTEM
William D. Hailes, Rochester, N.Y., assignor to General
Signal Corporation, a corporation of New York
Filed Apr. 24, 1958, Ser. No. 730,596
23 Claims. (Cl. 246—23)

This invention relates to a centralized traffic control system for governing the movement of railway traffic along a stretch of railway track. This invention further relates to an improved system for controlling the movement of railway traffic from a remote control office which system does not utilize wayside signals, track circuits or outlying field stations to provide for the safe operation of railway traffic.

Present centralized traffic control systems employ conventional track circuits to indicate the occupancy of a stretch of track together with various wayside circuits for preventing the unsafe operation of wayside signals so as not to give an unsafe signal indication to an approaching train. The indications as to train movements and location are transmitted from a field station to a central control office for informing the operator of the traffic conditions on the stretch of the railway track which is under his supervision and control. Based upon the information which he has in the control office the operator can control a particular wayside signal for regulating the railway traffic in accordance with the interlocked signaling circuits in the field.

The present invention proposes a zone control system in which a continuous stretch of track, under the immediate supervision of the operator in a central control tower, is geographically divided into zones. The terminals of each zone are established by the location of wayside markers which are clearly visible to the train crew. A control panel is provided in the control office which shows a stretch of track in miniature, and indications thereon for informing the control tower operator of the railway traffic conditions in the various zones of the stretch of railway track under his supervision, including zone occupancy, and the zone in which the train will come to a stop. There is also provided on the control panel in the control office a plurality of manually operable levers and buttons which serve to govern control office equipment and apparatus for sending out selected control signals to a particular train located in a specific zone. Each train is provided with zone control equipment. The train carried zone control equipment comprises check-in apparatus on the locomotive which detects and transmits to the control office information that it has entered a specific zone, and the rear of each train is provided with check-out apparatus which detects and transmits information to the control office that the train has completely vacated a specific zone. The train carried zone control equipment also includes a means for receiving and storing the reception of a transmitted control office signal, automatic train stop apparatus for automatically applying the brakes of a train under certain conditions, and cab signaling apparatus for informing the engineer of the speed and condition under which he is to operate the train.

Each marker along the wayside shows the location of inert wayside elements, which selectively activate the train carried check-in and check-out apparatus; and another inert wayside element which governs the operation of the train stop apparatus.

The centralized traffic zone control system herein described employs the principle that no train can pass beyond the end of a specified zone in which it is standing or running without receiving an automatic brake application unless authority to proceed is properly received from the control office and stored in the train stop equipment before the train reaches the end of the zone in which it is operating. In addition to having the authority to proceed, the engineman must also operate an acknowledging contactor when he passes each wayside marker to avoid an automatic brake application.

It is also recognized that certain safeguards must be provided to satisfy the fail-safe principle if an acceptable system of control is to be obtained. The proposed control system incorporates a high degree of the fail-safe principle.

In accordance with the above, one object of the present invention is to provide a centralized zone control system for railway traffic which does not employ track circuits or a wayside signaling system.

A further object of this invention is to provide an improved railway traffic governing system which uses a minimum of wayside equipment and avoids the need for electrical energy at locations where the wayside elements of the control system are utilized.

A further object of this invention is to provide an improved railway traffic governing system provided with a plurality of zone barriers beyond which no train can proceed without receiving an automatic brake application unless authority to proceed has been received in the train carried apparatus.

A further object of this invention is to provide a centralized zone control system for railway traffic having means for establishing an operating zone for each train within which the train will be stopped unless additional authority to proceed is transmitted to the train. The operating zone for each train is made up of a plurality of individual zones, for example, an occupied zone, an authorized proceed zone and a stopping zone.

Another object of this invention is to provide an improved centralized zone control system having means for advancing and extending the operating zone for a specific railway train.

A further object of this invention is to provide a centralized zone control system having control office interlocking means for preventing the operator from transmitting proceed authority to one or more trains if this authority would result in a conflict between the operating zones of two or more trains, and hence would be unsafe.

A further object of this invention is to provide a centralized traffic zone control system with means for storing a distinctive zone location for a specifically identified train in the control office.

A further object of this invention is to provide a centralized zone control system having inert wayside inductive means which cooperates with train carried apparatus for transmitting a distinctive zone location entrance or check-in information and distinctive zone location exit or check-out information to the control office.

A further object of this invention is to provide a centralized zone control system having improved fail-safe check-in and check-out receiving means in the control office for maintaining the check-in information stored in the control office for a preceding zone in the event the train fails to properly check into a succeeding zone.

A further object of this invention is to provide a centralized zone control system having improved control office means for receiving and storing train identification information for more than one train simultaneously occupying only one zone, and control office means for permitting the check-out apparatus from restoring the check-in apparatus for a preceding zone only in the event that the same identified trains which occupied the zone subsequently vacate the respective zone.

A further object of this invention is to provide a centralized zone control system having train carried means for insuring that the zone location and identification of a particular train is in agreement with the control signal transmitted, as a condition precedent to the reception of a control message from the control office for a respective train.

A further object of this invention is to provide a centralized zone control system having improved train stop apparatus circuit means for checking the proper operation of the relay means each time a train passes a wayside inductor.

A further object of this invention is to provide a centralized zone control system having control office means for preventing the operator from transmitting a take-siding signal to a particular train whose operating zone extends beyond the zone which terminates at the entrance to the respective siding.

A still further object of this invention is to provide a zone control system having means at the control office for preventing the transmission of proceed authority for a train to pass an absolute zone marker until after the train has entered the zone at the exit end of which the absolute marker is positioned.

A further object of this invention is to provide an improved centralized zone control system which will prevent a train from passing a specified zone location marker without receiving an automatic brake application in the event of failure of any portion of the control office apparatus.

A further object of this invention is to provide an improved centralized zone control system having means for preventing the operation of a train into a succeeding zone without receiving an automatic brake application in the event of any improper operation of the train carried apparatus.

The system also contemplates numerous other features, functions and characteristics in the various apparatus and circuits employed which will in part be described in the following specification and in part be obvious from the conventional showing of the system in the accompanying drawings.

In describing the invention in detail reference will be made to the accompanying drawings in which:

FIGS. 1A and 1B show the control panel in the control office together with a block diagram of the apparatus associated therewith;

FIGS. 2A and 2B show a typical arrangement of the wayside and train carried apparatus;

FIGS. 3A–3G illustrates the check-in and check-out apparatus at the control office;

FIGS. 4A–4G illustrates the apparatus and circuitry on the locomotive for transmitting information to the control office, receiving controls from the control office, and the train stop apparatus;

FIGS. 5A–5C illustrates the apparatus and circuitry located at the rear of the train for transmitting check-out information to the control office;

FIGS. 6A–6D illustrates the control office apparatus and circuitry for transmitting a distinctive signal to a particular train in a specific zone;

FIGS. 7A–7F illustrates diagrammatically the control office apparatus including the circuitry for indicating the occupation of a particular zone and the interlocking circuitry for preventing unsafe traffic movements throughout the particular track section;

FIG. 8 illustrates a code chart showing typical combinations of location frequencies to produce distinctive tones for modulating the carrier frequencies;

FIG. 10 illustrates the proper arrangement of FIGURES 5A–5C.

Figure 2A:
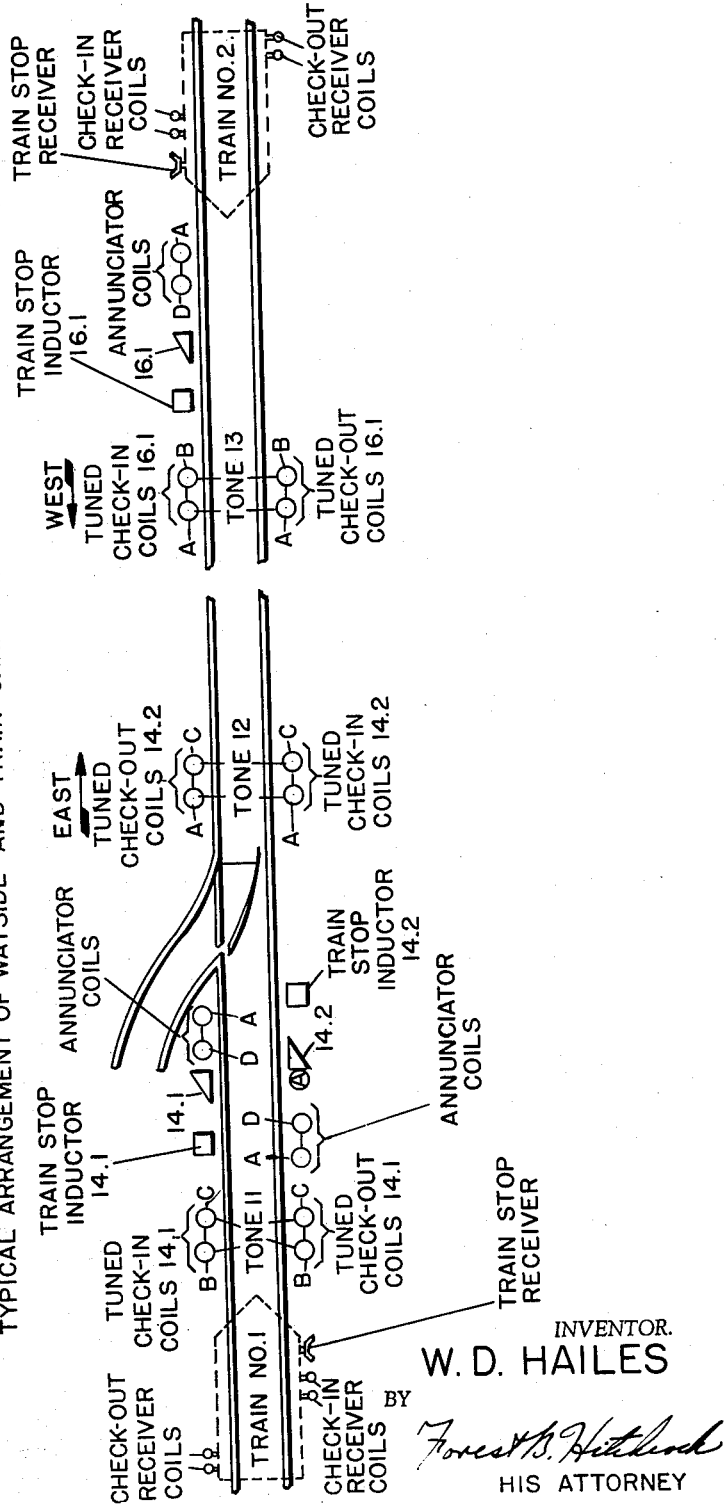

For the purpose of simplifying the illustrations and facilitating the explanation thereof, the various parts and circuits constituting this embodiment of the present invention has been shown diagrammatically, and certain conventional illustrations have been employed, the drawings have been made more with the purpose of facilitating the disclosure of the present invention as to its principles and mode of operation rather than for the purpose of illustrating the specific construction and arrangement of parts in practice. Thus, the various relays and their contacts are illustrated in a conventional manner, and symbols are used to indicate the connections to terminals of batteries or other sources of electric current instead of showing all of the wiring connections to such terminals.

The symbols (+) and (—) are employed to indicate the positive and negative terminals respectively of suitable batteries or other sources of direct current. Also reference is made from time to time to functions common to all parts of a similar character and the letter reference characters common to parts without preceding or succeeding numerals. It is to be understood that such a reference applies to any parts designated in the drawings that have reference characters that are similar except numerals associated therewith. Also throughout the drawings some of the apparatus is referred to by its full name rather than giving it a letter reference for the purposes of simplicity and clarity. In describing certain portions of the apparatus, the full name of the apparatus will be given together with a corresponding reference number for the purpose of illustrating a definite location of the described apparatus.

Although the present invention is of a general and broad application and may be applied to any type of track layout, either for single or double directional running, the invention has been shown applied to a single track layout provided with passing sidings, which application is believed to illustrate all the problems and difficulties encountered in any of the various systems.

FIG. 1A illustrates diagrammatically the arrangement of wayside zone markers for an application of the invention to a single track railroad having passing sidings. In the embodiment illustrated, the wayside markers 10.2, 12.2, 12.2–S, 14.2, 18.2, etc. and all other markers which are referred to with an "even" number are used to define zones for eastbound traffic running over the track layout from left to right. The markers referred to as 24.1, 22.1, 20.1–S, 20.1, etc. or those with an odd numbered reference character define zones for railway traffic running from right to left or in a westerly direction. The marker 10.2 for the purposes of this embodiment is assumed to be the first marker encountered by an eastbound train entering a stretch of track provided with this invention, and the marker ENZ is assumed to be the exit marker for an eastbound train or the marker which indicates that the train is leaving the stretch of track under a system of control as disclosed herein. For westbound trains the marker 24.1 is assumed to be the first encountered and the marker WNZ is assumed to be the exit or leaving marker.

There are two kinds of markers, the "permissive" type and "absolute" type. The latter or "absolute" type is designated by a suitable sign such as a large letter "A" and by a different shape of the blade of the marker. The "absolute" marker is employed at wayside locations beyond which no train shall proceed except with the proper signal in the cab. For example, in the embodiment disclosed "absolute" markers are provided at the entrance to a section of single track railroad. The markers designated as 12.1, 12.1–S, 14.2–S, 14.2, 20.1, 20.1–S, 22.2–S, and 22.2 are "absolute" markers. The "permissive" marker requires a train to stop, and then permits the engineman to proceed at a restricted speed at his discretion.

The section of track between two markers is defined as a "zone." A train which has passed the marker designated 10.2, for example, and traveling in an easterly direction is said to be in zone 10.2; and an eastbound train passing marker 14.2, for example, is said to be in zone 14.2. A westbound train passing marker 22.1, for example, is said to be in zone 22.1 and likewise a westbound train passing marker 16.1, for example, is said to occupy zone 16.1. Thus it can be seen that there are individually defined zones for each direction of traffic over the same section of track. The zone in which a train is located is called the "occupied zone" and the zone in front of an "occupied zone" is termed the "stopping zone." However, when authority to proceed is granted to a train in a particular zone the zone ahead of the train is then called the "authorized proceed zone." In this situation the zone ahead of the "authorized proceed zone" then becomes the "stopping zone" for the particular train for which the authorization has been given. The one, two or three zones as the case may be, is referred to as the operating zone for a particular train. The "operating zone" for a particular train is indicated to the operator in the control office by the display of distinctive colored lights on the control panel. As shown in FIG. 1A each of the zones has a corresponding strip of light which can be illuminated with different colors. For instance, when a train enters zone 12.2 a red light is illuminated in the translucent strip of light which corresponds to zone 12.2 thus showing that a train is occupying a portion of this zone. When a proceed signal has been sent to a train occupying zone 12.2, the translucent strip associated with zone 14.2 then is illuminated green, and the strip of light associated with zone 18.2 is illuminated yellow. It is to be understood that this form of translucent strip illumination on the control panel can be altered to show different types of indications in accordance with the particular needs of practice. However, the above described system is believed to be illustrative of the principles involved.

From the foregoing, it is apparent that each train is contained within an operating zone which moves along with the train as it proceeds; therefore making it possible to establish a control system based on coordinating train movements to avoid all conflicts between operating zones. The present invention proposes to do this by automatically reporting to the control office the location of the occupied zone for each train. As shown in FIG. 1B, all of the interlocking circuitry for preventing the authorization for train movements that would result in a conflict between operating zones of two or more trains is located in the control office.

There is also provided on the control panel various signal levers SL which the operator positions for clearing train movements in each direction. All of the levers are shown in their normal or upright positions NC which position denotes no operational authority for trains passing the marker at the end of its succeeding zone. For example, the lever associated with marker 18.2 is shown in its normal or NC position. The operation of the lever SL associated with marker 18.2 to the right position CE or parallel with the translucent lighting strip in effect allows a train operating in zone 14.2 to pass the marker 18.2 without restriction. The signal levers 12SL, 14SL, 20SL and 22SL are associated with each end of a passing siding. When these levers SL are in an intermediate or diagonal position, TS and LS respectively, information is given to the train to either "take siding" or "leave-siding" as the case may be. When the levers SL are in a horizontal position CE or CW, information is given to the train to proceed past the marker associated with the particular end of the siding therewith. For example, when the signal lever 14 is in a horizontal position CE to the right, information is given to a train in zone 12.2 for passing the marker 14.2. When the 14 signal lever is in position LS diagonally to the right it provides information for a train on the siding zone 12.2-S to leave the siding. With the 14 signal lever diagonally in position TS to the left, information is transmitted to a train in zone 16.1 which requires the train to enter the siding. The remaining signal levers operate similarly for the other zones illustrated and disclosed herein.

There is also provided on the control panel various push buttons CPB and RTC associated with each of the zone markers. The push buttons CPB serve to restore the check-in and check-out circuitry for their respective associated zones in the event of improper functioning of any portion of the check-in and check-out apparatus. In the event a train fails to properly check-in or out of a particular zone, the control office operator, only, is able to restore the system to normal.

The push buttons RTC are provided to permit the control office operator to repeat a control message to a train in the zone associated with the respective button RTC.

From the block diagram in FIG. 1B it is shown that the control office has apparatus for receiving check-in and check-out information together with apparatus for sending a particular control signal to trains operating in a stretch of track provided with this invention.

It is apparent from FIGS. 1A and 1B that the check-in receiver controls the train identification and zone location apparatus, which in turn influences the check-in and check-out circuitry. Similarly the check-out receiver influences other train identification and zone location apparatus which controls the check-in and check-out circuitry. The manually operable signal levers SL on the control panel shown in FIG. 1A and the check-in and check-out circuitry cooperate to control the interlocking circuitry between operating zones. The train control circuits as influenced by the interlocking circuitry govern the train control transmitter.

Referring to FIG. 2A a portion of the track layout is illustrated which shows the arrangement of the wayside apparatus at each zone marker and the location of the train carried apparatus on each of the trains. Associated with marker 14.2 for example, is a pair of distinctively tuned wayside check-in coils which are so disposed as to inductively cooperate with inductive apparatus carried on the locomotive or front portion of the train; and a pair of distinctively tuned check-out coils so disposed as to inductively cooperate with the inductive apparatus carried near the rear of the train. There is also a train stop inductor which is so disposed as to cooperate with inductive apparatus located on the train for controlling the automatic train stop apparatus. Located a short distance in front of each wayside marker is a pair of tuned wayside annunciator coils which serve to operate an audible indicator warning the engineman that he is approaching a wayside marker. It is proposed according to this embodiment to have a different combination of frequencies for each of the tuned wayside check-in and check-out coils. For example, the tuned wayside check-in and check-out coils associated with marker 14.2 are tuned to frequencies A and C respectively. The tuned wayside check-in and check-out coils associated with marker 14.1 are tuned, for example, for frequencies B and C respectively. Similarly each of the remaining markers is provided with a pair of tuned wayside check-in and check-out coils, which are distinctively tuned to other combinations of frequencies. Thus each particular zone location is capable of inductively activating suitable apparatus for a distinct combination of frequencies. The wayside annunciator coils located in advance of each wayside marker are tuned to the same combination of frequencies, for example, the combination A and D.

With further reference to FIG. 2A, train stop receiving apparatus is located on the right-hand side of the locomotive or locomotive tender and so disposed as to cooperate with the train stop inductors associated with zones for a particular direction of traffic. The check-in receiving apparatus is located on the right-hand side of the locomotive or locomotive tender and so disposed as to be influenced by the tuned wayside check-in coils located on the right-hand side of the trackway. The check-out receiving apparatus is located on the left-hand side of the train at the rear end thereof and so disposed as to be influenced by the tuned wayside check-out coils associated with a particular marker at the left-hand side of the trackway. Therefore train No. 1, for example, will check-into zone 14.2 by the inductive cooperation of its locomotive check-in apparatus and the distinctively tuned wayside check-in coils located on the right-hand side of the track diagram. It should be noted at this point that the coils which are disposed on opposite sides of the track serve to influence the check-in receiving apparatus when checking into the zone associated with a respective marker and also to influence the check-out apparatus on the rear of the train to show that the train has left the preceding zone. The tuned wayside coils and the train carried apparatus are so disposed that the tuned coils for an eastbound zone will not influence the train carried apparatus for a westbound train. Similarly the tuned wayside coils for a westbound zone will not influence the apparatus of an eastbound train. At this point it should be noted that none of the wayside apparatus is provided with electrical energy and both the tuned wayside coils and the train stop inductor are inert.

FIG. 2B illustrates the arrangement and the apparatus located on the train. Located on the locomotive or near the front of the train is the train stop receiver, the cab signals and the automatic brake apparatus. Also located near the front of the train is the check-in transceiver and transmitter apparatus. Associated with the check-in apparatus and the automatic brake and cab signal apparatus is the engine control receiving apparatus which serves to control the train as hereinafter described in detail. The check-out transceiver and transmitting apparatus is located at the rear of the train.

Referring to FIGS. 1B and 2B the check-in transmitting apparatus transmits check-in information by way of its antenna TTC to the check-in receiver located in the control office having an antenna CCT. The check-out transmitting apparatus transmits its check-out information to the control office by way of the antenna TTO to the check-out receiver which receives the signal through the antenna CTO. The train control transmitter in the control office sends its control signal by way of antenna CT to the engine control receiving apparatus on the train through the antenna COT. As hereinafter mentioned in detail the check-in communicating apparatus operates at a distinct carrier frequency F1. The checkout communicating apparatus operates at a carrier frequency F2. The train control communicating apparatus operates at a carrier frequency F3.

Typical Frequency Combination Chart

Figure 4A:
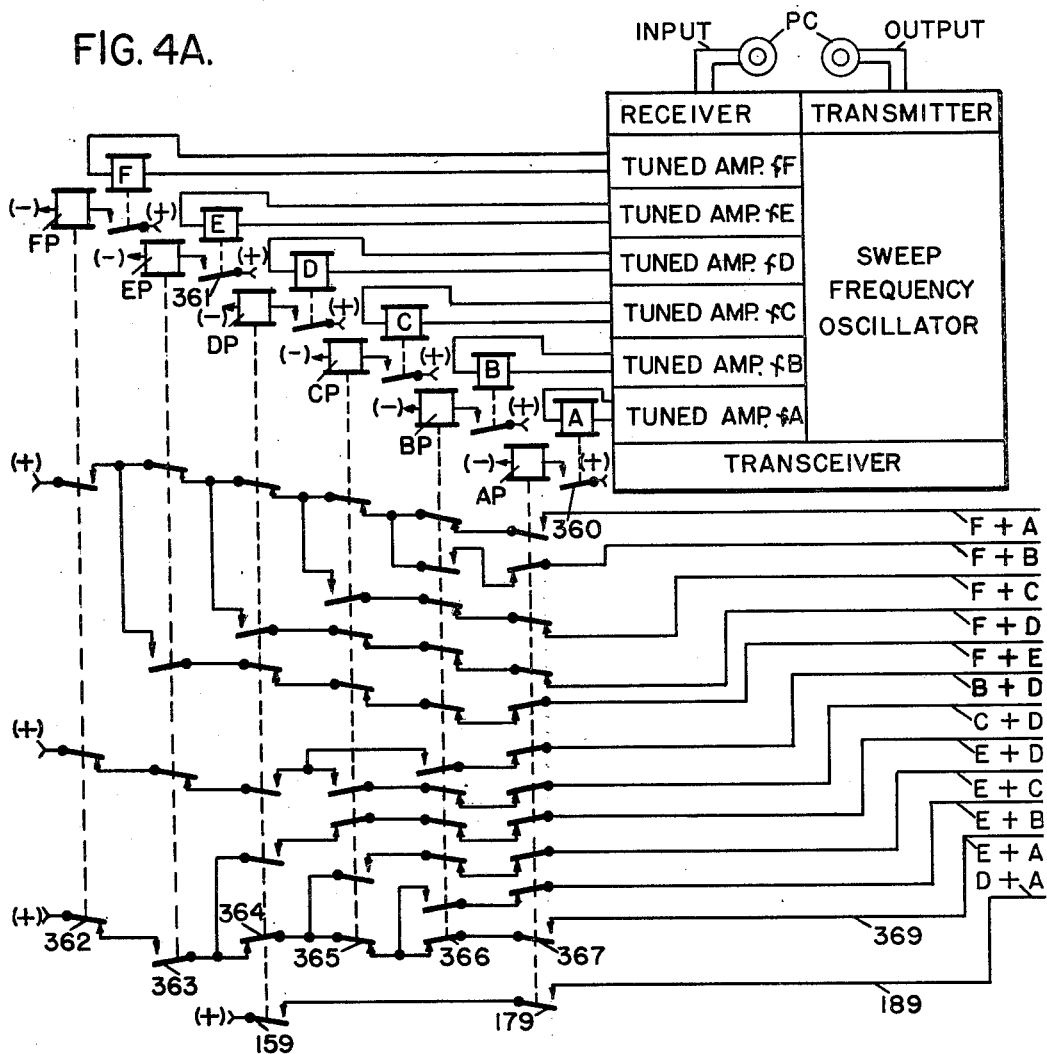
Figure 9:
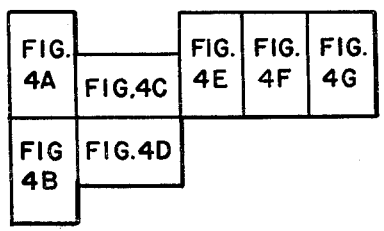
FIG. 9 illustrates the proper arrangement of FIGURES 4A–4G.

FIG. 8 is a chart showing a typical allocation of frequency combinations for the tuned wayside coils located in proximity to each zone marker. Each tuned wayside coil is capable of being inductively coupled with a transceiver either located on the locomotive, or at the rear end of the train. Referring to the chart, for example, the transceiver of a train traveling in a westerly direction and passing zone marker WNZ which is the marker for leaving zone territory is caused to be actuated by two distinct frequencies C and H. Also, for example, the transceiver located on an eastbound train entering zone 12.2 is actuated with the distinctive combination of frequencies D and G. Similarly, each eastbound and westbound zone is distinctively identified by a different combination of frequencies which distinctively influences the train carried apparatus. FIG. 8 illustrates a typical combination for each zone shown in the track layout of FIGS. 1A and 7A–7G. However, for the purposes of simplicity in describing the apparatus, circuitry, and operation of this particular embodiment of the invention, the transceiver illustrated in FIG. 4A and FIG. 5A is shown having apparatus for zones 18.2 through 24.1. It is considered that the inclusion of the apparatus for the remaining zones 10.2 through 16.1 would be repetitious and it is believed that the apparatus for a portion of the zones as illustrated is sufficient for adequately describing this embodiment of the invention. In a portion of the description, reference is made to the zones 10.2 through 16.1 and it is assumed that there are similar relays prefixed by their respective associated zone numbers although not specifically illustrated herein.

Train Carried Check-in and Check-Out Apparatus

Referring to FIG. 4A a transceiver is provided which comprises a sweep frequency oscillator, a plurality of distinctively tuned amplifiers, and a pair of pick-up coils PC. The pick-up coils PC become inductively coupled with associated trackway inductive wayside coils when the locomotive passes over it. Each of the amplifiers associated with the transceiver is tuned to become activated for a distinctive frequency. As the operation of this transceiver and the associated pick-up coils PC are well-known in the art; it is deemed sufficient for the purposes of this description to merely state that a particular combination of tuned amplifiers become active in response to the inductive influence of a pair of tuned wayside coils having frequencies which correspond to the particular frequency of the tuned amplifier.

The relays A through F are provided to detect the output of a particular combination of tuned amplifiers and are assumed to be respectively energized in response to a respective activation of their associated tuned amplifiers.

The relays AP through FP are repeaters of the previous A through F relays and are energized in response to the picking up of the previous frequency detecting relays associated with the transceiver. Therefore, when a particular locomotive passes a particular pair of wayside tuned check-in coils the associated address detection relays A through F and the repeater relays AP through FP will become picked up in response thereto.

The engine also carries an electronic unit to automatically transmit check-in signals to the control office as soon as an engine passes over the tuned wayside check-in coils associated with each zone marker. For the purposes of this embodiment of the invention the check-in transmitter operates on a carrier frequency F1, which frequency is reserved exclusively for check-in signals, the picking up of a combination of address detection repeater relays AP through FP modulates the carrier frequency of the transmitter with a distinctive tone location frequency for transmitting a particular zone location to the control office.

Figure 4B:
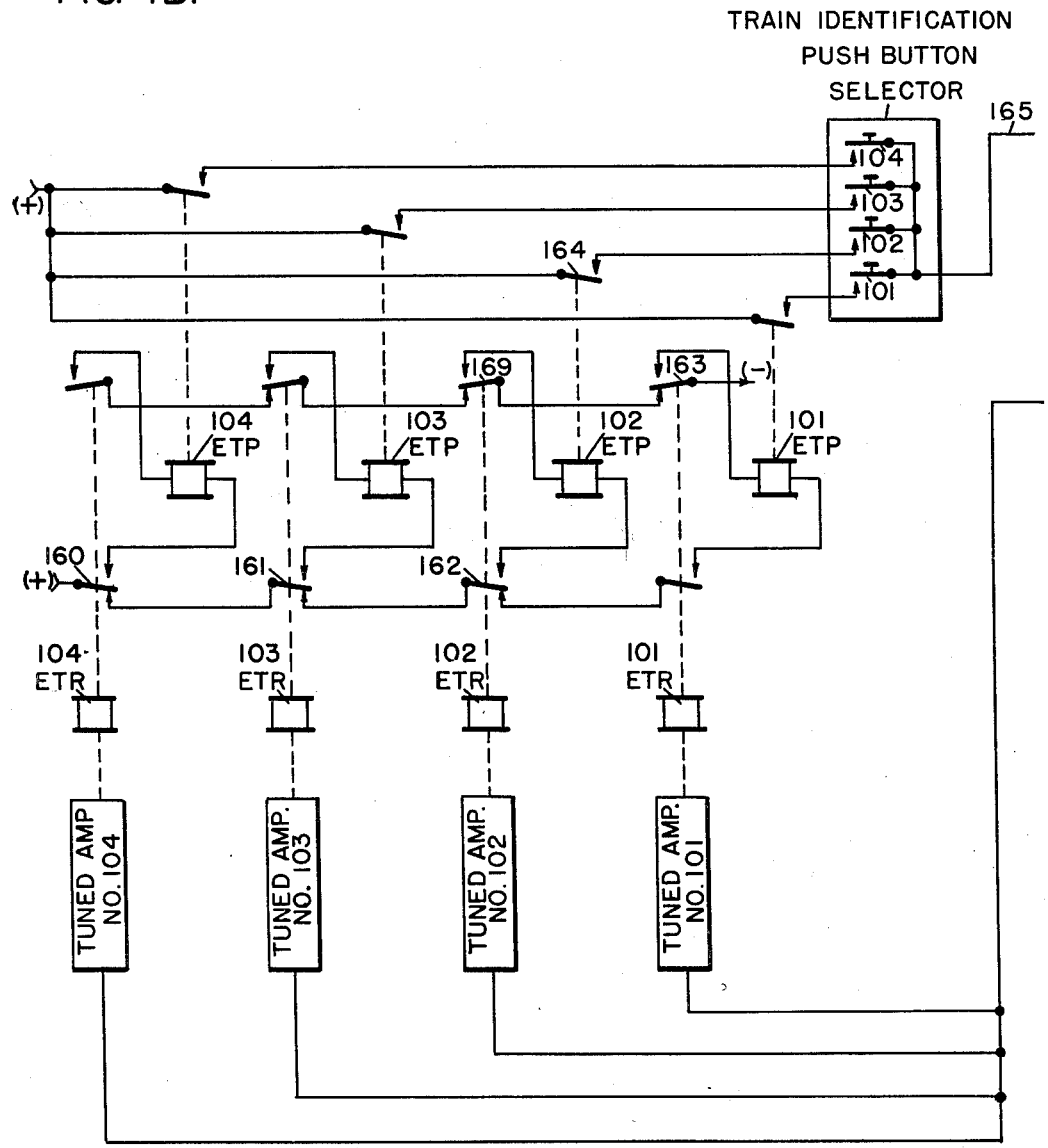

Associated with the transmitting apparatus for check-in and check-out signals from the locomotive is a train identification selector. For the purposes of this disclosure it is assumed that each train is equipped with conventional selector type switch which is positioned so that each train is identified by permanently connecting the output of a selected tone generator having a distinctive frequency to the modulating portion of the transmitter. Therefore, not only is each train able to transmit its check-in or check-out location but it simultaneously transmits its distinctive identification as determined by the position of the selector switch. Referring to FIG. 4E one of the tone generators 101, 102, 103, 104 is connected to the modulating portion of the check-in transmitter by selectively positioning the train identification selector. The particular tone selected remains the same for each train traveling in zone control. In this embodiment the permanent conditioning of train No. 1 westerly is identified by tone 101, train No. 1 easterly by tone 102, train No. 2 westerly by tone 103 and train No. 2 easterly by tone 104.

Figure 4C:
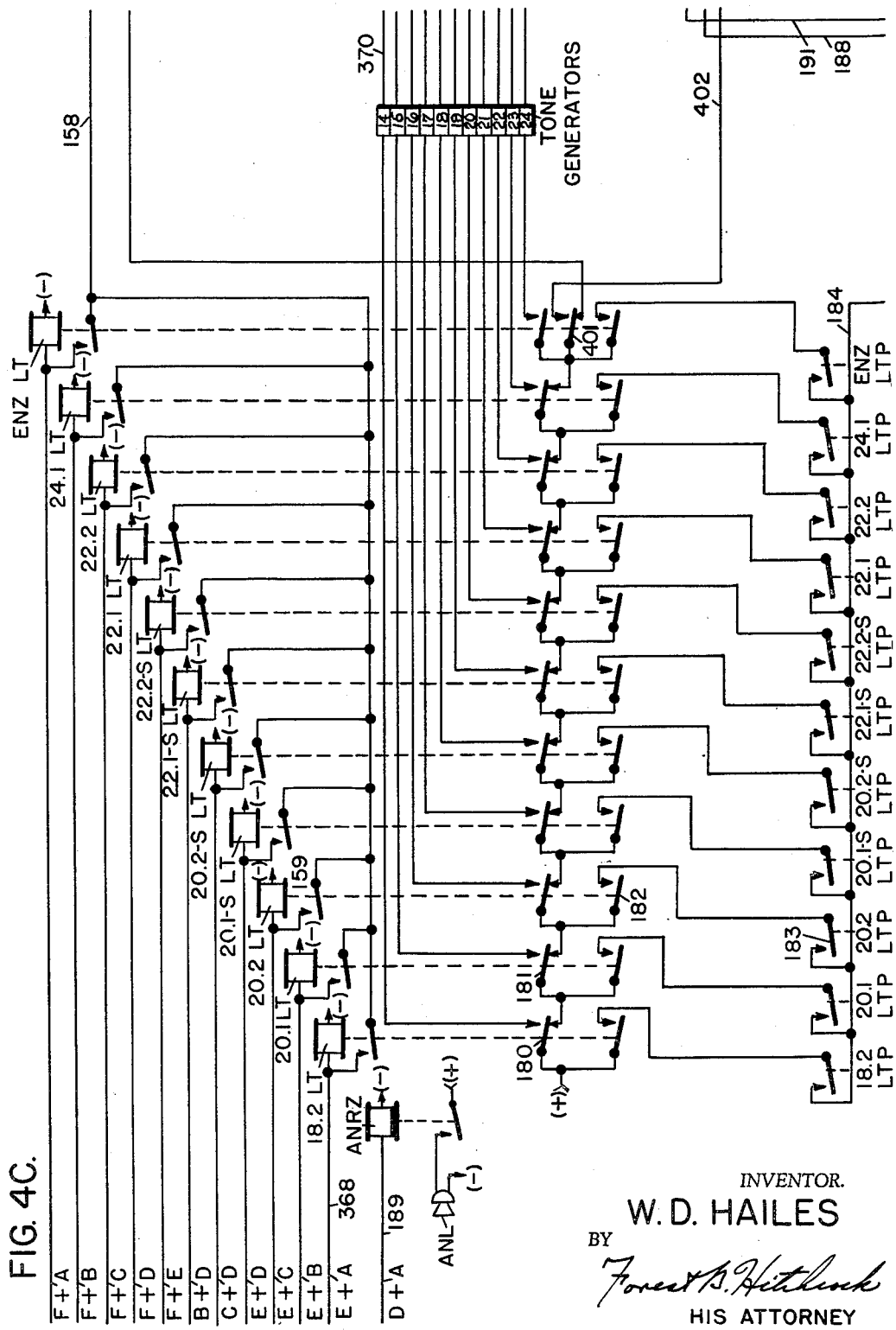
Figure 4E:
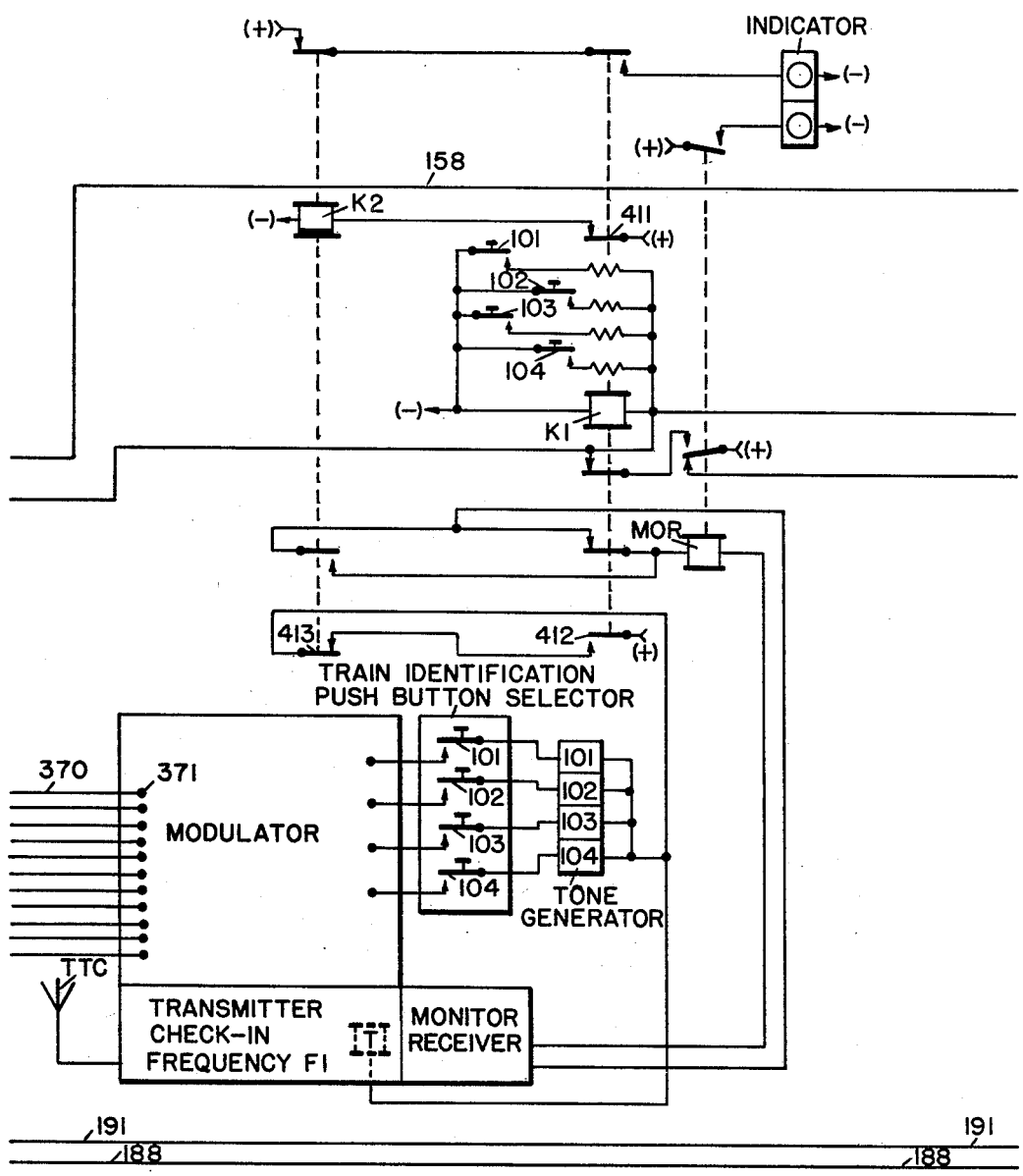

Referring to FIG. 4C the check-in location tone selection or address relays 18.2LT and 20.1LT through ENZLT are provided for selecting a particular tone generator for modulating the check-in transmitter, which transmitter as hereinbefore mentioned operates on a carrier frequency F1. The relays K1 and K2 are keying relays and serve to initiate the transmission of the carrier frequency F1 as selectively modulated by respective tone generators. A monitor receiver is provided which is activated in response to the transmission of a check-in signal from another train and when activated, energizes an associated monitor receiving relay MOR which prevents the transmitter from sending an indication to the control office simultaneously with the transmitting of a signal from another train. There is also provided an indicator in the cab of the locomotive which is selectively illuminated either in response to the transmission of a check-in signal from its own train or from another train operating in the zone controlled territory. The manner in which the particular check-in apparatus transmits a definite check-in location to the control office will be considered specifically in connection to the description of the operation of an eastbound train traveling through a portion of the zone controlled territory.

Assuming that an eastbound train previously and permanently identified as train No. 1 passes the tuned wayside coils associated with zone marker 18.2 (see FIG. 4A) the tuned amplifiers fA and fE are activated which serve to energize the address detection relays A and E. The picking up of the relays A and E energize the repeater relays AP and EP by two obvious circuits one of which extends from (+) and includes front contact 360 of relay A, and the winding of relay AP to (−), and the other extends from (+) and includes front contact 361 of relay E, and the winding of EP to (−). The picking up of the relays EP and AP energize the location tone selection relay 18.2 LT by a circuit which extends from (+) and includes a back contact 362 of relay FP, front contact 363 of relay EP, back contact 364 of relay DP, back contact 365 of relay CP, back contact 366 of relay BP, front contact 367 of relay AP, wire 368, and the winding of relay 18.2 LT, to (−). The picking up of the relay 18.2 LT activates the tone generator 14 for modulating the carrier frequency F1 with the frequency of this distinctive tone. The schematic circuit for activating the tone generator 14 extends from (+) and includes front contact 180 of relay 18.2 LT, the tone generator 14, wire 370 and the terminal 371 of the modulator. The tone generators 102 associated with the train identification of Train No. 1 traveling easterly is also connected to modulate the carrier frequency F1. In response to the picking up of the relay 18.2 LT the normally energized keying relay K1 is deenergized by the opening of the back contact 180 of relay 18.2 LT. The dropping away of the relay K1 deenergizes relay K2 by the opening of the front contact 411 of relay K1. It should be noted that relay K2 is a slow acting relay and remains in a picked up condition for a short interval after the energy has been removed. It is during the interval that relay K1 is dropped away and relay K2 is picked up but deenergized, that the transmitter is activated to transmit to the control office its carrier frequency, modulated by the frequencies of the tone generator 14 and tone generator 102. The keying circuit for activating the transmitter extends from (+), and includes back contact 412 of relay K1, front contact 413 of relay K2 and the keying relay T associated with the transmitter. The function of the check-in circuitry for the other identified trains of other locations is similar to that in example given.

Referring to FIGS. 4A and 4C there is provided in the cab of the locomotive an audible warning signal or annunciator ANL. The annunciator ANL is activated to provide an audible warning when the front end of the train is about to pass a wayside marker. This is intended to assist the engineman when poor visibility makes it difficult to see wayside markers at a distance. As will be apparent as the description of the invention progresses the engineman is required to acknowledge each time the train approaches a wayside marker. The inert wayside annunciator coils inductively influence the pick-up coils of the train carried check-in transceiver so as to energize the detection of repeater relays DP and AP each time the train passes a pair of the annunciator coils. In response to the picking up of the DP and AP relays, the annunciator control relay ANRZ is energized to operate the warning signal ANL. The relay ANRZ is made slow acting so that the audible signal will sound for a period of time longer than the pick-up coils of the transceiver are influenced by the wayside annunciator coils. The circuit for energizing the relay ANRZ extends from (+), and includes front contact 159 of relay DP, front contact 179 of relay AP, wire 189, and the winding relay ANRZ, to (−).

It is also considered that this relay ANRZ may be used to control an acknowledging contactor ACK in the train carried train stop apparatus or perform other functions which the engineman may be required to perform manually when passing a wayside marker. The operation of the acknowledging contactor ACK is described in detail in connection with the description of FIGS. 4F and 4G. Because the failure of the engineman to operate the acknowledging contactor ACK will cause the train to come to a stop, which is later described herein, a failure of the annunciator control to assist him or perform another function, is a failure on the side of safety.

Figure 5C:
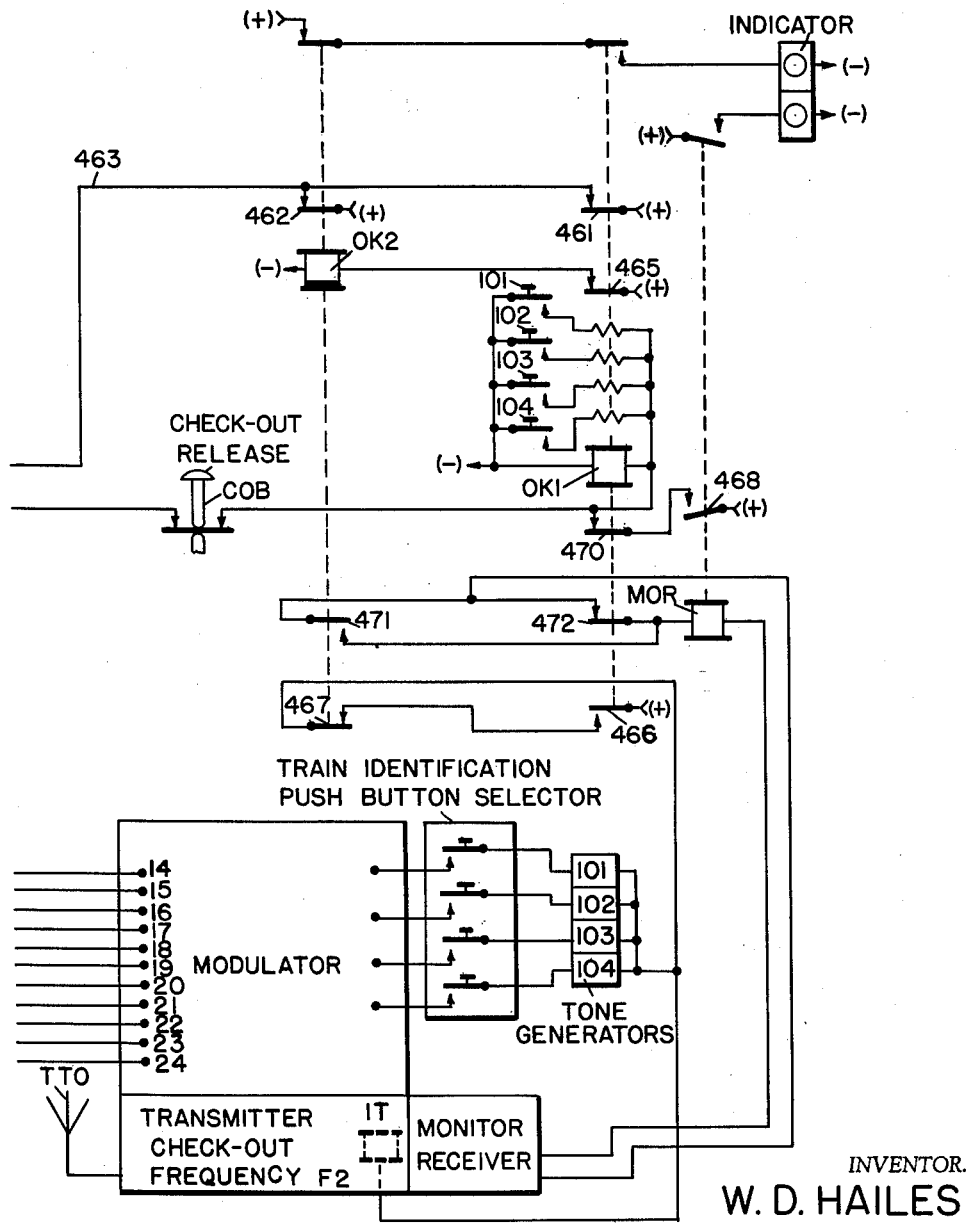

Apparatus similar to the check-in apparatus is located at the rear end of the train for detecting and transmitting a particular check-out signal to the control office. Referring to FIG. 5A a transceiver having tuned amplifiers distinctively tuned to frequencies A through F with respective detection relays OA to OF associated therewith and address repeater relays OAP through OFP for repeating the position of respective detection relays OA through OF. There is also provided similar tone selection relays OLT for selecting a particular tone generator for modulating the carrier frequency of the check-out transmitter. There is also provided check-out keying relays OK1 and OK2 for keying the check-out transmitter. A relay MOR controlled by a monitor receiver is provided for detecting the transmission of a check-out signal from another train. Referring to FIG. 5C an indicator is also illustrated which is selectively illuminated in response to a check-out signal from its own check-out transmitter or from other trains. Referring again to FIG. 5C, a check-out release push button is provided in the caboose of the locomotive for reasons which will be described as the description of the invention progresses.

The manner in which the check-out apparatus transmits a definite check-out location to the control office will be described in connection with the operation of an eastbound train moving in a portion of the territory equipped with this embodiment of the invention. Assuming that the rear of an eastbound train checks out or vacates the zone ending at marker 18.2, the rear end or check-out transceiver is influenced by the wayside tuned check-out coils associated with zone marker 18.2 so that the tuned amplifiers A and E are activated thereby energizing the detector relays OA and OE. In response to the picking up of the relay OA the repeater relay OAP is energized by an obvious circuit which includes a front contact 350 of relay OA; and in response to the picking up of relay OE the repeater relay OEP is energized by an obvious circuit which includes the front contact 351 of relay OE. In response to the picking up of the relays OEP and OAP, the relay 18.2 OLT is energized by a circuit which extends from (+), and includes back contact 352 of relay OFP, front contact 353 of relay OEP, back contact 354 of relay ODP, back contact 355 of relay OCP, back contact 356 of relay OBP, front contact 357 of relay OAP, wire 358, and the winding of relay 18.2 OLT, to (−). In response to the picking up of relay 18.2 OLT the tone generator 14 is activated to modulate the check-out transmitter frequency F2 with a particular tone frequency. The obvious circuit for activating the tone generator 14 includes front contact 460 of relay 18.2 OLT. A stick circuit for 18.2 OLT is provided which extends from (+), and includes either front contact 461 of relay OK1, or front contact 462 of relay OK2 in parallel, wire 463, and front contact 464 of relay 18.2 OLT, and the winding of relay 18.2 OLT to (—). An energizing circuit is provided for relay OK1 which includes all of the back contacts of the OLT relays (see FIG. 5B) in series; and in response to the picking up of any one of them or in this example 18.2 OLT, the relay OK1 is deenergized, thereby opening its front contact 465 which deenergizes the slow acting relay OK2. During the time that the relay OK1 is dropped away and prior to the dropping away of the relay OK2 which time duration is measured by the slow drop-away characteristics of OK2, the check-out transmitter transmits the check-out information to the control office by energizing a suitable transmitter relay T by a circuit which extends from (+), and includes back contact 466 of relay OK1, front contact 467 of relay OK2, and the relay T. Simultaneously, one of the identification tone generators is activated to further modulate the carrier frequency F2 with the proper train identification tone which has been previously selected as hereinbefore described.

The circuit for activating a particular identification tone generator is obvious from the illustration in FIG. 5C. The monitor receiver associated with the check-out transmitter is operable to energize the monitor operating relay MOR when a different train is transmitting its check-out information to the control office. During the time another train is transmitting its check-out information the relay OK1 is held up by a stick circuit which extends from (+) and includes front contact 468 of relay MOR, front contact 470 of relay OK1, and the winding of relay OK1, to (—). Therefore, it is apparent that a train cannot transmit its check-out information simultaneously with the transmission of check-out information from another train. The circuitry which includes back contact 471 of relay OK2 and front contact 472 of relay OK1, prevents the MOR relay from becoming energized during the transmission of check-out information from its own check-out transmitter. The relay OK1 is provided with a plurality of resistors each resistor having a different value which value corresponds to a separate train identification so that the drop-away time of each OK1 relay will differ according to the particular identity of the train.

This embodiment of the invention is also provided with a means for preventing the automatic check-out of a train from a zone associated with the entrance or leaving end of the sidings. For example, in order for a train vacating zone 18.2 to cause the transmission of its check out information, it is necessary that the check-out release button COB is depressed to interrupt the energizing circuit of relay OK1. The check-out release button is assumed to be suitably located in the caboose or the rear of a train and is not operated until the conductor has determined that the switch associated with the siding 20 is in a normal position. When in a normal position, the conductor can cause the transmission of the check-out information, therefore, if the switch is not returned to its normal position, the control office has information that a train is occupying zone 18.2 An annunciator ANC is provided which gives an audible warning signal during the time that the 18.2 OLT relay is energized informing the engine crew that the switch must be returned to normal or in a normal position and the check-out button COB operated. Similarly, a train leaving the siding is unable to check-out until the conductor operates the check-out release button COB.

*Check-In and Check-Out Apparatus at the Control Office*

From the preceding description it is now apparent that a transmitter of a particular carrier frequency F1 located on the locomotive is caused to transmit a check-in frequency which is modulated by a particular tone generator having a frequency distinctive to the particular identification of the train entering that zone, and also modulated by a tone generator having a frequency distinctive to the particular zone in which the train is entering. Also similar apparatus located on the rear end of the train is caused to transmit a carrier frequency F2 which is modulated by a tone generator having a frequency distinctive to the zone which the rear end of the train has vacated and also modulated by a distinctive tone for identifying the train.

Figure 3A:
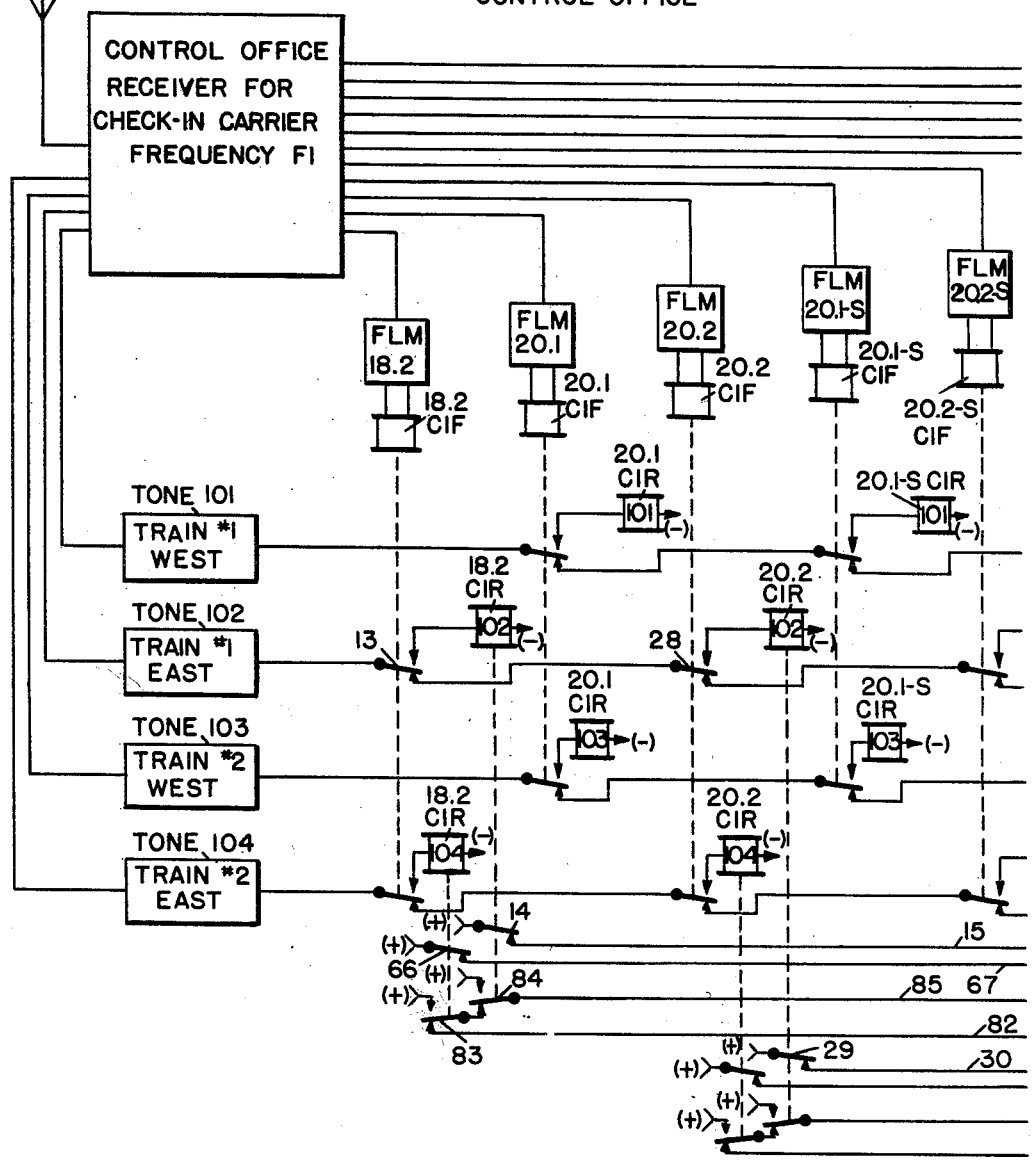
Figure 3B:
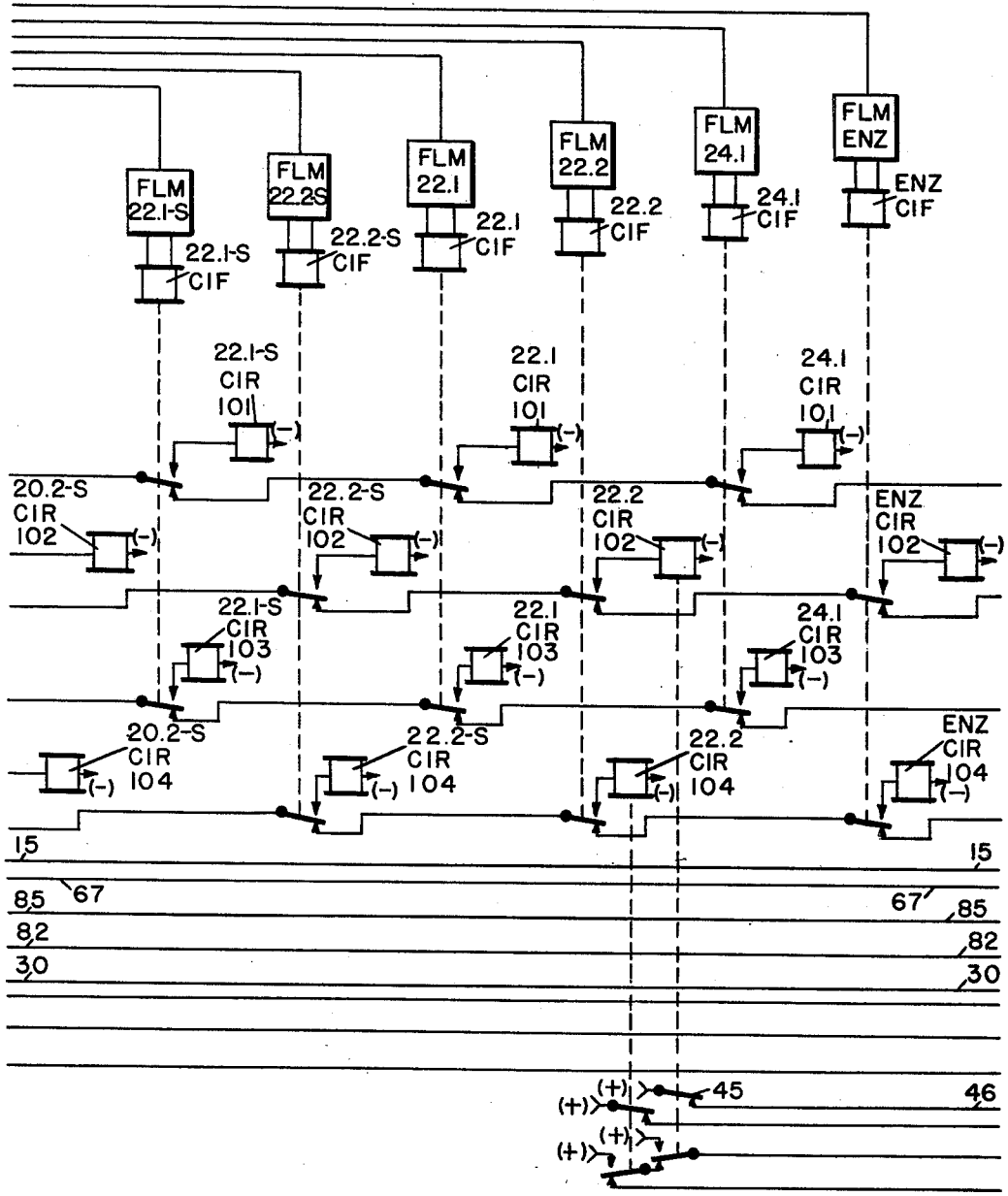

Referring to FIGS. 3A–3G there is provided in the control office a check-in receiver capable of receiving the modulated carrier frequency F1, and a check-out receiver capable of receiving the modulated carrier frequency F2. There is also provided a tuned amplifier FLM for each zone in the track layout. The distinctive modulation of the carrier frequency F1 by a particular location tone frequency activates a corresponding respective tuned amplifier FLM associated with the particular zone for which a train is entering or checking-in. For example, a train checking into zone 20.2 activates the tuned amplifier FLM20.2. Although for the purposes of simplicity only a representative portion of the distinctively tuned location amplifiers FLM and their related circuitry are illustrated in FIGS. 3A and 3B it is assumed that there is a tuned amplifier FLM and related circuitry for each zone shown in the track layout. There is also provided a distinctively tuned amplifier for identifying a particular train and the direction in which it is operated, for example, a train identified as train No. 1 traveling in a westerly direction causes the carrier frequency F1 to be modulated by a particular identification frequency which results in the activation of the tuned amplifier 101. FIG. 3A shows a tuned amplifier for two separate trains traveling in each direction. Although it is contemplated that more than two trains will operate in the zone control system it is believed that the illustration of apparatus for the operation of trains No. 1 and No. 2 traveling in both directions is adequate for properly describing the operation of the system.

A relay CIF is associated with each tuned amplifier FLM and is energized in response to the respective activation of its associated tuned amplifier. A check-in relay CIR is provided for each train at each zone location and is energized in response to the picking up of a particular CIF relay and the activation of a particular identification tuned amplifier, for example, the picking up of relay CIF20.2 and the activation of the tuned amplifier for the eastbound train No. 1 energizes relay 20.2 CIR.

Figure 3C:
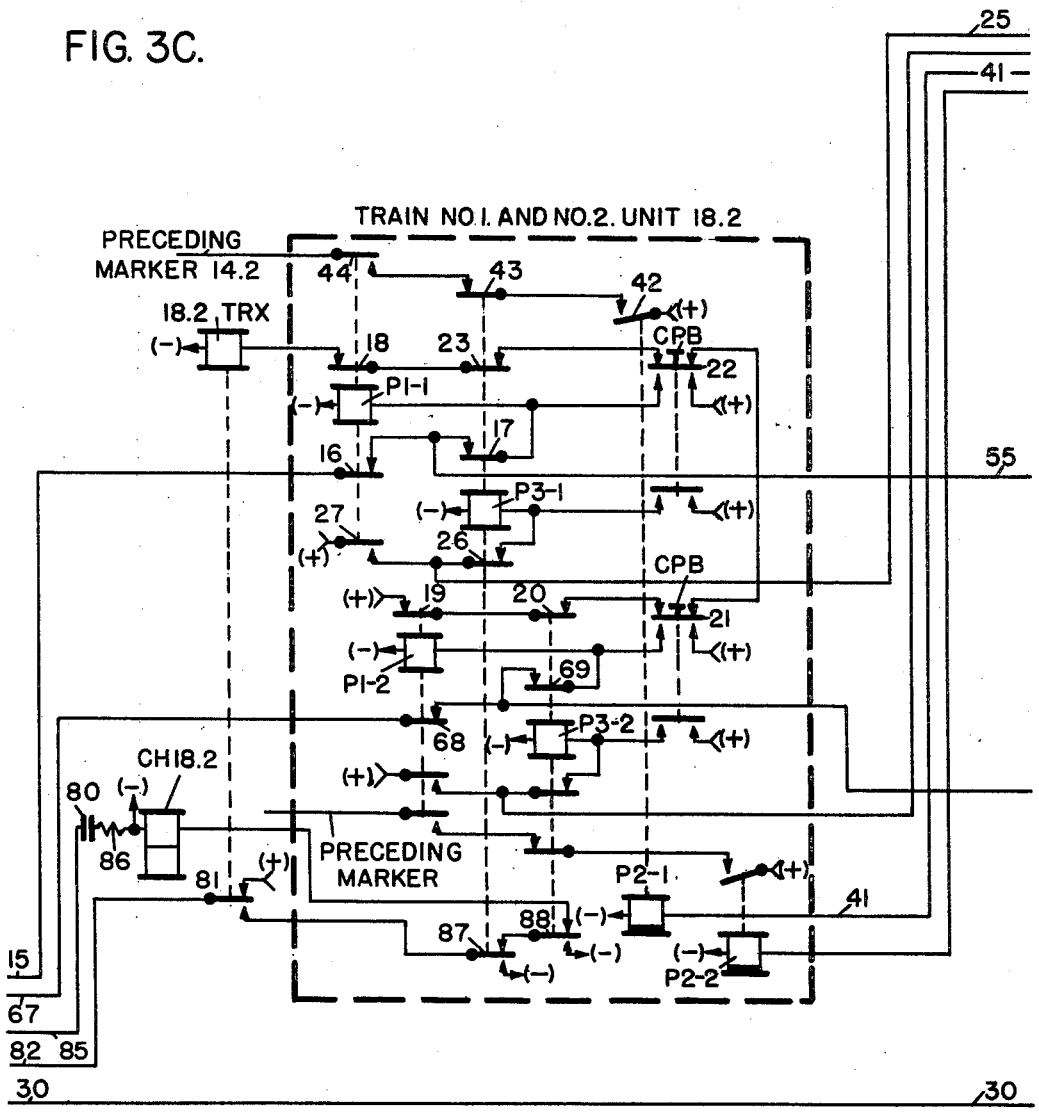
Figure 3D:
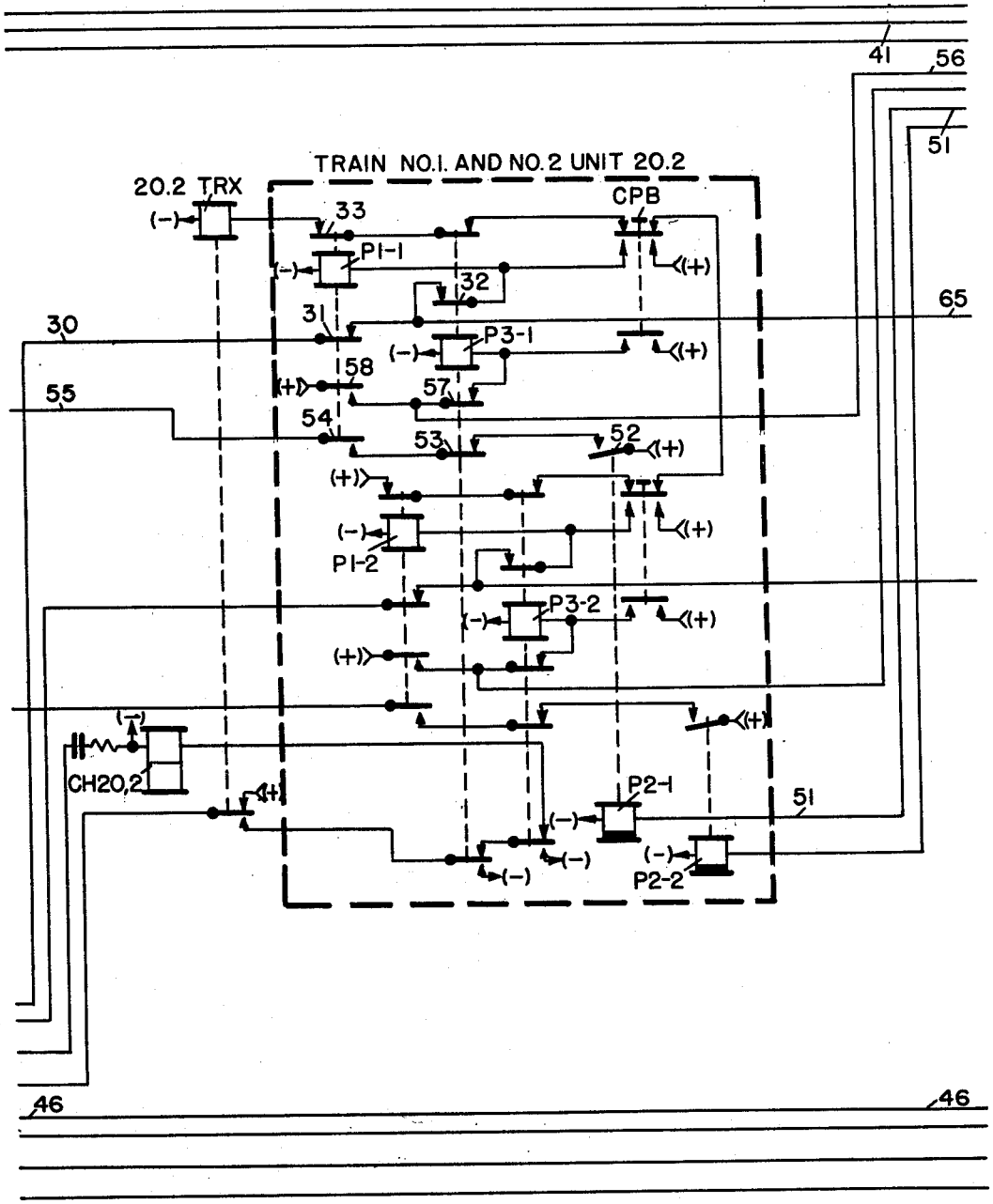
Figure 3E:
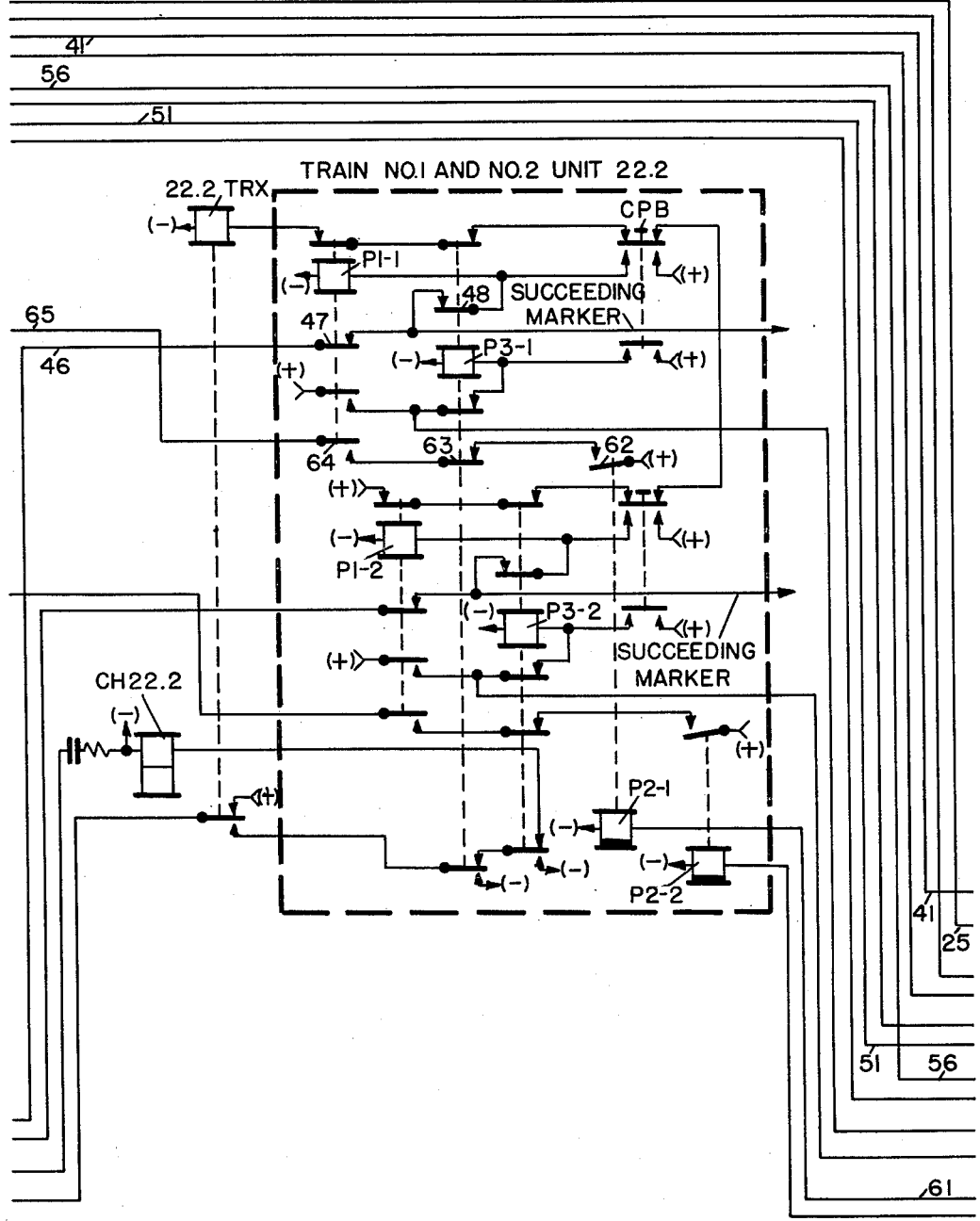
Figure 3F:
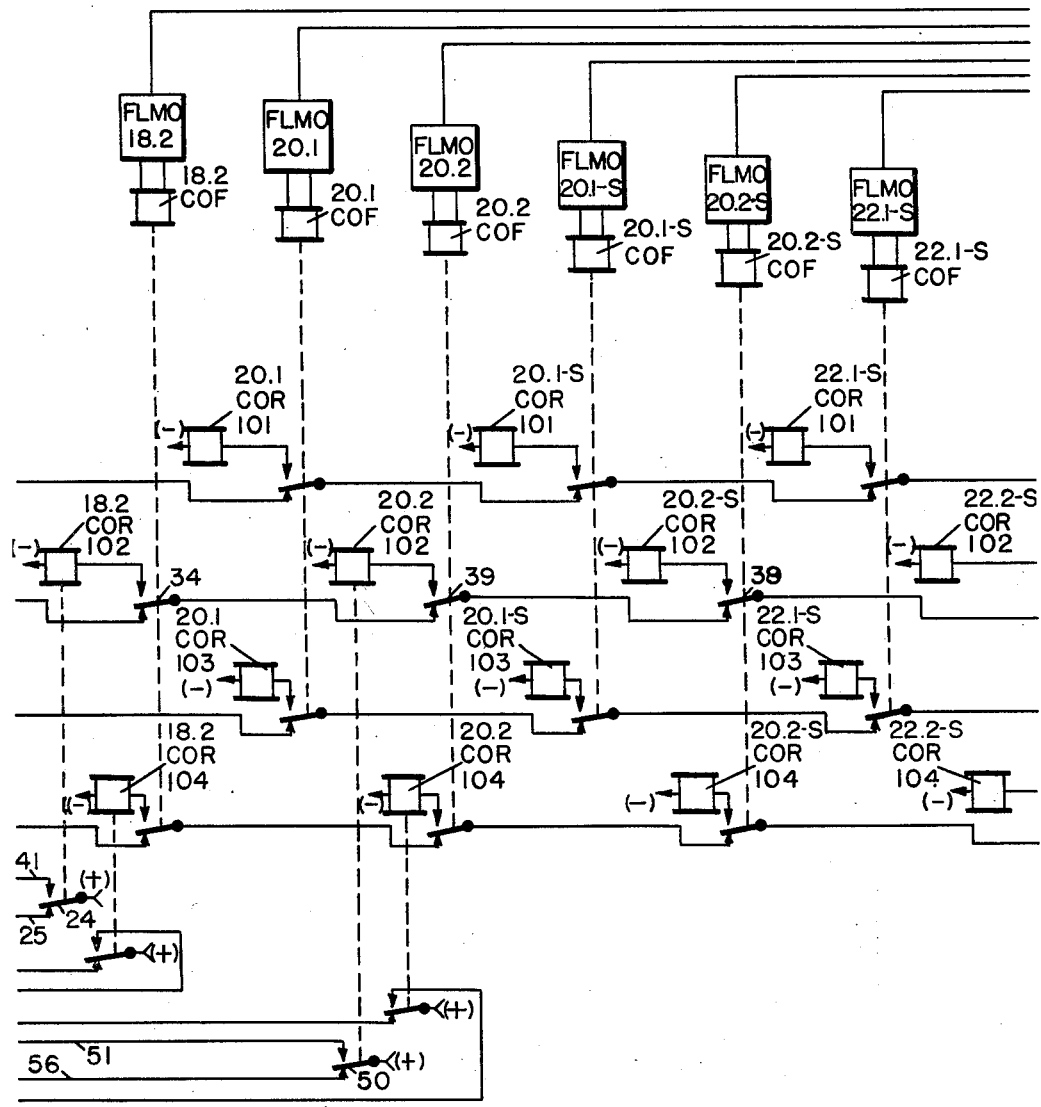

Referring to FIG. 3C, 3D and 3E there is illustrated diagrammatically check-in and check-out units for two distinct trains in three separate zones. As each zone is directional only the train identification circuitry is included in a check-in and check-out unit for the particular direction corresponding to a particular zone. Although the track layout shows considerably more zones in the system than there are check-in and check-out units, it is assumed that the illustration and description of three consecutive zones will serve to adequately illustrate the operation of the system. FIG. 3C illustrates the check-in and check-out unit for trains 1 and 2 at marker 18.2. FIG. 3D shows the check-in and check-out unit for trains 1 and 2 at zone marker 20.2. FIG. 3E illustrates the check-in and check-out unit at zone marker 22.2. FIGS. 3F and 3G illustrate the check-out receiver and its related circuitry; the check-out receiver is capable of receiving the distinctively modulated carrier frequency F2. There is provided a distinctively tuned check-out location amplifier FLMO for each zone in the track layout; and a distinctively tuned train identification amplifier for each train for each direction. A relay COF is associated with each tuned amplifier FLMO; and a relay COR for each train and each zone. The reception of a distinctively modulated carrier frequency F2 causes a respective tuned amplifier FLMO and a respective identification amplifier to be activated by an identified train checking out of a particular zone. The relays COF are energized in response to the activation of its associated tuned amplifier FLMO. The relays COR are distinctively energized in response to the picking up of a respective relay COF and the activation of a particular identification tuned amplifier similar to that described for the check-in receiver and circuitry.

In each check-in and check-out unit a relay P1 is provided for each train which will travel through the zone control system. For example, relay P1–1 associated with each check-in and check-out unit is provided for detecting the presence of train No. 1 as it checks into the zone associated therewith. A relay P1–2 is provided in each unit for detecting the presence of train No. 2 checking into the zone associated with each unit.

There is also provided a relay P2–1 and P2–2 at each check-in and check-out unit for each train which will travel in the zone control system for detecting the checking out of the rear end of a train from the zone associated with a particular zone marker. For example, P2–1 associated with each check-in and check-out unit detects the checking out of train No. 1 from the zone preceding the respective marker and relay P2–2 detects the checking out of train No. 2 from the zone preceding a respective marker. There is also provided a check relay P3–1 and P3–2 at each check-in and check-out unit for checking the proper operation of the check-in and check-out circuitry for each respective train at each particular location. For example, P3–1 checks the proper check-in and check-out operation for train No. 1 at each location and relay P3–2 checks the proper check-in and check-out operation for train No. 2 at each location. There is a normally energized TRX relay associated with each zone and serves to detect the presence of a train in its associated zone. For example, 18.2 TRX is associated with zone 18.2, 20.2 TRX is associated with 20.2 and 22.2 TRX is associated with 22.2. The relay CH associated with each zone is provided to start the transmission of a control from the office which will be described in detail as the description of the invention progresses. Associated with each check-in and check-out unit there is provided an emergency release push button CPB to be used after proper investigation by the operator for restoring the normal operation of the system in the event a train fails properly to check-in or check-out. Thus it is seen that each train is checked through the system as an individual and particular train by the functioning of a group of related relays associated with the identification of a respective train. At this point a clearer understanding of the check-in and check-out apparatus will be better understood by describing the operation of the circuitry for a particular train traveling in the system.

Assuming that the locomotive of train No. 1 passes the tuned wayside coil associated with zone marker 18.2, a modulated carrier frequency F1 is transmitted to the control office, which is received by the control office check-in receiver and activates the tuned amplifier FLM18.2 and the tuned amplifier for train No. 1 traveling east which is designated as tone 102. In response to the activation of the tuned amplifier FLM18.2, the relay 18.2 CIF associated therewith is energized, and because energy is being fed from the activated identification amplifier associated with tone 102, relay 18.2 CIR102 is energized by a circuit which includes the front contact 13 of the relay 18.2 CIF associated with zone marker 18.2. The picking up of relay 18.2 CIR102 deenergizes relay P1–1 associated with unit 18.2 by the opening of back contact 14 of relay 18.2 CIR102. The energizing circuit for this P1–1 relay extends from (+) and includes back contact 14 of relay 18.2 CIR102, wire 15, front contact 16 of relay P1–1, front contact 17 of relay P3–1, and the winding of relay P1–1 to (—). The dropping away of relay P1–1 opens the energizing circuit for relay 18.2 TRX at front contact 18 of relay P1–1. The energizing circuit for relay 18.2 TRX extends from (+) and includes front contact 19 of relay P1–2, front contact 20 of relay P3–2, front contact 21 of push button CPB, front contact 22 of push button CPB, front contact 23 of relay P3–1, front contact 18 of relay P1–1 and the windings of relay 18.2 TRX to (—). The relay P3–1 is a normally energized stick relay having an energizing circuit which extends from (+) and includes back contact 24 of relay 18.2 COR102, wire 25, front contact 26 of relay P3–1, and the windings of relay P3–1 to (—). The dropping away of relay P1–1 closes an alternate stick circuit for relay P3–1 which extends from (+) and includes back contact 27 of relay P1–1, front contact 26 of relay P3–1 and the winding of relay P3–1, to (—). Thus, it is seen that the checking in of train No. 1 at zone 18.2 drops relay P1–1 and relay 18.2 TRX; the dropping of relay P1–1 provides an alternate stick circuit for the check relay P3–1.

Assuming that train No. 1 continues to travel in an easterly direction and its check-out apparatus located at the rear end of the train passes the tuned wayside coils associated with marker 18.2, a signal is transmitted on the carrier frequency F2 which is modulated by a frequency for activating the tuned amplifier FLMO18.2 associated with the check-out receiver, and the tuned identification amplifier 102 associated with the check-out receiver for identifying the particular train. In response to this modulated carrier frequency relay 18.2 COF is energized which results in the picking up of its front contact 34 thereby closing the pick-up circuit for relay 18.2 COR102, which pick-up circuit extends from the tuned amplifier 102, back contact 35 of relay ENZ COF, back contact 36 of relay 22.2 COF, back contact 37 of relay 22.2–S COF, back contact 38 of relay 20.2–S COF, back contact 39 of relay 20.2 COF, front contact 34 of relay 18.2 COF, and the winding of relay 18.2 COR102, to (—). The picking up of the relay 18.2 COR102 energizes relay P2–1 associated with the check-in and check-out unit for zone marker 18.2 by a circuit which extends from (+), and includes front contact 24 of relay 18.2 COR102, wire 41, and the winding of relay P2–1, to (—). The picking up of the relay P2–1 for zone marker 18.2 closes an energizing circuit for a check relay P3–1 associated with marker 14.2 (not shown) which energizing circuit extends from (+), and includes front contact 42 of relay P2–1, front contact 43 of relay P3–1, back contact 44 of relay P1–1, etc. It should be noted that the picking up of relay 18.2 COR102 opened its back contact 24 in the previously described energizing circuit for relay P3–1, the relay P3–1 being maintained in an energized position by its stick circuit which includes the back contact 27 of relay P1–1 in the unit associated with marker 18.2.

It is apparent that if train No. 1 had failed to properly check in at zone 18.2, the relay P3–1 associated with the unit for zone 18.2 would drop away at this point, because the back contact 27 of relay P1–1 would be open.

Assuming that train No. 1 continues to proceed and its locomotive passes the tuned wayside coils associated with the zone marker 20.2, the check-in receiver receives a modulated carrier frequency F1 which activates FLM20.2, thereby causing the energization of the relay 20.2 CIF associated with FLM20.2. The picking up of this 20.2 CIF relay energizes relay 20.2 CIR102 by the closure of front contact 28 of relay 20.2 CIF controlled by the tuned amplifier FLM20.2. The picking up of relay 20.2 CIR102 associated with marker 20.2 deenergizes the relay P1–1 in the check-in and check-out unit associated with marker 20.2 by opening the energizing circuit for relay P1–1 at contact 29 of relay 20.2 CIR102. The energizing circuit for this relay P1–1 in unit 20.2 extends from (+), and includes back contact 29 of relay 20.0 CIR102, wire 30, front contact 31 of relay P1–1, back contact 32 of relay P3–1 associated with marker 20.2 and the winding of relay P1–1, to (—). The relay 20.2 TRX is deenergized in response to the dropping away of relay P1–1 in unit 20.2 by the opening of front contact 33 of relay P1–1 in its energizing circuit which is similar to that described for relay 18.2 TRX.

Assuming that train No. 1 continues to travel in an eastward direction and its rear end apparatus passes the tuned wayside coils associated with zone marker 20.2, the relay 20.2 COR102 becomes energized. The picking up of relay 20.2 COR102 energizes the relay P2-1 associated with the check-in and check-out unit for zone marker 20.2 by a circuit which extends from (+) and includes front contact 50 of relay 20.2 COR102, wire 51, and the winding of relay P2-1 for zone marker 20.2 to (−). The picking up of the relay P2-1 for marker 20.2 energizes the relay P1-1 associated with the preceding marker, which for this example, is zone marker 18.2, provided that the relay P1-1 is down and the relay P3-1 is up in the check-in and check-out unit associated with marker 20.2, and provided further that the relay P3-1 associated with the unit for marker 18.2 is up. Therefore the train must have properly checked in zone 20.2 and properly checked in and out of zone 18.2 to restore the relay P1-1 in the unit associated with marker 18.2. The circuit for energizing the relay P1-1 associated with zone marker 18.2 extends from (+) and includes front contact 52 of relay P2-1, front contact 53 of relay P3-1, back contact 54 of relay P1-1, wire 55, front contact 17 of relay P3-1 associated with zone marker 18.2, and the winding of relay P1-1 to (−). The picking up of relay 20.2 COR102 opens its back contact 50 in the stick circuit of relay P3-1 associated with the zone marker 20.2. This stick circuit extends from (+) and includes back contact 50 of relay 20.2 COR102, wire 56, front contact 57 of relay P3-1, associated with marker 20.2, and the winding of relay P3-1 to (−). However, due to the fact that the train No. 1 had previously checked in at marker 20.2, the alternate stick circuit for relay P3-1 maintains the relay P3-1 in a picked up condition. This alternate stick circuit extends from (+) and includes back contact 58 of relay P1-1, front contact 57 of relay P3-1 and the winding of relay P3-1 to (−).

Assuming that train No. 1 continues to travel in an easterly direction and its locomotive passes the marker 22.2, the check-in receiver is so effected that relay 22.2 CIR102 will become energized in a manner and by circuits similar to those described for the previous CIR relay. The picking up of relay 22.2 CIR102 deenergizes the relay P1-1 associated with the zone marker 22.2 by opening its energizing circuit at back contact 45 of relay 22.2 CIR102. Similar to the energizing circuits for the other P1-1 relays, the circuit for energizing this P1-1 relay associated with zone marker 22.2 extends from (+) and includes back contact 45 of relay 22.2 CIR102, wire 46, front contact 47 of relay P1-1, front contact 48 of relay P3-1, and the winding of relay P1-1 to (−). The relay 22.2 TRX is deenergized and the check relay P3-1 is provided with an alternate stick circuit in a manner similar to the operation previously described with the other check-in and check-out circuits.

Assuming that the train continues in an easterly direction it will check-out of zone 20.2 when its rear end equipment passes the tuned wayside coil associated with zone marker 22.2. The relay 22.2 COR102 will be picked up thereby energizing the relay P2-1 associated with the zone marker 22.2 by a circuit which extends from (+) and includes front contact 60 of relay 22.2 COR102, wire 61, and the winding of relay P2-1 to (−). The picking up of the relay P2-1 for marker 22.2 picks up the P1-1 relay associated with zone 20.2 by a circuit which extends from (+) and includes front contact 62 of relay P2-1 associated with marker 22.2, front contact 63 of relay P3-1, back contact 64 of relay P1-1, wire 65, front contact 32 of the relay P3-1 associated with the zone marker 20.2 and the winding of relay P1-1 to (−). The picking up of the relay P1-1 associated with marker 20.2 closes its front contact 33, thereby picking up of relay 20.2 TRX.

From the preceding description it is apparent that each time the head end of a train passes a zone marker the associated normally energized TRX relay is dropped away which indicates the occupancy by a particular train in this particular zone. It is also apparent that when the rear end of the same identical train passes the succeeding marker, the TRX relay will be picked up, thus indicating, that a distinct train has vacated a particular zone. It should be noted that a respective check relay P3 for a particular train and a particular zone is maintained in its normally energized position if the equipment is functioning properly. The proper check-in of a train establishes an alternate stick circuit for a respective P3 relay and the checking out of the same train interrupts its original stick circuit thus checking and testing the fact that the alternate stick circuit had become operative when the train checked into that respective zone.

Regarding the fail-safe provisions which are provided for in the check-in and check-out system described, it is to be noted that a failure to check-out of a particular zone is a safe failure because the TRX relay will remain in a dropped away position. This failure is self-betraying as the system will continue to indicate occupancy in a particular zone. A failure to check-in is potentially dangerous because the normally energized TRX relay would not drop away. However, if an engine fails to check-in a particular zone, it is not possible to send a proceed signal to this particular train as will be described more fully as the description of the invention progresses. Furthermore, a failure to properly check-in to a particular zone will drop the particular P3 check relay when the rear end of the train passes the marker associated with the beginning of the zone in which a train may have failed to check-in. With the check relay P3 in a dropped away position, the TRX relay cannot be picked up again as the pick-up circuit for the P1 relay cannot be completed. For example, when the rear end of the train passes the zone marker 18.2, the P3 relay would drop away, thus opening front contact 17 of relay P3 in the pick-up circuit for P1. Simultaneously, front contact 23 in the energizing circuit for relay 18.2 TRX would open, thereby causing the relay 18.2 TRX to become deenergized. After a proper investigation of the check unit, the relays are able to be restored to normal by the operation of a respective emergency release button CPB associated with a particular zone marker. For example, the operation of the emergency release button CPB associated with zone marker 18.2 will pick up relay P1-1 by a circuit which extends from (+) and includes back contact 22 of the button CPB and the winding of relay P1-1 to (−). It will become apparent as the description of the invention progresses that this failure to check-in or check-out will enforce an automatic brake application at the end of a respective zone. Regarding the checking in and checking out of individual trains from a particular zone, let us assume that train No. 1 is occupying zone 18.2, and train No. 2 enters zone 18.2. The relay 18.2 TRX is dropped away and the relay P1-1 in unit 18.2 is dropped away. The checking in of train No. 2 deenergizes the relay P1-2 associated with zone marker 18.2 by opening its energizing circuit which extends from (+) and includes back contact 66 of relay 18.2 CIR104, which relay was picked up upon the entrance of train No. 2 into the zone, wire 67, front contact 68 of relay P1-2, front contact 69 of relay P3-2, and the winding of relay P1-2 to (−). From the circuitry illustrated in FIG. 3C, it is evident that the checking out of train No. 1 from zone 18.2 will not restore relay 18.2 TRX, because the front contact 19 of relay P1-2 which was open when train No. 2 checked into zone 18.2, is included in the energizing circuit for relay 18.2 TRX. Furthermore, the relay 18.2 TRX will not become energized until each individual train has properly operated its corresponding check-in and check-out relays to restore the relay 18.2 TRX when the zone is vacated. Thus it is seen that each train is checked into individually by the proper functioning of a particular group of related relays P1, P2 and P3 for each train at each zone location.

Control Office Operating Zone Diagram and Interlocking Circuitry

Figure 7B:
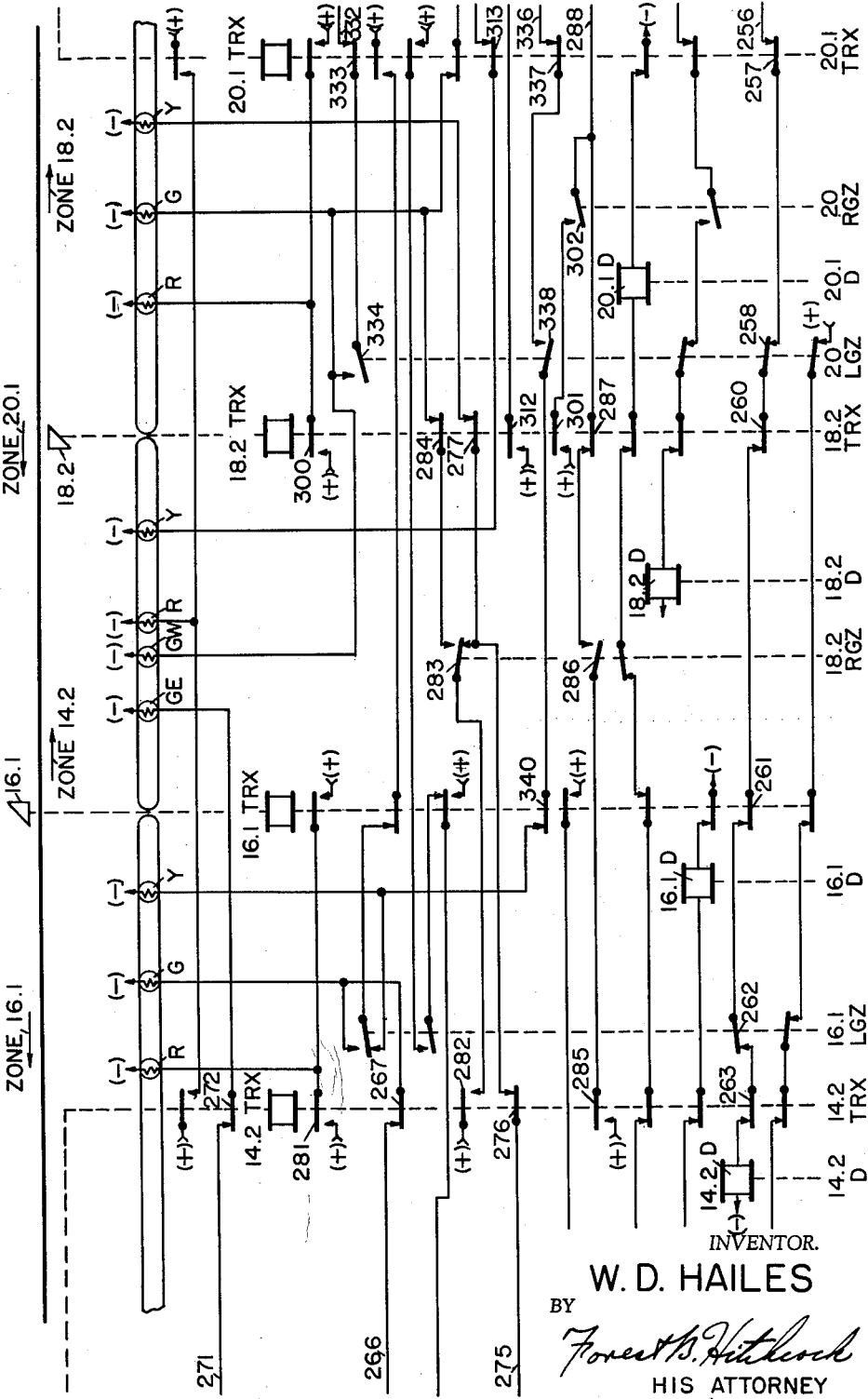
Figure 7C:
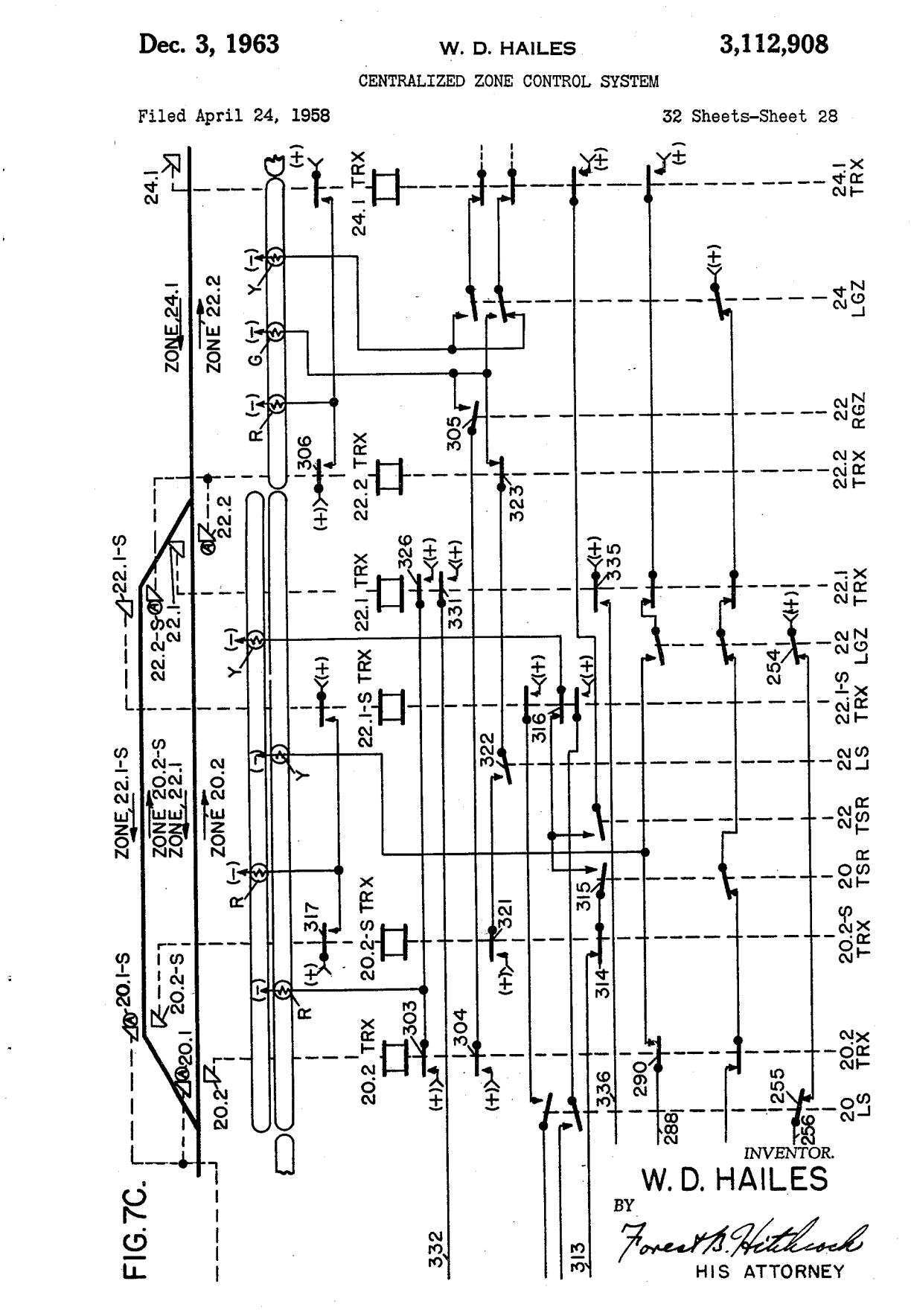

FIGS. 7A, 7B and 7C show a portion of the operating panel at the control office upon which there is located a continuous strip of light divided into zones corresponding to the actual track layout equipped with this embodiment of the invention. Each of the control zones is provided with means for selectively illuminating its respective zone to show either a red, green or yellow aspect.

Referring to FIGS. 7A, 7B and 7C there is illustrated above the illuminating strip a miniature track layout showing the number and location of the particular zones, together with the approximate location of the individual wayside markers. The wayside markers A are considered to be absolute markers, beyond which no train shall pass without receiving a proceed authority from the control office. The remaining zone markers are assumed to be "permissive markers." They are used for locations at which it is desired to have train stop, and then proceed at restricted speed, if they lack authority to proceed.

This embodiment of the invention is so organized that a proceed control cannot be transmitted under any conditions to a train occupying an approach zone which in this disclosure is either zone 10.2, zone 16.1, zone 18.2, or zone 24.1. Although it is assumed that this invention may be applied to any type of track layout, in the present disclosure, if a proceed control were given to a train occupying any of these approach zones the train would have authority to pass an absolute marker without receiving such a control from the control office. Because of the fact that a proceed control gives the train authority to proceed for two succeeding zones, a proceed signal received by a train while it was in one of these approach zones would extend the operating zone beyond an absolute marker. For example, if a westbound train were given a proceed control in the approach zone 24.1, the locomotive would have authority to proceed into zone 20.1, which is beyond the absolute marker 20.1. However, this embodiment of the invention is so organized that a control can be transmitted to a train in any one of these approach zones, which will require the train to take siding after stopping at the exit end of the approach zone.

It should be remembered, that when the operator positions the levers on the control panel, as previously described, to transmit a proceed control to a particular train, the strip of light corresponding to the zone for which the proceed authority has been given is illuminated with a green aspect. The zone in front of the authorized, or green illuminated zone, is caused to display an illuminated yellow aspect, which denotes the stopping zone for the train carrying the proceed authority. Therefore, the operator may at all times see the authorized operating zone which he has authorized for a particular train. In the present disclosure, the zone leading up to an absolute marker is never illuminated with a green aspect, because a train is prohibited from passing an absolute marker without authority to proceed; and as the proceed control can not be sent to the train in the approach zone, that is, the zone leading up to the entrance of a siding; the proceed authority must be given to a train while it is occupying the zone leading up to the absolute marker. Therefore, the zone leading up to the absolute marker is either illuminated red to show an occupied zone or illuminated in yellow to show a stopping zone.

Figure 7D:
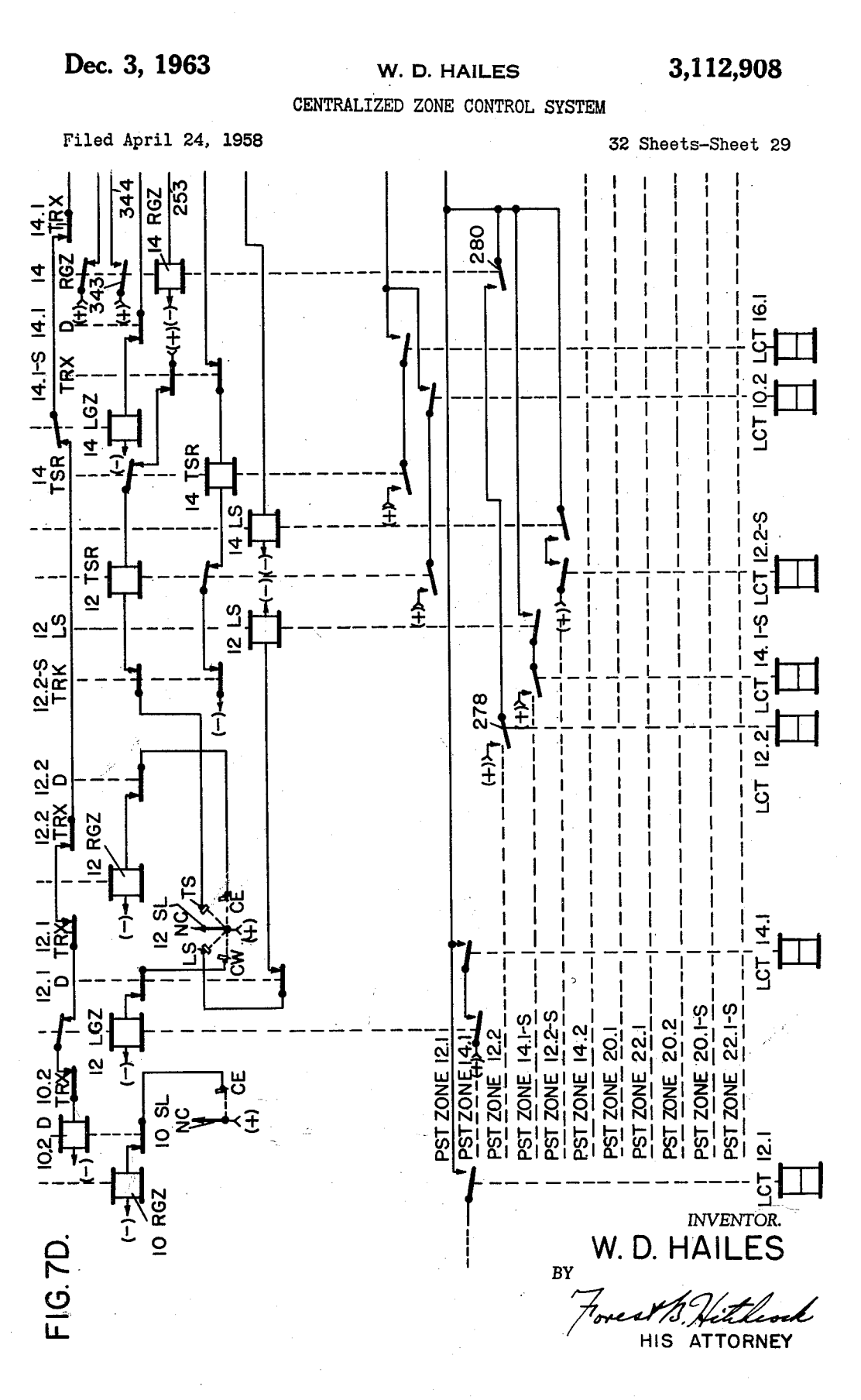

It should be remembered that the zones provided for in this invention are directional and that, for example, zone 12.2 is associated with eastbound trains only, and zone 14.1, for example, is associated with westbound trains only. Referring to FIGS. 7D, 7E and 7F there is illustrated a plurality of signal levers SL for clearing the zone leading up to the respective marker associated with its corresponding signal lever. The signal lever 10 SL is shown in its normal position NC and when manually rotated to its extreme right-hand position CE, it makes zone 10.2 an "authorized proceed" zone and the next zone, that is, zone 12.2 a "stopping" zone; and a train is unable to leave zone 12.2 without authority because marker 14.2 is an asbolute marker. The signal lever 12 SL is a multi-contact lever of any well-known type which is capable of being operated to any one of five positions. For example, the signal lever 12 SL is shown in FIG. 7D in its normal position NC, which position does not give authority to any train at any location. The signal lever 12 SL in its extreme left-hand position CW permits a train in zone 14.1 to proceed beyond marker 12.1 into zone 12.1. The signal lever 12 SL in its intermediate left-hand position LS permits a train in zone 14.1-S to leave the siding and proceed into zone 12.1. The signal lever 12 SL in its intermediate right-hand position TS authorizes a train in zone 10.2 to take the siding and occupy zone 12.2-S. The signal lever 12 SL in its extreme right-hand position CE authorizes a train in zone 10.2 to occupy zone 12.2.

The signal lever 14 SL is shown in its normal position NC and is similar to the 12 SL signal lever. The 14 SL signal lever in its extreme left-hand position CW illustrates authority for a westbound train in zone 16.1 to occupy zone 14.1. The 14 SL signal lever in its intermediate left-hand position TS controls a westbound train in zone 16.1 to occupy the siding zone 14.1-S. The intermediate right-hand position LS for 14 SL signal lever permits a train occupying a zone 12.2-S to proceed in an easterly direction to zone 14.2 and in its extreme right-hand position CE authorizes a train occupying zone 12.2 to occupy zone 14.2. The signal lever 16.1 SL is shown in its normal position and when operated to its extreme left-hand position CW authorizes a westbound train in zone 20.1 to proceed beyond marker 16.1. The signal lever 18.2 SL is shown in its normal position and when operated to its extreme right-hand position CE authorizes an eastbound train in zone 14.2 to proceed past marker 18.2 into zone 18.2.

The 20 SL signal lever, the 22 SL signal lever and the 24 SL signal lever are similar in type and operation to the signal levers previously given and serve to transmit controls to zones associated with the siding end 20, siding end 22 and zone 24.1 respectively.

There is provided for each zone marker a respective RGZ or LGZ relay which when energized serves to permit a train to enter the zone associated with the respective RGZ or LGZ relays. A relay RGZ is energized for trains running from left to right over the track layout or an easterly direction; and the relays LGZ are energized for authorizing the operation of trains from right to left or in westbound zones in the track layout. For example, the relay 14 LGZ when energized authorizes a westbound train while occupying zone 16.1 to enter and proceed through zone 14.1; and the relay 14 RGZ when energized authorizes an eastbound train while occupying zone 12.2 to enter and proceed through zone 14.2. Similarly 16 LGZ when energized authorizes a westbound train to enter and proceed through zone 16.1 and 18.2 RGZ authorizes an eastbound train to enter and proceed through zone 18.2. It might be pointed out in reminder for each stretch of track there is an eastbound and a westbound zone. In the embodiment shown the east and westbound zones between the two sidings overlap. For example, zone 20.1 extends to zone marker 16.1 and zone 14.2 extends to zone marker 18.2. In the overlapping portion of the zone diagram the light GE is illuminated if proceed authority is given for an eastbound train approaching zone 14.2 and the light GW is illuminated if proceed authority is given for a westbound train approaching zone 20.1.

Associated with each zone is a D relay which is energized when certain zones are unoccupied and certain RGZ and LGZ relays are deenergized. The D or distant control relays prevent the operator from energizing one of the LGZ or RGZ relays if traffic occupancy conditions would be unsafe because the proposed authority would result in a conflict between operating zones of two or more trains as determined by the positions of various relays, for example, the TRX relay and the RGZ and LGZ relays.

The relays TSR are energized in response to the operation of a particular signal lever SL for directing a train to occupy a particular siding zone and the relays LS are energized in response to the operation of a respective signal lever for authorizing a train occupying a siding zone to proceed on to the main track. The TSR and LS relays are also energized dependent upon the condition of a particular distant relay D to prevent the transmission of an unsafe take-siding or leave-siding control message.

The RST relays are provided for preventing the operator from transmitting a take-siding control signal to a train which has received a proceed control in the zone immediately preceding the zone in which the take-siding control would otherwise be received. There is an RST relay associated with each end of a siding in the track layout provided with this embodiment of the invention. However, only two RST relays have been shown because it is assumed that the approach zone 10.2 is the entering zone for eastbound traffic and the zone 24.1 is the entering zone for westbound traffic. As there is no provision shown for sending a proceed control beyond each of the zones 10.2 and 24.1, it is considered unnecessary to illustrate RST relays for the siding ends 12 and 22 respectively.

As previously mentioned in connection with the description of the check-in and check-out apparatus, there is a TRX relay for each directional zone. The TRX relay is normally energized when the zone is unoccupied and is deenergized in the manner previously described when its associated zone is occupied.

There is provided a proceed tone bus, which when energized, conditions the transmitter for transmitting a proceed tone; and a take-siding tone bus, which when energized, conditions the transmitter for transmitting a take-siding tone. The front contacts of the respective LGZ, RGZ and LS relays provide energy for the proceed tone bus and front contacts of the TSR relays provide energy for the take-siding tone bus. The various LCT relays shown in FIGS. 7D, 7E and 7F have front contacts in the respective energizing circuits for the proceed tones and the take-siding tones. The location control tone relays LCT have been described in connection with the check-in and check-out apparatus, and it should be remembered that a train checking into a particular zone will energize the LCT relay for the zone if a control message is to be sent. Thus it is apparent that in order to send either a proceed or take-siding control, the associated LCT relay must be picked up and the proper RGZ, LGZ, LS or TSR must also be picked up.

The illumination circuits for the zone diagram are controlled by contacts of respective TRX, LGZ, RGZ, TSR and LS relays for indicating occupancy, proceed authority, and the required stopping zone.

It is believed that the detailed circuitry in FIGS. 7A–7F can be best illustrated by describing the operation of a typical train movement throughout the zone controlled territory.

Assuming that an eastbound train is occupying zone 12.2 the relay 12.2 TRX is deenergized and the zone diagram is illuminated in red by a circuit which extends from (+) and includes back contact 475 of relay 12.2 TRX and the element R to (—). Because of the fact that the zone marker 14.2 is an absolute marker, the train will stand in zone 12.2 until the operator actuates the 14 signal lever to its extreme right-hand position.

The distant relay for zone 14.2 is relay 14.2 D and the operator will be unable to energize 14 RGZ unless a 14.2 D relay is picked up as is apparent from the energizing circuit for relay 14 RGZ which extends from (+) and includes contact 251 of the 14 SL signal lever, front contact 252 of relay 14.2 D, wire 253, and the winding of the relay 14 RGZ to (—). The relay 14.2 D is energized if zone 14.2 is unoccupied, if the signal lever 16.1 is in its normal position, if zone 16.1 is unoccupied, if zone 18.2 is unoccupied, if the 20 SL signal lever is not in its intermediate left-hand position or extreme left-hand position, if zone 20.1 is unoccupied, and if signal lever 22 SL is not in its extreme left-hand position. The circuit for energizing relay 14.2 D extends from (+) and includes back contact 254 of relay 22 LGZ, back contact 255 of relay 20 LS, wire 256, front contact 257 of relay 20.1 TRX, back contact 258 of relay 20 LGZ, front contact 260 of relay 18.2 TRX, front contact 261 of relay 16.1 TRX, back contact 262 of relay 16.1 LGZ, front contact 263 of relay 14.2 TRX and the winding of relay 14.2 D to (—). In summary, when relay 14.2 D is picked up traffic conditions are such that there are no trains in zone 14.2, zone 16.1, zone 18.2, and zone 20.1; and that no authority to proceed has been given for trains which may be occupying zone 22.1 and zone 22.1–S.

Assuming that the operator is desirous of transmitting authority for the train in zone 12.2 to enter zone 14.2, he positions the 14 SL signal lever to its extreme right-hand position which energizes relay 14 RGZ by the previously described circuit. The picking up of the relay 14 RGZ illuminates the zone diagram for zone 14.2 with a green aspect by a circuit which extends from (+) and includes back contact 264 of relay 12.2 TRX, front contact 265 of relay 14 RGZ, wire 266, front contact 267 of relay 14.2 TRX and the element G to (—). The intermediate overlapping portion of the zone diagram between the opposing markers 16.1 and 18.2 is also illuminated green because that portion of the zone diagram is also included as part of zone 14.2 for a train traveling from left to right or in an easterly direction. The circuit for illuminating this portion of the zone diagram extends from (+) and includes back contact 268 of relay 12.2 TRX, front contact 270 of relay 14 RGZ, wire 271, front contact 272 of relay 14.2 TRX and the element GE to (—). Thus it is seen that the operator is immediately informed that the train is authorized to proceed thru zone 14.2.

Simultaneously, the picking up of the relay 14 RGZ illuminates that portion of the zone diagram for zone 18.2 to show a yellow aspect. The circuit for illuminating zone 18.2 yellow extends from (+) and includes back contact 273 of relay 12.2 TRX, front contact 274 of relay 14 RGZ, wire 275, front contact 276 of relay 14.2 TRX, front contact 277 of relay 18.2 TRX, and the element Y to (—). Therefore, the information which the operator has at hand by looking at the zone diagram on the operating panel includes the zone which a train is occupying as shown by the red illumination the zone through which the train has been authorized to proceed as shown by the green illumination and the stopping zone for the train has shown by the yellow illumination.

The energizing of the relay 14 RGZ with a train in zone 12.2 causes the proceed tone bus to be energized for transmitting a proceed signal message to the train which energizing circuit extends from (+) and includes front contact 278 of relay LCT12.2, and front contact 280 of relay 14 RGZ.

When the eastbound train in zone 12.2 enters zone 14.2, the relay 14.2 TRX will become deenergized which will extinguish the green illumination for the zone diagram 14.2 by the opening of front contacts 267 and 272 of relay 14.2 TRX. Simultaneously, with the extinguishing of the green illumination, the zone diagram for zone 14.2 is illuminated in red by the closure of back contact 231 of relay 14.2 TRX in the obvious energizing circuit for the element R of zone 14.2. The zone 18.2 continues to be illuminated in yellow by a circuit which extends from (+) and includes back contact 282 of relay 14.2 TRX, back contact 283 of relay 18.2 RGZ, front contact 277 of relay 18.2 TRX, and the element Y to (—). At this point, the operator can readily see that the train is occupying both zones 12.2 and 14.2 by the red illumination and that zone 18.2, as shown by the yellow illumination, is reserved to stop the train.

Assume that the train continues in an easterly direction and the rear end of the train passes marker 14.2, the zone diagram for zone 12.2 is extinguished by the opening of back contact 475 of relay 12.2 TRX. Thus, the zone diagram now shows a red illumination for zone 14.2 and a yellow illumination for zone 18.2. If no further controls were transmitted by the operation of the signal levers, zone 18.2 would change to a red aspect when the train passes zone marker 18.2 and that portion of the zone diagram for zone 14.2 would be extinguished when the train vacated that zone. This would reveal to the operator that the train will stop at the exit end of zone 18.2 short of marker 20.2. Since marker 20.2 is a permissive marker, the train will proceed at restricted speed after stopping. The zone 20.2 will be illuminated in red when the train occupies this particular zone and the absolute marker 22.2 will prevent the train from moving any further in the track layout.

However, assuming that the operator actuates the signal lever 18.2 SL to its right-hand position with the train occupying zone 14.2, the relay 18.2 RGZ is energized by a cricuit which extends from (+) and includes contact 284 of the signal lever 18.2 SL, front contact 285 of relay 18.2 D, and the winding of relay 18.2 RGZ to (—). The relay 18.2 D is required to be picked up in order to energize 18.2 RGZ. The energizing of the relay 18.2 D is dependent upon traffic conditions and the position of certain signal levers to be sure that safe traffic conditions prevail in the track layout by the inclusion of various front contacts and back contacts in the energizing circuit for the relay 18.2 D which energizing circuit is obvious from FIGS. 7B and 7C.

The picking up of relay 18.2 RGZ with the train in zone 14.2 illuminates that portion of the zone diagram for zone 18.2 with a green aspect by a circuit which extends from (+) and includes back contact 282 of relay 14.2 TRX, front contact 283 of relay 18.2 RGZ, front contact 284 of relay 18.2 TRX, and the element G to (—). Simultaneously, that portion of the zone diagram associated with zone 20.2 is illuminated with a yellow aspect by a circuit which extends from (+) and includes back contact 285 of relay 14.2 TRX, front contact 286 of relay 18.2 RGZ, front contact 287 of relay 18.2 TRX, wire 288, front contact 290 of relay 20.2 TRX, and the element Y to (—). Thus, it is seen that by moving the signal lever 18.2 SL to energize the relay 18.2 RGZ, the operating zone for the train moving in an easterly direction, and located in zone 14.2, is extended up to the absolute marker 22.2. Also, when the train checks into zone 14.2, the LCT relay is picked up, and the proceed tone bus is energized by circuit extending from (+) and including front contact 291 of relay LCT 14.2, and front contact 292 of relay 18.2 RGZ.

When the eastbound train checks into the zone 18.2, that portion of the zone diagram for zone 18.2 is caused to extinguish its green illumination by the opening of front contact 284 of relay 18.2 TRX and it is illuminated with a red aspect by a circuit extending from (+) and including back contact 300 of relay 18.2 TRX and the element R to (—). That portion of the illuminated zone diagram for zone 20.2 remains the stopping zone for the train traveling in zone 18.2 because the absolute marker 22.2 requires that the train shall stop and stay at the entrance to zone 22.2. A circuit for illuminating the zone diagram for zone 20.2 with the train in zone 18.2 extends from (+) and includes back contact 301 of relay 18.2 TRX, front contact 302 of relay 20 RGZ, wire 288, front contact 290 of relay 20.2 TRX and the element Y to (—).

The presence of the absolute zone marker 22.2 dictates that no proceed control should be given to a train in zone 18.2 because such a control extends the operating zone to include zone 22.2 which is beyond the absolute marker, and would authorize a train to move beyond the absolute marker 22.2 without receiving a proceed control from the control office while in zone 20.2 approaching marker 22.2. When the train occupies zone 20.2, the yellow illumination of the zone diagram is extinguished by the opening of front contact 290 in the previously described energizing circuit and the diagram is illuminated with a red aspect by the closure of back contact 303 of relay 20.2 TRX. There is no provision for illuminating zone 22.2 until the train in zone 20.2 has received a proceed control message.

Assuming that the operator actuates the 22 SL signal lever to its extreme right-hand position CE and the traffic requirements are met for maintaining the 22.2-D relay picked up, the relay 22 RGZ is energized, thereby causing that portion of the diagram for zone 22.2 to be illuminated with a green aspect by a circuit which extends from (+) and includes back contact 304 of relay 20.2 TRX, front contact 305 of relay 22 RGZ and the element G to (—). Zone 22.2 is the last eastward zone illustrated in this embodiment and it is assumed that a marker denoting the end of zone control is located at the exit end of zone 22.2. The function of the marker denoting the end of zone control is described in connection with the FIGS. 6A-6G. It is apparent from the preceding description that when the train occupies zone 22.2, the diagram associated therewith is illuminated with a red aspect by the closure of back contact 306 of relay 22.2 TRX.

Assuming that the operator desires to cause the east bound train to take the siding and occupy zone 20.2-S, the operator will refrain from actuating signal lever 18.2 to its right-hand position, thereby maintaining zone 18.2 as the stopping zone or end of the operating zone for this particular train; and the 20 SL signal lever is operated to its intermediate right-hand position, thereby energizing the take-siding relay 20 TSR. The circuit for energizing the relay 20 TSR extends from (+) and includes contact 307 of the 20 SL signal lever, front contact 309 of relay 14.2 RST, front contact 308 of relay 20.2-S TRX, the winding of relay 20 TSR, back contact 310 of relay 22 TSR, and front contact 311 of relay 22.1-S TRX to (—). The only traffic precaution and requirement which must be met in order to energize the take-siding relay is to be sure that zone 20.2-S and zone 22.1-S are unoccupied and that the operator has not actuated a take-siding control for zone 22.1-S. The entrance of the train into zone 18.2 changes the yellow aspect of this portion of the zone diagram to a red aspect by the previously described circuit and further illuminates the diagram for zone 20.2-S with a yellow aspect. The illumination of this zone yellow is caused by a circuit which extends from (+) and includes back contact 312 of relay 18.2 TRX, wire 313, front contact 314 of relay 20.2-S TRX, front contact 315 of relay 20 TSR, front contact 316 of relay 22.1-S TRX and the element Y to (—). The siding portion of the zone diagram is never illuminated with a green aspect because a train must always stop and stay in a siding until it receives a proceed control in zone 20.2-S or zone 22.1-S before passing the absolute markers located at each end of the siding. The siding zone will be illuminated in red when the train occupies zone 20.2-S by an obvious circuit which includes back contact 317 of relay 20.2-S TRX.

With the train in zone 18.2 and the 20 take-siding relay energized, the take-siding tone bus is energized to cause the transmitter to send a take-siding tone by a circuit which extends from (+) and includes front contact 318 of relay LCT18.2, and front contact 320 of relay 20 TSR. The operation of the 22 SL signal lever to its intermediate right-hand position energizes the relay 22 LS if traffic conditions permit as is evidenced by the picked up position of relay 22.2-D, thereby causing a proceed control to be sent to the train located on the siding in zone 20.2-S.

Simultaneously, the zone diagram for zone 22.2 is illuminated with a green aspect by a circuit which extends from (+) and includes back contact 321 of relay 20.2–S TRX, front contact 322 of relay 22 LS, front contact 323 of relay 22.2 TRX, and the element G to (−). The circuit for causing the transmitter to send a leave-siding or proceed control trone is similar to those previously described and extends from (+) and includes front contact 324 of relay LCT20.2–S, and front contact 325 of relay 22 LS to the proceed tone bus.

The zone diagram is illuminated in the same manner for trains traveling from right to left or in a westerly direction, and the controls are caused to be transmitted in a similar manner. For example, if a westbound train is located in zone 22.1, the diagram of that zone will be illuminated red, by a circuit which extends from (+) and includes back contact 326 of relay 22.1 TRX and the element R to (−). In response to the operation of the 20 SL signal lever to its extreme left-hand position, the relay 20 LGZ will become energized if the traffic requirements are met as is evidenced by the picked up condition of the relay 20.1–D. The circuit for energizing relay 20 LGZ extends from (+) and includes contact 327 of the 20 SL signal lever, wire 328, front contact 330 of relay 20.1–D and the winding of relay 20 LGZ to (−). The presence of a train in zone 22.1 with the relay 20 LGZ picked up causes the zone diagram for zone 20.1 to be illuminated green by a circuit which extends from (+) and includes back contact 331 of relay 22.1 TRX, wire 332, front contact 333 of relay 20.1 TRX, front contact 334 of relay 20 LGZ and the element G to (−). Also, the element GW which is illuminated in the overlapping portion of the zone diagram is illuminated by a similar circuit for a westbound train. Simultaneously, the zone diagram for zone 16.1 is illuminated with a yellow aspect by a circuit which extends from (+) and includes back contact 335 of relay 22.1 TRX, wire 336, front contact 337 of relay 20.1 TRX, front contact 338 of relay 20 LGZ, front contact 340 of relay 16.1 TRX and the element Y, to (−). The proceed tone bus is energized for the westbound train in zone 22.1 by a circuit which extends from (+), and includes front contact 341 of relay LCT22.1 and front contact 342 of relay 20 LGZ. It is believed that the illustrations given for the operation of a westbound train in connection with the illumination of the zone diagram and the transmission of a proceed control is considered sufficient in the light of the similarity of operation for trains traveling in both directions.

Assuming that an eastbound train is located in zone 12.2 and the operator is desirous of sending a control to route the train onto the siding 20.2–S, the operator actuates the 14 SL signal lever to its extreme right-hand position CE thereby energizing relay 14 RGZ by the previously described circuit. The picking up of relay 14 RGZ energizes the relay 14.2 RST by a circuit which extends from (+), and includes front contact 343 of relay 14 RGZ, wire 344, front contact 345 of relay 14.2 D, and the winding of relay 14.2 RST, to (−). Upon receipt of the proceed control, the train enters zone 14.2 thereby opening front contact 345 of relay 14.2 D in the energizing circuit for relay 14.2 RST. However, if the signal lever 18.2 is in its normal position the relay 18.2 RGZ will be dropped away thereby providing a stick circuit for relay 14.2 RST which extends from (+), and includes back contact 346 of relay 18.2 RGZ, front contact 347 of relay 14.2 RST, and the winding of relay 14.2 RST, to (−). Before the train enters zone 14.2 the relay RST is held up by a stick circuit which extends from (+), and includes front contact 348 of relay 14.2 TRX, front contact 347 of relay 14.2 RST, and the winding of relay 14.2 RST, to (−).

With the eastbound train in zone 14.2 the operator is unable to transmit a proceed signal to the train in zone 14.2 without interrupting the previously described stick circuit for relay 14.2 RST. The dropping away of relay 14.2 RST prevents the take-siding control relay 20 TSR from becoming energized in response to the operation of the 20 SL signal lever to its intermediate right-hand position by the opening of front contact 309 of relay 14.2 RST in the pick-up circuit for relay 20 TSR. Hence if the operator has authorized a train to proceed (at speed) throughout zone 18.2, he is unable to send a take-siding control to the train while the train is traveling through the zone 18.2 at high speed. Without this safeguard an error by the operator might transmit a take-siding control message which would be incompatible with the proceed authority which the train had already received. The circuitry is similar for preventing a westbound train from receiving a take-siding control in zone 16.1 after having received a proceed control in zone 20.1 and it is considered unnecessary to describe the circuitry for relay 20.1 RST in detail.

*Control Office Apparatus for Transmitting Control Signals*

Referring to FIG. 3C there is associated with each zone a start transmission relay designated CH. For example, the relay CH18.2 is provided for commencing the transmission of a message to a train in zone 18.2. The start transmission relay CH provided in this embodiment of the invention is a normally deenergized double wound relay provided with a positively charged condenser and a resistor on one side of its winding. The condenser 80 associated with the relay CH18.2 is maintained normally charged by a circuit which extends from (+), and includes front contact 81 of relay 18.2 TRX, wire 82, back contact 83 of relay 18.2 CIR104, back contact 84 of relay 18.2 CIR102, wire 85, the condenser 80, and resistor 86, to (−). The entrance of a locomotive into a zone 18.2 results in the picking up of either relay 18.2 CIR104 or relay 18.2 CIR102 depending on the identity of the train. In response to the picking up of either one of these relays the circuit for maintaining the condenser 80 in a peak charge extends from (+) and includes either front contact 83 and back contact 84, or front contact 84 of the respective 18.2 CIR relays, wire 85, the condenser 80 and the resistor 86 to (−). The impulse for energizing the relay CH is of short duration and the drop away time for the CH relay is measured by the time constant of the series connected capacitor and resistor. For example, the capacitor 80 is discharged through the upper winding of relay CH18.2 at the instant that the front contact 81 of relay 18.2 TRX is dropped away or at the instant the contact 83 or 84 of the respective 18.2 CIR relays are dropped away. The circuit for discharging the capacitor 80 which results in the picking up of relay CH18.2 includes the capacitor 80, wire 85, back contact 84 of relay 18.2 CIR102, back contact 83 of relay 18.2 CIR104, wire 82, back contact 81 of relay 18.2 TRX, front contact 87 of relay P3–1, front contact 88 of relay P3–2, the upper winding of relay CH18.2 back to the capacitor 80 through the resistor 86. As previously described each time a train enters a zone the normally energized TRX relay associated with that zone is dropped away. Also, as previously mentioned, if a particular train should fail to check-out of a particular zone, the check relay P3 for such a train in the respective zone will drop away. If the relay 18.2 TRX should fail to drop away the relay CH18.2 cannot be picked up because the previously described discharge circuit for the capacitor 80 will not be completed. If the 18.2 TRX relay should be dropped away and a train of different identification should enter a zone 18.2 thereby picking up one of the 18.2 CIR relays the capacitor will again become charged by a circuit which will include either the front contact 83 or front contact 84 of the respective 18.2 CIR relays thereby allowing the relay CH18.2 to become energized upon the closing of a back contact of a respective 18.2 CIR contact. In the event a train should fail to check-out of a zone 18.2, the discharging circuit for the capacitor 80 would be open at either front contact 87 or front contact 88 of a respective P3 relay, thereby preventing the transmission of a control to a train in that zone.

Thus, it is to be noted that the control office will be unable to start the transmission of a control message to a train if the particular train should fail to properly check-in or check-out of a particular zone. There is also provided in the locomotive a means for causing the control office to repeat the transmission of a control message to that train, which means will be described in detail as the description of the invention progresses; and from the preceding it can be seen that the relay CH18.2 can be reenergized by a CIR relay if the train has properly checked in to a respective zone.

The CH relays for the other zones operate in a similar manner to the relay CH22.2 as is evident from FIGS. 3C, 3D and 3E.

Figure 6A:
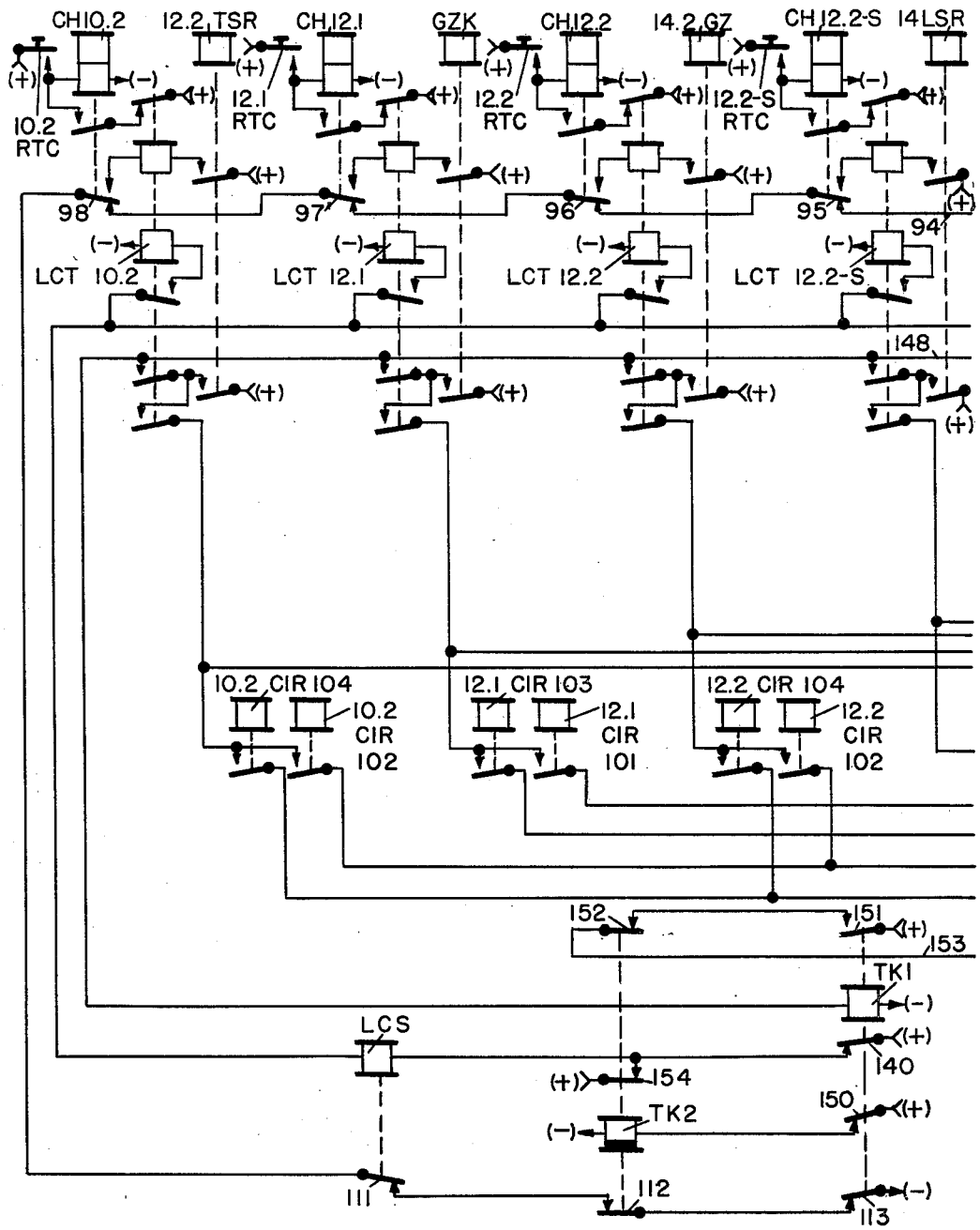
Figure 6B:
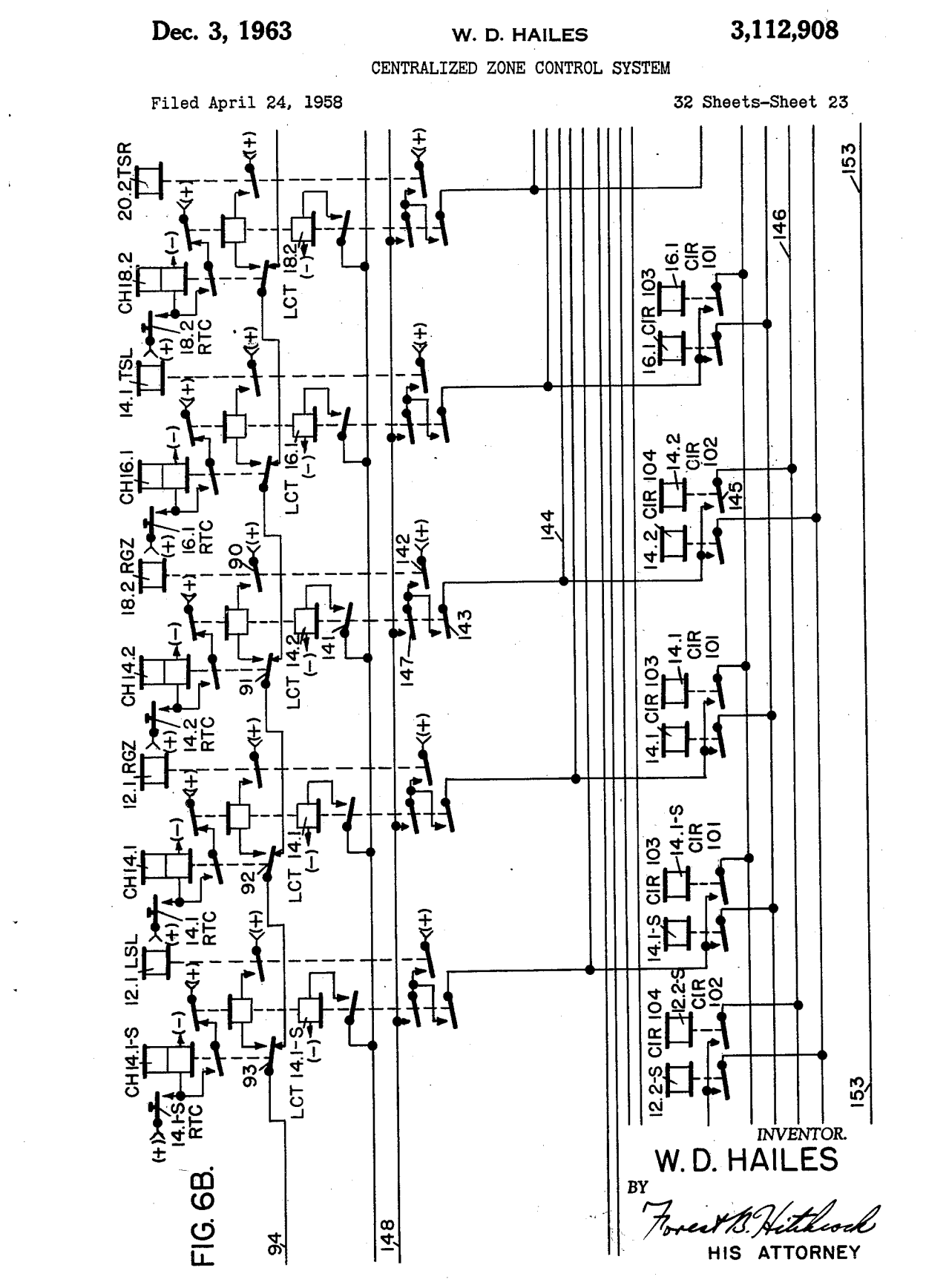
Figure 6C:
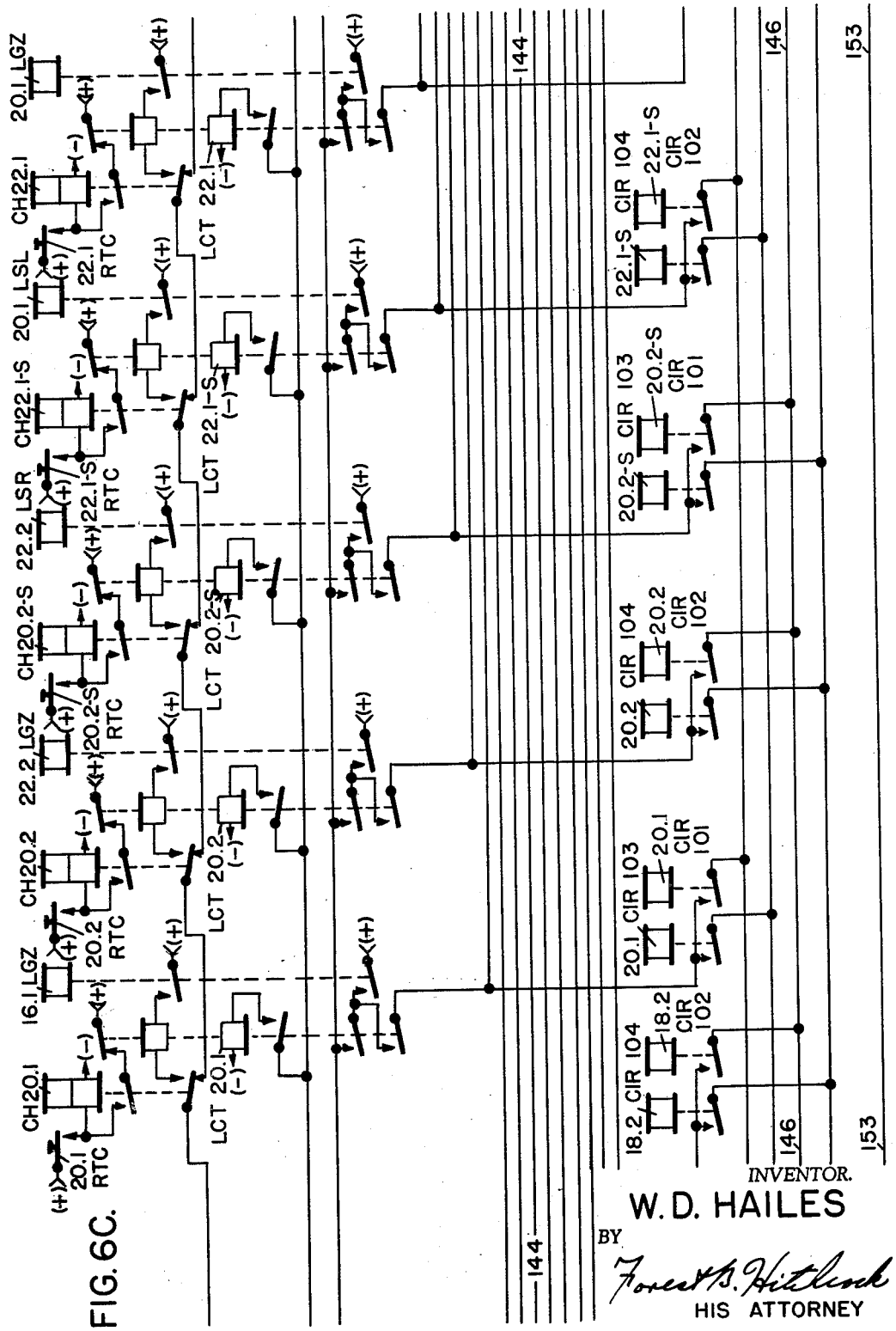

FIGS. 6A–6D illustrate the circuitry for transmitting a message to a definite train in a particular location. There is provided at the control office a transmitter capable of transmitting a distinct carrier frequency F3. This carrier frequency is modulated by a combination of tone generators having distinct frequencies. As shown in FIG. 6D there is a tone generator provided for each of the zone locations in the stretch of track having its traffic controlled by this embodiment of the invention. One of these tone generators is activated to modulate the carrier frequency F3 for sending a message to a train located in the zone corresponding with the aforesaid activated tone generators.

There is also provided a tone generator for modulating the carrier frequency with a distinct tone which selects the identity of a particular train in the selected zone. For example, in the embodiment shown, train No. 1 traveling in a westerly direction is given the identity tone 101, the identity of train No. 2 traveling in a westerly direction is associated with tone 103. While train No. 1 and train No. 2 traveling in an easterly direction is identified by the modulation of the carrier frequency F3 by tones 102, 104 respectively. There is also provided a proceed signal tone generator for further modulating the carrier frequency in a distinctive manner for transmitting a proceed message to a particular train which train is identified by the modulation of the carrier frequency in accordance with a respective activated field location tone generator and a respective train identification tone generator. There is also provided a take-siding signal tone generator for transmitting a message requiring a particular train to move on to a definite siding. Although there is shown in this embodiment two distinctive controls that are able to be transmitted, it is contemplated that a plurality of different controls can be provided according to the needs of individual practice. Thus, each control signal comprises the modulation of carrier frequency F3 by a distinct location frequency, train identification frequency, and the particular control frequency.

There is associated with each zone an LGZ or an RGZ relay which must be energized before a proceed signal can be transmitted to the zone controlled by a respective RGZ or LGZ relay. There is also provided for each appropriate zone a take-siding relay TSR or a leave-siding relay LS which must be energized before a control message is transmitted to a train requiring it to enter or leave a particular siding.

As previously mentioned, the upper winding of the CH relays is controlled by the check-in and check-out apparatus. Once the CH relay has been energized in the manner previously described, it is held in an energized position until the particular control has actually been transmitted. This is accomplished by providing a stick circuit for the lower winding of each CH relay.

Associated with each CH relay is a location control tone LCT relay which is energized in response to its respective CH relay and serves to condition the selection circuitry for transmitting a particular control. There is a location control stick relay LCS, a winding of which is included in the stick circuit for all LCT relays and a back contact 111 of which is included in the pick-up circuit for all LCT relays. The function of the LCS relay is to insure that only one LCT relay can be picked up at any one time. It insures that control messages are transmitted one at a time in case there are two or more stored starts. The relays TK1 and TK2 are keying relays, and are provided to operate the "transmit" relay of the transmitter to activate the transmitter and transmit the carrier frequency modulated by the designated tones.

Assuming that train No. 1 is traveling in an easterly direction and the operator wishes to transmit a proceed message to this train when it arrives in zone 14.2, he positions the signal level 18.2 SL on the control panel in a right-hand position (see FIG. 1A). If the interlocking circuitry between the operating zones is satisfied, the operation of this lever 18.2 SL will energize relay 18.2 RGZ. When train No. 1 checks into zone 14.2, the relay CH14.2 will be energized in a manner previously described. The picking up of relay CH14.2 with the relay 18.2 RGZ in a picked up position, energizes the upper winding of relay LCT 14.2 by a circuit which extends from (+) and includes front contact 90 of relay 18.2 RGZ, upper winding of relay LCT 14.2, front contact 91 of relay CH14.2, back contact 92 of relay CH14.1, back contact 93 of relay CH14.1–S, wire 94, back contact 95 of relay CH12.2–S, back contact 96 of relay CH12.2, back contact 97 of relay CH12.1, back contact 98 of relay CH10.2, back contact 111 of relay LCS, front contact 112 of relay TK2 and back contact 113 of relay TK1 to (−). Simultaneously, relay LCT14.2 is held in an energized position by a stick circuit which extends from (+) and includes back contact 140 of relay TK1, the winding of relay LCS, front contact 141 of relay LCT14.2 and the winding of relay LCT14.2 to (−). It is also apparent that the stick circuit for relay LCT14.2 also energizes the relay LCS. The picking up of the relay LCT14.2 completes a circuit for activating the tone generator 12 associated with zone 14.2 by a circuit which extends from (+) and includes front contact 142 of relay 18.2 RGZ, front contact 143 of relay LCT14.2, wire 144, and the tone generator designated 12. Simultaneously, with the picking up of relay LCT14.2 an activating circuit is completed for the tone generator associated with the identification of train No. 1 traveling in an easterly direction by the picking up of relay 14.2 CIR102. This circuit extends from (+) and includes front contact 142 of relay 18.2 RGZ, front contact 143 of relay LCT14.2, front contact 145 of relay 14.2 CIR102, which was picked up upon the entrance of train No. 1 into zone 14.2 as previously described, wire 146, and the tone generator referred to as tone 102. The control transmitter carrier frequency F3 is also modulated by the frequency of the proceed control tone generator, which is activated by the closing of front contact 291 of relay LCT14.2 and the front contact 292 of relay 18.2 RGZ (FIGS. 7E and 7F). It should also be noted that the picking up of relay LCT14.2 energizes the relay TK1 by a circuit which extends from (+) and includes contact 142 (18.2 RGZ), contact 147 of relay LCT14.2, wire 148, and the winding of TK1 to (−). The picking up of the relay TK1 deenergizes the slow drop away TK2 by the opening of front contact 150 of relay TK1. The transmitter is activated to transmit the carrier frequency F3 which is modulated by the distinctive tones as previously described during the time interval when the relay TK1 is picked up and prior to the dropping away of the relay TK2. The duration of the transmitted signal is determined by the drop away time of relay TK2. The circuit for keying or activating the transmitter extends from (+) and includes front contact 151 of relay TK1, front contact 152 of relay TK2, wire 153, and the winding of the transmit relay T. The dropping away of relay TK2 opens its front contact 154 which opens the previously described energizing circuit LCS.

Associated with each CH relay is a repeat push button RTC. The RTC push button serves to energize its associated CH relay one the operator wishes to transmit a control to a particular train at a particular location after the train has already checked into a respective zone to which he wishes to transmit. For example, the circuit for energizing the relay CH14.2 extends from (+) and includes the back contact of push button 14.2 RTC and the lower winding of relay CH14.2 to (—). The operation of the other relays in response to the manual operation of relay CH14.2 is similar to the operation and circuitry previously described.

It is considered unnecessary to describe the circuitry in detail for the sending of a control to the other zones illustrated in FIGS. 6A–6D because they are similar in structure and operation to the control for the example previously given and are obvious from an inspection of the FIGS. 6A–6D.

Locomotive Apparatus

Referring to FIG. 4D there is located on the locomotive a suitable receiving apparatus for receiving a carrier frequency F3 modulated by a combination of distinctive train identification, location identification, and control frequencies. The train identification push button selector diagrammatically illustrated in FIGS. 4B and 4E is a well-known type of an interlocking push button selector switch wherein a particular train identification is selected prior to the entering of the locomotive into the stretch of track controlled by this embodiment of the invention; and the same identification selection is maintained for a particular train throughout the entire system. In other words, once a particular train identification has been established the selector maintains this established identification throughout the controlled territory.

Associated with the engine control receiver is a tuned amplifier which is activated in response to the modulated frequency of a particular location tone for each zone in the stretch of track. There is also provided a distinctively tuned amplifier activated in response to the reception of each train identification tone in accordance with the particular identification which is determined by the selection identification switch.

A tuned amplifier is provided which is activated in response to the reception of a proceed control tone and a tuned amplifier activated in response to the reception of the take-siding control tone.

With each tuned amplifier for identifying a particular train there is associated an engine tone relay ETR which is energized in response to the activation of its associated tuned amplifier. The engine tone repeater relays ETP repeat the operation of the relays ETR.

There is provided a location tone relay LTR for each distinctively tuned amplifier for each zone location. The location tone repeater relays LTP repeat the operation of the location relays LTR for conditioning the circuitry in a manner which will be described hereafter.

A relay PST is provided for detecting a proceed control and is energized in response to the activation of its associated tuned amplifier. A TST relay is provided for detecting a take-siding control message and is energized in response to the activation of its associated take-siding tuned amplifier.

A relay ENP is provided for detecting the proper selection of a train identification. A relay LNP is provided for detecting the proper reception of a zone location.

Therefore, it is apparent that the reception of a modulated carrier frequency F3 transmitted from the control office is received by way of the antenna COT and a respective combination of tuned amplifiers are activated for determining the control which is received, the identification of the train for receiving that control, and the zone location in which the identified train is to receive the control.

The circuitry for detecting the train identification, the location and the control for the identified train will be described in connection with the operation of a particular train through the zone control territory.

Prior to the train entering the zone control territory, its distinctive identification tone is selected. For example, assuming that train No. 1 traveling in an easterly direction is about to enter the zone controlled territory, the train identification push button selector 102 is depressed, thereby permanently conditioning the identification circuitry.

Further assuming train No. 1 has properly checked in to zone 20.2, the conditioning of the previously described apparatus is such that the 20.2 LT relay is energized and is held in a picked up position by a stick circuit which extends from (+) (see FIG. 4G) and includes closed contact 155 of relay R2, wire 156, front contact 157 of relay ASTK, wire 158, front contact 159 of relay 20.2 LT and the winding of relay 20.2 LT to (—). The operation of the contact 155 of relay R2 and contact 157 of relay ASTK will be described in detail in connection with the description of the train stop apparatus. Assuming that the operator is giving a proceed control to train No. 1 in zone 20.2, the signal lever 22 is manually positioned to its extreme right-hand position and parallel with the track diagram (see FIG. 1A); and the control office transmitter is caused to transmit a carrier frequency F3 modulated by tones 102 for train identification, tone No. 16 for train location and the frequency for the proceed control as previously described. The engine control receiver receives this distinctively modulated carrier frequency F3 with the result that the tuned amplifier for location 20.2 is activated, the tuned train identification amplifier bearing tone 102 is activated and the proceed tuned amplifier is activated. In response to the activation of the tuned amplifier No. 102 (see FIG. 4B), relay 102 ETP is energized by a circuit which extends from (+) and includes back contact 160 of relay 104 ETR, back contact 161 of relay 103 ETR, front contact 162 of relay 102 ETR, the winding of relay 102 ETP, front contact 169 of relay 102 ETR and the back contact 163 of relay 101 ETR to (—). The picking up of the relay 102 ETP energizes the train identification detection relay ENP by a circuit which extends from (+) and includes front contact 164 of relay 102 ETP, the closed contact 102 for the train identification push button selector, wire 165, and the winding of relay ENP to (—).

The activation of the tuned amplifier for location 20.2 energizes relay 20.2 LTR. The picking up of relay 20.2 LTR energizes the 20.2 LTP relay by a circuit which extends from (+), and includes back contact 166 of relay 18.2 LTR, back contact 167 of relay 20.1 LTR, front contact 168 of relay 20.2 LTR, the winding of relay 20.2 LTP, front contact 170 of relay 20.2 LTR, and back contacts 171 through 178 of the LTR relays associated with the succeeding zones, to (—). The picking up of the relay 20.2 LTP energizes the location control relay LNP by a circuit which extends from (+), and includes back contact 180 of relay 18.2 LT, back contact 181 of relay 20.1 LT, front contact 182 of relay 20.2 LT, front contact 183 of relay 20.2 LTP, wire 184, and the winding LNP, to (—).

As previously mentioned the proceed control relay PST is also energized in response to the activation of the proceed tuned amplifier.

With the picking up of the relay LNP and the relay ENP it is determined that the proper train in the proper location has received the particular control transmitted from the control office. The picking up of the relays LNP, ENP and PST closes a pick-up circuit for the upper winding of a relay PR (see FIG. 4F) which circuit extends from (+) and includes front contact 185 of relay LNP, front contact 186 of relay ENP, front contact 187 of relay PST, wire 188, front contact 189 of relay ASTK, and the upper winding of relay PR, to (−). It should also be mentioned that if the take-siding control were sent to a particular train, a take-siding control circuit would be closed which extends from (+), and includes front contact 185 of relay LNP, front contact 186 of relay ENP, back contact 187 of relay PST, front contact 190 of relay TST, wire 191, front contact 192 of relay ASTK, and the upper winding of relay TSR, to (−). The purpose and the operation of the relays TSR and PR will be described in detail in connection with the operation of the cab signaling equipment and the train stop apparatus.

It is evident from FIGS. 4A, 4B, 4C and 4D that the operation of the train control receiving apparatus is similar for other trains traveling in either direction in different locations to that described for the example previously given and no further description is considered necessary.

Cab Signaling Equipment

A cab signal is provided in the engine which is capable of displaying six aspects including one aspect which is displaced when an equipped train is operating in non-zone control territory. The various aspects are produced automatically by selectively illuminating the several sections of the cab signal unit in accordance with the operation of the zone control unit carried by the engine in response to controls which have been impressed upon the engine control unit.

Figure 4F:
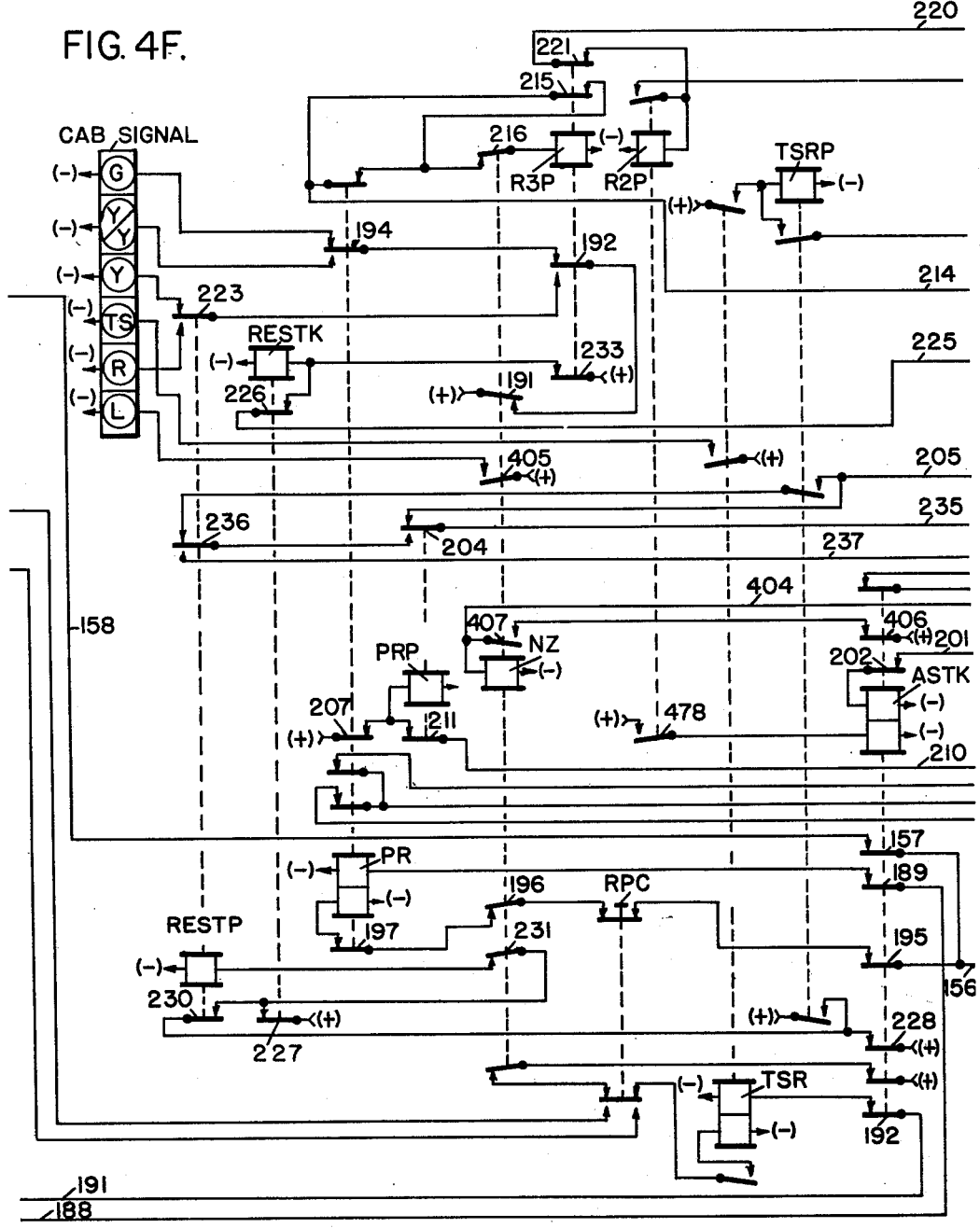

Referring to FIG. 4F the several aspects of the cab signal are shown as follows:

| Aspects | Indication | Name |
|---|---|---|
| G (green) | Proceed | Clear. |
| Y/Y (yellow over yellow). | Proceed preparing to stop at the second marker. | Advance-approach. |
| Y (yellow) | Proceed preparing to stop at the next marker. Trains exceeding medium speed must at once reduce to that speed. | Approach. |
| Y/TS (yellow over letters TS). | Proceed to side track. | Take-siding. |
| R (red) | Stop; then proceed at restricted speed but not beyond any absolute marker. | Stop. |
| L (lunar white) | Proceed as directed through territory not equipped with Zone Control. | |

Train Stop Equipment

Associated with each zone marker there is located an inert wayside inductor which is capable of influencing a train carried receiver apparatus each time the locomotive passes the inert wayside inductor.

Figure 4G:
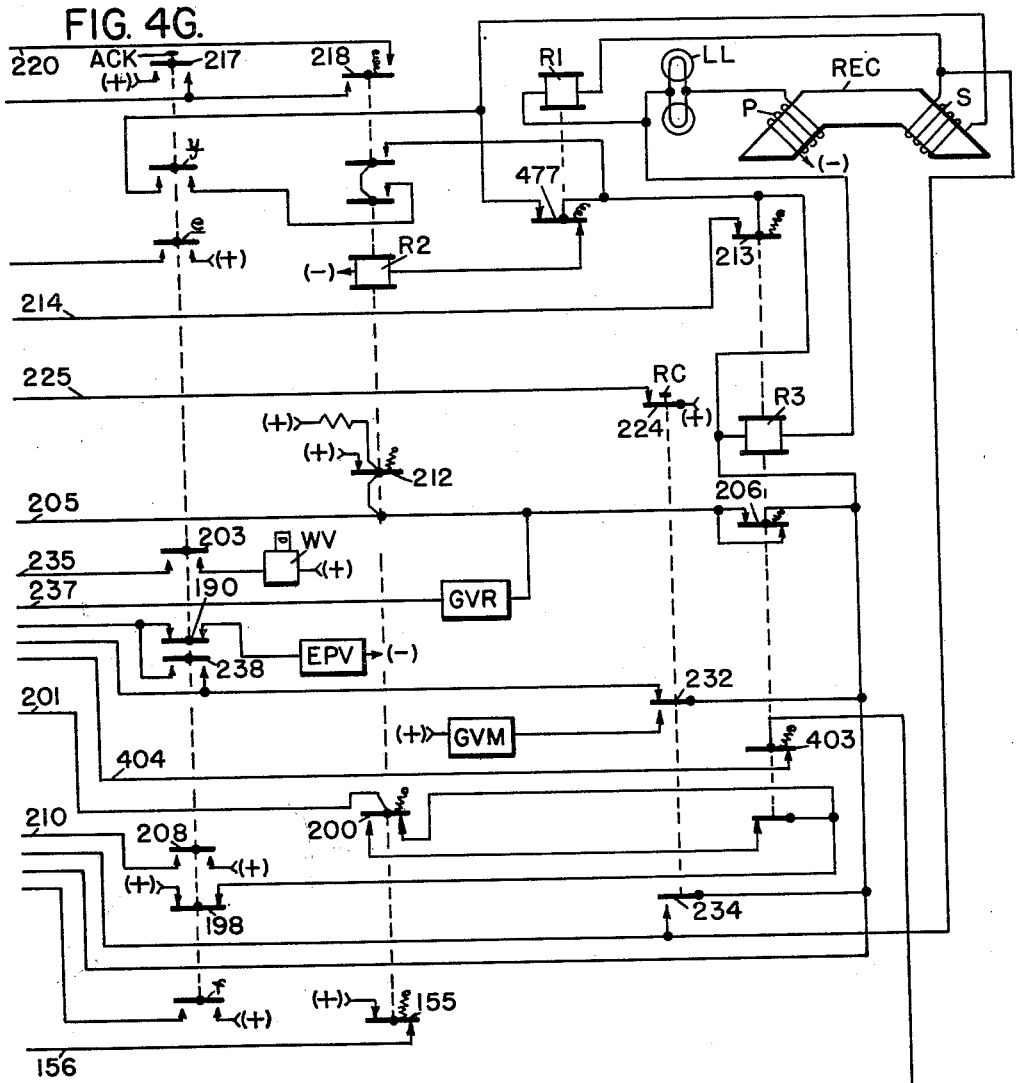

The train carried receiver REC is shown diagrammatically in FIG. 4G. The receiver REC is mounted on the locomotive in such a manner that it passes through a relatively close inductive coupling relationship with each of the wayside train stop inductors as shown in FIG. 2. The train carried receiver REC is provided with both a primary winding P and a secondary winding S which are magnetically coupled to each other through the core structure of the receiver.

Referring to FIGS. 4G, the train carried apparatus also includes a well-known type of electropneumatic valve EPV which when deenergized causes the application of the air brakes on the locomotive. One valve EPV of this type is illustrated in the Pat. No. 1,649,444 to C. S. Bushnell dated November 15, 1927. A speed governor is illustrated diagrammatically which is assumed to close a set of contacts GVR when the train is operating at a slow or restrictive speed, and is assumed to close another set of contacts GVM when the train is operating at a medium speed. One type of speed governor which may be used, is illustrated in detail in the Patent No. 2,457,748 to H. B. Taylor, dated December 28, 1948.

The acknowledging contactor ACK is illustrated diagrammatically in FIG. 4G as controlling a plurality of contacts. The contactor ACK also has a timing device associated with it which controls its contact 190. If the acknowledging contactor ACK is continuously operated for a relatively long time interval as for example in excess of 15 seconds, then the timing device which is initiated into operation when the acknowledging contactor ACK is first operated causes the contact 190 to open. One type of acknowledging contactor which may be used is illustrated in detail in the Patent No. 1,725,729 to C. S. Bushnell, dated August 20, 1929.

The train stop equipment also comprises a number of relays, which are distinctively controlled in accordance with the variation of currents taking place in the receiver REC secondary winding S through the inductive effect of the wayside inductors. The normally energized relay R1 is the primary relay which is deenergized when the receiver is influenced by the wayside inductor. The normally energized relay R2 is a secondary relay which is controlled by the operation of relay R1. The relay R3 is provided to control the energy to the electropneumatic valve EPV and deenergizes this valve under certain conditions.

The whistle valve WV is provided for rendering an audible signal to the engineer during his act of acknowledgment caused by the operation of the acknowledging contactor ACK. The ballast lamps LL are provided for correcting the fluctuation in the voltage of the current source. The use of ballast lamps in the train stop apparatus are well-known in the art and it is considered unnecessary to describe their operation other than to say that they serve to limit the current through the relays R1, R2, and R3 to the proper amount during a possible voltage fluctuation.

A reset contactor RC permits the engineer to manually remove the brake application after he has complied with restrictions requiring either a reduction in speed or a stop.

The relay R2P is an inverse repeater of the relay R2, and the relay R3P is a repeater of the relay R3. The R3P relay retains the evidence that an automatic brake application has occurred and also controls certain aspects of the cab signal.

The relay ASTK is a normally energized stick relay which is released by the operation of the acknowledging contactor.

The proceed relay PR is energized in response to a proceed control received from the control office in the manner previously described. The picking up of the relay PR permits the passage of an engine by a zone marker location without receiving an automatic brake application provided the engineman has operated the acknowledging contactor. The relay PRP is a repeater of the relay PR.

The repeat contactor RPC is a manually operated push button which serves to cause the engine equipment to repeat its check-in transmission giving the train identification and present location. The repeat contactor enables the engineman to recheck the controls under which he is operating. The receipt of this repeat signal at the control office automatically results in a retransmission of the control as determined by the positions of the levers on the control panel for a particular train in the particular zone from which the repeat call was received.

The relay RESTK is provided for recording the evidence that the reset contactor RC has been operated. The relay RESTP is a repeater relay for RESTK which records the evidence that the train has passed a marker after the engineman operated the reset contactor RC.

The relay TSR is picked up when a take-siding control is received from the control office. The picking up of the TSR relay causes the cab signal indication TS to be displayed for advising the engineman that his train is to take-siding at the next marker. The relay TSRP is a take-siding repeater relay which causes an appropriate yellow or Y aspect to be displayed by the cab signal along with the display of the TS aspect.

The relay NZ is provided, which is deenergized when a train enters a stretch of track equipped with this embodiment of the invention. It serves to extinguish the aspect L of the cab signal and condition the other apparatus for the zone control system. It is energized when the train leaves territory equipped with zone control apparatus, and serves to illuminate aspect L of the cab signal.

It is believed that the detailed circuitry of the train stop apparatus for this embodiment of the zone control system will be best understood by describing it in connection with the movement of a train through a plurality of zones.

Assuming that an eastbound train is traveling in zone 12.2 and the control office has transmitted a proceed control thereby resulting in the picking up of the relay PR by the circuit previously described. In response to the picking up of the relay PR, the cab signal is caused to display the aspect G by a circuit which extends from (+) and includes back contact 191 of relay NZ, front contact 192 of relay R3P, front contact 194 of relay PR and the aspect G of the cab signal to (—). The relay PR is provided with a stick circuit for maintaining the relay PR picked up throughout the zone in which the control was received, which circuit extends from (+) and includes closed contact 155 of relay R2, wire 156, front contact 195 of relay ASTK, the closed contacts of the repeat contactor RPC, back contact 196 of relay NZ, front contact 197 of relay PR, and the winding of relay PR to (—). It is evident from the description of this stick circuit for relay PR that the operation of the repeat contactor RPC will cause the relay PR to drop away in response to a request for the repeating of a signal so that the relay PR will again become picked up if the repetition of the control signal so warrants it. It is also evident that if the NZ relay should fail to drop away upon the entrance of the locomotive into zone controlled territory, the relay PR will not remain energized. The display of the cab signal aspect G notifies the engineman to proceed.

When a locomotive enters any zone, for example, zone 14.2, bypassing the zone marker 14.2 the engineman is required to operate the acknowledging contactor ACK. The operation of the contactor ACK deenergives the relay ASTK by opening its stick circuit, which extends from (+) and includes contact 193 of the contactor ACK, contact 200 of relay R2 in its picked up position, wire 201, front contact 202 of relay ASTK and the upper winding of the relay ASTK to (—). The dropping away of the relay ASTK opens its front contact 195 in the previously described stick circuit for relay PR, thereby dropping relay PR, which serves to extinguish the aspect G of the cab signal and illuminates the cab signal aspect Y/Y by a circuit which extends from (+) and includes back contact 191 of relay NZ, front contact 192 of relay R3P, back contact 194 of relay PR, and the cab signal aspect Y/Y to (—). The display of the aspect Y/Y notifies the engineman that he is to proceed preparing to stop at the second zone marker which in this illustration is zone marker 20.2.

The dropping away of the relay ASTK also opens the stick circuit for the energized location relay LT by the opening of front contact 157 of relay ASTK. The stick circuit for the LT relays was previously described in connection with the example given prior hereto in connection with the description of the train carried control receiving apparatus. Thus at this point it is apparent that the engine can receive no further controls from the control office unless he properly checks-in the zone 14.2 in a manner described previously in connection with the description of the check-in and check-out apparatus. Assuming that the engine passes the marker 14.2 with the acknowledging contactor in the operated position, the wayside inductor causes the release of the relay R1 followed by the release or dropping away of relay R2. The releasing of relay R1 opens the energizing circuit for relay R2 at contact 477 of relay R1.

It is assumed that the engineman properly operated the acknowledging contactor, therefore the relay R3 will remain energized by a circuit which extends from (+) and includes the coils of the whistle valve WV closed, contact 203 of the acknowledging contactor, wire 235, front contact 204 of relay PRP, wire 205, closed contact 206 of relay R3, the winding of relay R3, the ballast lamps LL and the primary winding P to (—). It should be noted at this point that the picking up of the relay PRP occurred in response to the picking up of the relay PR by a circuit which extends from (+) and includes front contact 207 of relay PR and the winding of relay PRP to (—). The operation of the acknowledging contactor ACK provided a stick circuit for the relay PRP which extends from (+) and includes contact 208 of the contact ACK, wire 210, front contact 211 of relay PRP and the winding of relay PRP to (—). Thus at this point it is apparent that if the relay PR had not been energized to pick up the relay PRP, the relay R3 would have dropped away in response to the deenergizing of relay R2. Also, it is apparent that if the acknowledging contactor ACK had not been operated, the contact 203 of ACK would cause the relay R3 to be released. Thus, it is necessary for the engineman to properly operate the acknowledging contactor ACK and the locomotive must have received a proceed control from the control office as evidenced by the picked up condition of relay PRP for the relay R3 to remain energized.

The normal energizing circuit for relay R3 extends from (+) and includes closed contact 212 of relay R2, closed contact 206 of relay R3, the winding of relay R3, the ballast lamps LL and the primary winding P to (—). So that the position of the relay R3 is dependent upon the previously described energizing circuit which includes the contact 203 of the contactor ACK and the contact 204 of the relay PRP after the relay R2 has opened the last described energizing circuit at contact 212.

At this point it should be noted that the relay R3P is normally energized when the relay R3 is energized by a stick circuit which extends from (+) and includes contact 212 of relay R2, contact 206 of relay R3, contact 213 of relay R3, wire 214, front contact 215 of relay R3P, back contact 216 of relay NZ and the winding of relay R3P to (—). Upon the releasing of relay R2 with the acknowledging contactor ACP operated, the relay R2P is energized by a circuit which extends from (+) and includes the closed contacts 217 of ACK, closed contact 218 of relay R2, wire 220, front contact 221 of relay R3P and the winding of relay R2P to (—). The picking up of relay R2P in response to the dropping away of relay R2 energizes relay ASTK by a circuit which extends from (+) and includes front contact 478 of relay R2P and the lower winding of relay ASTK to (—). Also, immediately after the dropping away of relays R1 and R2, relays R1 and R2 are respectively reenergized in the event that relay R3 is maintained energized. The energizing of relay R1 closes contact 477 of its relay, thereby picking up relay R2 to restore the circuit to normal. It should be noted at this point that if the acknowledging contactor is held operated, a sufficient length of time to result in the dropping away of the time delay contact 190, the valve EPV will be deprived of current and automatic brake application will result. It is well-known that this feature prevents the operator from continually keeping the contactor ACK in an operated position.

When the operator releases the acknowledging contactor the relay R2P is dropped away and the relay PRP is dropped away. Assuming that the train continues to travel in zone 14.2 without receiving a proceed control from the control office the relay PR will remain dropped away throughout the zone.

When a locomotive passes the wayside marker 18.2 and the engineman properly operates the acknowledging contactor ACK, the relay ASTK will drop away by the opening of contact 198 of ACK in its previously described stick circuit. The relays R1 and R2 then operate in a manner similar to that previously described; however in response to the dropping away of relay R2 with the relay PRP deenergized, the relay R3 drops away thereby opening the energizing circuit for relay R3P at contact 213 of relay R3. In response to the dropping away of the relay R3 the electropneumatic valve EPV is deprived of energy by the opening of contact 206 of relay R3 in the EPV energizing circuit thereby causing an automatic brake application. In response to the dropping away of relay R3P the cab signal is caused to display a Y aspect by a circuit which extends from (+) and includes back contact 191 of relay NZ, back contact 192 of relay R3P, front contact 223 of relay RESTP, and the element Y of the cab signal to (—). The display of the Y aspect in the cab signal informs the engineer that he shall proceed preparing to stop at the next marker (which in this illustration is marker 22). If the train speed is above medium speed it shall at once be reduced to that value.

When the engineman has slowed the train to a medium speed he can then operate the reset contactor RC. The operation of the reset contactor RC opens the stick circuit for the relay RESTK which causes the relay RESTK to drop away when contact 233 of relay R3P is opened. The stick circuit for relay RESTK extends from (+) and includes contact 224 of the contactor RC, wire 225, front contact 226 of relay RESTK and the winding of relay RESTK to (—). The dropping away of the relay RESTK opens one of the energizing circuits of relay RESTP at the contact 227 of relay RESTK. The relay RESTP is now held in a picked up position by a stick circuit which extends from (+) and includes front contact 228 of relay ASTK, front contact 230 of relay RESTP, back contact 231 of relay NZ, and the winding of relay RESTP to (—).

It should be noted that in order to maintain the relay RESTP energized for causing the cab signal to display a continued Y aspect, the relay ASTK must be picked up by the closing of contact 478 of relay R2P prior to the dropping away of the relay RESTK. This situation would also reveal that the relays R1 and R2 did not operate in the proper sequence or that the acknowledging contactor had not been operated thereby preventing the train from continuing to travel at a medium speed. Therefore it should be noted that the proper operation of the train stop equipment is checked at each wayside marker before the train is permitted to proceed on any signal less restrictive than a red signal, and an automatic brake application will occur in the event of the improper operation of the train stop apparatus or the failure of the engineman to operate the acknowledging contactor ACK. It also prevents the reset contactor from resetting the electropneumatic valve EPV to allow the train to proceed at medium speed.

The operation of the reset contactor RC energizes the relays R3 and R1 by a circuit which extends from (+) and includes the medium speed governor GVM, back contact 232 of RC, the winding of relay R3, the ballast lamps LL, and the primary winding P of the inductor REC to (—). The relay R1 is energized by a circuit which extends from (+) and includes the medium speed governor GVM, back contact 232 of the reset contactor RC, back contact 234 of the reset contactor RC, the winding of relay R1, the ballast lamps LL, and the primary winding P of the inductor REC to (—). The relay R2 is energized in response to the picking up of relay R1 as previously described.

When the reset contactor RC has been released and the relays R3 and R2 are picked up, the normal energizing circuit for the electropneumatic valve EPV is closed, thereby allowing the train to proceed without receiving an automatic brake application.

To summarize the condition of the cab signals and the train stop equipment when the train is in zone 18.2 approaching the zone marker 20.2, the relays PR and PRP are dropped away, the relay R3P and the reset stick relays RESTK are dropped away, the relay RESTP is picked up, and the cab signal is displaying a Y aspect, which means stop at the next marker which marker in this illustration is 20.2. Since marker 20.2 is a permissive marker, the engine may proceed at restricted speed after stopping.

When the locomotive passes the wayside marker for the entrance to zone 20.2, the engineman operates the acknowledging contactor ACK, thereby causing the relay ASTK to be dropped away. The dropping away of relay ASTK opens its front contact 228 in the energizing circuit for relay RESTP, thereby causing contact 223 of relay RESTP to move from front to back resulting in the illumination of the aspect R of the cab signal which aspect means stop and proceed at restricted speed.

When the train passes the wayside train stop inductor located near the marker 20.2 at the entrance to zone 20.2, the relays R1 and R2 are dropped away. The relay P2P is energized in the manner previously described, and the picking up of the relay R2P energizes the relay ASTK. If the engineman had properly operated the acknowledging contactor when entering zone 20.2 and had reduced his speed to a restricted speed the relay R3 will remain energized. The circuit for maintaining the relay R3 energized and also prevents the valve EPV from becoming deenergized extends from (+) and includes the coils of whistle valve WV, closed contact 203 of ACK, wire 235, back contact 204 of relay PRP, back contact 236 of relay RESTP, wire 237, the closed contact of the restricted speed governor GVR, contact 206 of relay R3, front contact 232 of the reset contactor RC, closed contact 238 of ACK, time delay contact 190 of ACK and the coils of the electropneumatic valve EPV. Relays R1 and R2 will immediately pick up again after passing the train stop inductor in a manner previously described because relay R3 did not drop away.

In the event that the engineman failed to properly operate the acknowledging contactor ACK or had failed to reduce the speed of the locomotive to a restricted speed the relay R3 would have been dropped away in the manner previously described and energy would have been removed from the electropneumatic valve EPV thereby resulting in an automatic brake application.

To summarize, the condition of the train stop apparatus and the cab signaling equipment with the train in zone 20.2 is such, that the relay RESTP is deenergized, the cab signal is displaying the aspect R, and the train is either stopped or traveling at a restricted speed, as determined by the contacts of the speed governor GVR.

Assuming that traffic conditions change which allows the control office to transmit a proceed control to the train while in zone 20.2 the relay PR is energized by its previously described energizing circuit. The relay PRP is energized in response to the relay PR. The relay R3P is energized in response to the picking up of the relay PR, and the cab signal is caused to display the aspect G, or green, in response to the picking up of PR and R3P. The relay RESTK is energized in response to the picking up of the relay R3P and the relay RESTP is energized in response to the picking up of the relay RESTK. Therefore, with the cab signaling apparatus and the train stop equipment in the aforesaid condition, as caused by the reception of a proceed control from the control office, the train is allowed to proceed. It may pass the absolute marker 22.2 without receiving an automatic brake application provided that the acknowledging contactor ACK is properly operated when the locomotive reaches zone marker 22.2. The condition of the train stop equipment and cab signaling apparatus at this point is similar to the condition which existed when the train was in zone 12.2 at the inception of this description of operation. It can be seen that a train is always approaching a wayside location at which it will receive an automatic brake application unless a proper proceed control message has been received at the control office, the engineman properly acknowledges while passing the location marker, and the train stop equipment functions properly as required to initiate an automatic brake application when passing the location.

When the transceiver on a locomotive passes the leaving marker ENZ or WNZ as the case may be, indicating that the train is leaving zone controlled territory, the relay ENZ–LT, for example, in the case of an eastbound train is energized by the activation of tuned amplifiers A and F which complete its energizing circuit through the front contacts of relays AP and FP (see FIGS. 4A and 4B). In response to the picking up of the relay ENZ–LT, the tone generator 24 is associated with the check-in transmitter on the locomotive is activated and simultaneously the relay NZ in the train stop equipment is energized by a circuit which extends from (+) and includes the back contacts of the various LT relays, front contact 401 of relay ENZ–LT, wire 402, closed contact 403 of relay R3, wire 404, and the winding of relay NZ to (−). If the relay R3 were deenergized when the locomotive passed the wayside train stop inductor associated with the marker ENZ, the relay NZ would not be picked up until the engineman had properly reset the train stop apparatus as previously described. In response to the picking up of the relay NZ, the lunar white aspect of the cab signal is illuminated by a circuit which extends from (+) and includes front contact 405 of relay NZ and the aspect L of the cab signal to (−). The relay NZ is held in its energized position by a stick circuit which extends from (+) and includes front contact 406 of relay ASTK, front contact 407 of relay NZ and the winding of relay NZ to (−). Back contacts of the NZ relay are included in the energizing circuits for the PR relay, TSR relay, and RESTP relay, thereby preventing the improper operation of the train stop and cab signaling apparatus while the train is not in zone controlled territory.

The foregoing description describes in detail separate representative portions of the apparatus and its circuitry. For a further and complete understanding of this embodiment of the invention the complete broad operation of the control office apparatus, the train carried apparatus and the cooperation of the various elements hereinbefore described without describing the detailed circuitry will be considered in connection with the description of the operation of a particular train as it proceeds through the zone control territory.

Prior to the entrance of a train into a stretch of track equipped for zone control, the train is identified by permanently locking in its apparatus a particular train identification. This train identification remains during the entire time that a train is moving through a stretch of track equipped with this embodiment of the invention. Let us assume that the train is travelling in an easterly direction and is to be identified as train No. 1. The train identification selector illustrated in FIGS. 4B, 4E, and 5C is actuated so that each of the contacts for permanently connecting a distinctive tone generator referred to as tone 102 are closed, thereby permanently conditioning tone generator 102 for this specific train. The first marker which the train is about to pass is zone marker 10.2. Prior to passing this marker, the cab signal in the locomotive displays the lunar white aspect L. When the train approaches marker 10.2, the engineman operates the acknowledging contactor and the locomotive first passes the inert wayside train stop inductor. In response to the act of acknowledgment the lunar white aspect L of the cab signal is extinguished and the cooperation of the train stop apparatus with the inert wayside inductor results in an automatic brake application unless the engineman forestalls such an application by slowing down to a restricted speed. The cab signal displays a red aspect R at this time.

The train then passes over the tuned wayside coils associated with zone marker 10.2 and referring to FIG. 8, the chart shows that these particular tuned wayside coils are so constructed as to cause the locomotive transceiver to be influenced by the combination of frequencies designated E and G. The transceiver on the locomotive is so activated in response to its cooperation with the tuned wayside coils that the check-in transmitter which is capable of transmitting a distinctive carrier frequency F1, is modulated by a particular frequency for identifying the train and a particular frequency for identifying the location.

The control office check-in receiver capable of receiving a carrier frequency F1 (see FIG. 3A) receives the modulated carrier frequency transmitted from the locomotive and causes the activation of the distinctive identification tone generator and a distinctive field location tone generator which deenergizes a relay 10.2 TRX (see FIG. 3C). In response to the dropping away of the relay 10.2 TRX that portion of the zone diagram is illuminated with a red aspect showing the operator that a train has checked into zone 10.2. The information that train No. 1 has checked into and is occupying zone 10.2 is stored in the check-in and check-out circuits during the entire time that any portion of this train occupies zone 10.2.

Assuming that the operator wishes to route train No. 1 into the siding zone 12.2–S, he operates the signal lever 12SL, thereby illuminating zone 12.2–S on the diagram with a yellow aspect. The control office transmitter which is capable of transmitting a carrier frequency F3 is modulated by tone 102 for train identification and tone 4 (see FIG. 8) for the particular zone location which particular modulation was selected when the identification train checked into zone 10.2. The engine control receiver receives carrier frequency F3 modulated by tone 102 and tone No. 4 (see FIG. 8). The locomotive carrying this identification is determined by the position of its identification selector; and the locomotive having the check-in location 10.2 stored in the circuitry responsive to the transceiver check-in apparatus causes the take-siding control to be stored in the locomotive control equipment by picking up the take-siding relay TSR, and further causing the cab signal to display the aspect TS. The zone diagram in the control office for zone 12.2–S displays a yellow aspect.

When the switch has been properly positioned to route train No. 1 on to the siding 12.2–S, the train proceeds to the siding and its locomotive passes the train stop inductor associated with the marker 12.2–S. The engineman acknowledges, which extinguishes the cab signal aspect TS and causes an automatic brake application if the train is not traveling at a restricted speed. The locomotive transceiver then passes the tuned wayside coils having a frequency combination B and G (see FIG. 8), thereby effecting a check-in transmission of this information to the control office. The control office apparatus stores the train identification and location, and the zone diagram 12.2–S is illuminated with a red aspect.

When the transceiver located on the rear end of the train No. 1 passes the tuned wayside coils associated with zone marker 12.2–S, the check-out transmitter transmits the identification and location to the control office by modulating a carrier frequency F2 by the location tone 8 and the identification tone 102. The check-out receiver in the control office picks up this modulated frequency which actuates distinctive tuned amplifiers for picking up a check-out relay for zone 10.2, thereby restoring the relay 10.2 TRX. The picking up of the 10.2 TRX extinguishes the illuminated red aspect in the zone diagram and restores the circuitry for transmitting a train control in zone 10.2 for train No. 1, thereby preventing an improper control to be transmitted to this train.

Because the zone marker 14.2–S is an absolute marker the train No. 1 cannot proceed until it receives a proceed signal from the control office. Assuming that the operator now wishes train No. 1 to leave the siding 12.2–S, he operates the lever 14 SL to its intermediate right-hand position, thereby activating the train control transmitter and causing it to transmit a carrier frequency modulated by a proceed control tone, a location tone No. 8 (see FIG. 8) and the train identification tone which is picked up by the train No. 1 in zone 12.2–S. Simultaneously, the zone diagram in the control office for zone 14.2 is illuminated with a green aspect showing that train No. 1 has authority to proceed through zone 14.2; and zone 18.2 is illuminated with a yellow aspect showing that train No. 1 must stop before entering zone 20.2.

In response to the reception of the proceed tone by train No. 1 in zone 12.2–S its cab signal is caused to display a green aspect G and the train stop apparatus is conditioned for a proceed control. The red aspect is extinguished simultaneously with the display of the green aspect.

Train No. 1 is now moving easterly in zone 12.2–S with a green aspect G in the signal and its proceed relay PR picked up. When the locomotive passes the train stop inductor associated with marker 14.2–S the engineman operates the acknowledging contact thereby dropping away the relay PR, extinguishing the green aspect of the cab signal, and causing the cab signal to display the aspect Y/Y. The display of this aspect Y/Y informs the engineman that he is to stop at the second marker, or in this example, marker 20.2. The locomotive then passes the tuned wayside coils which causes its check-in transmitter to send its identification and location to the control office, in a manner previously described, thereby causing the zone 14.2 to be illuminated red, and conditioning the control office circuitry for storing this check-in information. With the train identification and location information stored in the cintrol office circuitry, the operation of the signal lever 18.2 SL to its extreme right-hand position causes the control office transmitter to be modulated by the proper identification and location tones in accordance with the check-in information so that the engine control receiver will be activated in such a manner as to pick up the relay PR in the train stop apparatus, thereby changing the cab signal aspect to G. When the transceiver located on the rear end of train No. 1 passes the tuned wayside coils associated with 14.2–S, the zone diagram for 12.2–S shows no illumination and the zone diagram for zone 14.2 continues to be illuminated with red showing train occupancy for zone 14.2. In response to the operation of the signal lever the panel diagram for zone 18.2 is illuminated with a green aspect and zone 20.2 is illuminated with a yellow aspect.

When train No. 1 passes the train stop inductor associated with zone 18.2 the cab signal aspect changes from G to Y/Y in response to the operation of the acknowledging contactor ACK, and the relay PR is dropped away in the train stop apparatus. The zone diagram 18.2 changes its aspect from green to red and the zone diagram 20.2 remains yellow. In the embodiment shown, the control office operator is unable to send a proceed message to a train in zone 18.2 because the marker 22.2 is an absolute marker beyond which no train can pass without receiving authority. If the operator were able to transmit a proceed message to a train in zone 18.2 the train carried equipment would be conditioned so that the engineman would have authority to pass zone marker 22.2 without receiving a new proceed control while the train is in zone 20.2. The transceiver on the rear end of train No. 1 causes a check-out message to be transmitted to the control office when it passes the tuned wayside coils associated with marker 18.2 thereby extinguishing the red illumination of the zone diagram for zone 14.2.

The entrance of train No. 1 into zone 20.2 causes the cab signal to change to a Y aspect thereby informing the engineman that he must be prepared to stop at the next zone marker, which is 22.2 in this example. The train stop apparatus in response to the wayside train stop inductor causes an automatic brake application which the engineman can forestall if he has properly operated the acknowledging contactor by operating the reset contactor and reducing the speed of the train to a medium speed. The reception of the check-in message at the control office changes the zone diagram for 20.2 from yellow to red. When the rear end of the train passes zone marker 20.2 the zone diagram for 18.2 illuminated in red is extinguished. When traffic conditions permit, the operator can transmit a proceed message to train No. 1 in zone 20.2 by operating the 22 SL signal lever to its extreme right-hand position thereby causing a proceed signal to be transmitted to this particular train in this particular zone. The reception of the proceed signal by the proper train in the proper zone causes its proceed relay PR to be picked up, thereby conditioning the train stop apparatus so that the train can pass zone marker 22.2 at speed without receiving an automatic brake application. Simultaneously the reception of the proceed signal causes the cab signal of the train to be illuminated with the green aspect G. When train No. 1 enters zone 22.2 the cab signal changes its aspect from G to Y/Y, and the control office apparatus is conditioned in a similar manner as that previously described. Assuming that train No. 1 is leaving zone control the entrance of the locomotive into wayside signal territory causes the cab signal in the locomotive to be illuminated with the aspect L or lunar white in response to the picking up of the relay NZ in the train stop apparatus. The picking up of the relay NZ is caused by the particular combination of tone frequencies detected by the transceiver when the locomotive passes the tuned wayside coils associated with the leaving zone marker.

Having described a centralized zone controlling system as one specific embodiment of the present invention, it is desired to be understood that this form is selected to facilitate in the disclosure of the invention rather than to limit the number of forms which the invention may assume, and it is further understood that various adaptations, alterations, and modifications may be applied to the specific form shown to meet the requirements of practice, without in any manner departing from the spirit or scope of the present invention, except as limited by the appended claims.

What I claim is:

1. A centralized traffic control system for controlling from a central control office the operation of railway trains over a continuous stretch of railway track allotted geographically into successive distinct zones, inert check-in wayside inductive coils positioned adjacent the entrance to each of the zones, inert wayside inductive check-out coils positioned adjacent the exit end of each zone, an inert wayside train stop inductor positioned adjacent the entrance to each of the zones, train carried check-in detecting and transmitting means effective to be inductively influenced upon the movement of the train past each of said check-in coils and in response to said inductive influence effective to transmit a distinct zone location check-in signal to the control office, train carried check-out detecting and transmitting means effective to be inductively influenced upon the movement of the train past each of said check-out coils and in response to said inductive influence effective to transmit a distinct zone location check-out signal to the control office, train carried zone location storage means effective to store a distinct zone location by the inductively influenced train carried detecting means by a respective check-in wayside coil, control office location storage means effective to store a distinct zone location upon the reception of a zone location check-in signal, control office means effective to remove the storage of a distinct zone location upon the reception of a check-out signal, a control office signal clearing means, control office transmitting means effective upon the operation of the signal clearing means to send a control signal characteristic of the zone location stored in the control office storage means, train carried receiving means effective to receive said control signal, train stop means effective to apply the brakes of a train automatically upon the movement of the train past each of said wayside train stop inductors, and train carried circuit means controlled by the train carried storage means upon the reception of a distinctive signal by the train carried receiving means to render the train stop means ineffective to apply the brakes of the train.

2. A centralized traffic control system for controlling from a central control office a railway train over a continuous stretch of railway track geographically allotted to successive zone, said system comprising inert check-in wayside inductive means positioned adjacent the entrance to each zone, inert wayside check-out coils located near each zone marker, an inert wayside train stop inductive means adjacent the entrance to each zone, train carried check-in detecting and transmitting means effective to send a distinct check-in signal to the control office upon being inductively influenced by each wayside check-in inductive means, train carried check-out detecting and transmitting means effective to send a distinct check-out signal to the control office upon being inductively influenced by each check-out inductive means, control office check-in receiving means effective to receive a distinct zone location check-in signal transmitted by the check-in transmitting means, control office check-out means effective to receive a distinct check-out zone location signal transmitted by said check-out transmitting means on the train, control office transmitting means effective when activated to send a control signal, activating means operable at times to activate said control office transmitting means, a first circuit means controlled by both said check-in and check-out receiving means effective to render the control office transmitting means active to transmit a proceed signal to a distinct zone location upon the operation of said activating means, interlocking means at the control office controlled by said check-in and check-out receiving means effective to render the control office transmitting means ineffective to transmit a proceed signal when traffic conditions along said stretch of railway track are unsafe, train carried control signal receiving means, train stop means effective to apply the brakes of the train automatically upon being inductively influenced by each train stop inductive means, and means controlled by the train carried receiving means effective to render the train stop means ineffective to apply the brakes of the train.

3. A centralized traffic control system for controlling the operation of railway trains over a continuous stretch of railway track having siding connected thereto, said track being geographically allotted to successive distinct zones, inert wayside check-in coils located at the entrance of each zone, inert wayside check-out coils located at the exit end to each zone, an inert wayside train stop inductor located near the entrance to each zone, train carried check-in detecting and transmitting means effective to send a check-in signal characteristic of a distinct zone to the control office upon being inductively influenced by each wayside check-in coil, train carried check-out detecting and transmitting means effective to send a check-out signal characteristic of a distinct zone to the control office upon being inductively influenced by each check-out coil, a control office transmitting means effective when activated to send selectively a proceed and take siding control signal, selection means in the control office associated with each zone operable at times to cause the control office transmission means to send one of the said proceed and take siding signals, control office check-in receiving means operative to receive a distinct zone location check-in signal, control office check-out receiving means operative to receive a distinct check-out zone location signal, interlocking means at the control office connected electrically to the check-in and check-out receiving means and the transmitting means effective to render the control office transmitting means ineffective to transmit a selected one of the proceed and take siding control signals to a train in a distinct zone, train carried control signal receiving means, a first circuit means carried by the train and controlled by the check-in detecting means connected electrically to the control signal receiving means to be activated by the reception of a proceed signal when the train is located in a distinct zone, a second train carried circuit means controlled by the check-in detecting means and connected electrically to the control signal receiving means to be activated by the reception of a take siding signal only when the train is located in a distinct zone, train stop means effective to apply the brakes of the train automatically upon being inductively influenced by each of the wayside train stop inductors, means connected to said first train carried circuit means to render the train stop apparatus ineffective to apply the brakes of the train upon the reception of a proceed signal only, and another means connected to said second circuit means effective to render the train stop apparatus ineffective to apply the brakes of the train upon the reception of a take siding signal when the train is travelling at a restricted speed.

4. A zone control system for controlling from a central control office railway trains over a continuous stretch of railway track geographically allotted to a plurality of successive zones by first, second and third wayside zone markers located at spaced intervals along said track, said system comprising a first, second and third wayside inductor associated with the respective zone markers, a proceed signal transmitting means at the control office for at times sending a proceed signal to a train, a signal control receiver on the train effective to receive said proceed signal, a relay means on the train activated in response to the reception of a proceed signal by said signal control receiving means, a cab signal on the train operable to display a proceed aspect and a proceed preparing to stop at the end of the zone after the next wayside marker aspect and a proceed preparing to stop at the next wayside marker aspect and a stop aspect, a train carried train stop means normally effective when activated by the inductive influence of each of said wayside inductors to automatically apply the brakes of the train, a manually operated acknowledging means, a first circuit means on the train responsive to the activation of said relay means for causing the cab signal to display a proceed aspect, a second circuit means on the train responsive to the activation of said relay means and the operation of the acknowledging means for rendering the train stop means ineffective to the inductive influence of the first wayside inductor, a third circuit means on the train responsive to the inductive influence of the first wayside inductor for causing the cab signal to display the aspect requiring the train to stop in the zone after the next zone marker, a fourth circuit means on the train controlled by the activation of the train stop means by the first wayside inductor and the operation of the acknowledging contactor at the second wayside inductor for rendering the receiver ineffective to the inductive influence of the second wayside inductor, a fifth circuit means for causing the cab signal to display the aspect requiring the train to prepare to stop at the next zone marker in response to the inductive influence of the second wayside inductor, a sixth circuit means on the train controlled by the activation of the train stop means by the second wayside inductor and the operation of the acknowledging means at the third wayside inductor effective to render the receiver ineffective in response to the third wayside inductor when the train is traveling at a restricted speed, and a seventh circuit means on the train responsive to the influence of the third wayside inductor for causing the cab signal to display a stop aspect.

5. A centralized traffic control system for railway trains comprising a continuous stretch of railway track geographically separated into a plurality of successive zones by first, second and third inert wayside inductors located at spaced intervals along said track, a central control office, signal clearing levers in the control office for each of said zones, a zone diagram panel in the control office having illuminable diagram corresponding to each of said zones, said diagram operatively to be selectively illuminated, train carried apparatus for detecting the checking in of a train in a distinct zone, storage circuit means on the train responsive to said detecting means for storing a distinct zone location that is occupied by a train, check-in transmitting means responsive to said check-in detecting means and said check-in storage means for sending a distinct zone location check-in signal to the control office in response to the passage of a train past each of said wayside inductive devices, train carried apparatus for detecting the checking out of a train from a distinct zone in response to the movement of the train past a respective wayside device, a check-out circuit means on the train responsive to said check-out detecting means for cancelling a particular zone location from said circuit storage means on the train, check-in receiving means at the control office activated in response to the reception of a distinct zone location check-in signal, control office circuit storage means responsive to said check-in receiving means for storing a distinct zone location signal, illuminating circuit means at the control office responsive to the storage circuit means for illuminating a respective portion of the zone diagram to indicate the occupancy of a zone by a train, a second illuminating circuit means at the control office responsive to the operation of a distinct signal clearing lever for illuminating a portion of the zone diagram to indicate a proceed control signal for a train in a respective zone, control office transmitting means activated in response to the operation of a signal clearing lever and governed by the control office check-in circuit storage means for sending a proceed control signal to a train in a distinct zone location, train carried signal control receiving means, a proceed relay means on the train, signal control circuit means on the train governed by said train carried location storage circuit means and responsive to the activation of said signal control receiving means for energizing said proceed relay, train stop apparatus on the train normally effective to apply the brakes of the train in response to each of said wayside devices, a manually operable acknowledging means, said train stop apparatus having a first circuit means responsive to the operation of the acknowledging means and the energized proceed relay for rendering the train stop apparatus ineffective to apply the brakes of the train in response to the first wayside inductor and having a second circuit means conditioned by the activation of the train stop apparatus by the first wayside inductor and the operation of the acknowledging means at the second wayside inductor for rendering the train stop apparatus ineffective to apply the brakes of the train in response to the influence of the second wayside inductor, and having third circuit means conditioned by the activation of the train stop apparatus by the second wayside inductor and the operation of the acknowledging means at the third wayside inductor for rendering the train stop apparatus ineffective to apply the brakes of the train in response to the influence of the third wayside inductor only when the train is traveling at a predetermined restricted speed.

6. A centralized traffic control system for controlling from a central control office railway trains over a continuous stretch of railway track allotted geographically to successively distinct zones, said system comprising wayside devices located at opposite ends of each zone, train carried zone location storage means operative upon the passage of the train past each of said wayside devices to store a distinct zone location in said storage means, train carried transmitting means effective to transmit a zone location signal characteristic of the occupied zone location of the train as stored in said train carried storage means, control office zone location receiving means effective to receive a distinct signal characteristic of the distinct zone location of the train transmitted by the train carried transmitting means, control office storage means effective to store the distinct zone location information as received by said control office receiving means, control office transmitting means controlled by the control office storage means to send a control signal for governing the train to proceed, said control signal being characteristic of a distinct zone location, and train carried receiving means controlled by the train carried zone location storage means effective to operatively receive the control signal only when the zone location in the train carried storage means corresponds to the distinct characteristic of the control signal.

7. A system for controlling the operation of railway trains from a central office over a stretch of track that is divided into a plurality of successive distinct zones, comprising means partly on the wayside and partly on each train operative to send from each train a signal characteristic of a distinct zone location information to the central office, means at the central office for receiving said distinct location information signal, means responsive to the reception of said distinct zone location information signal by said receiving means to transmit a control signal to the train sending said distinct location information, means on the train for receiving the control signal, and means on the train effective to govern said train to stop in the absence of the effective reception of said control signal by said train.

8. A system for controlling railway traffic from a central office over a stretch of railway track that is divided into a plurality of successive distinct zones comprising first train carried means responsive to the movement of the train into each of said distinct zones effective to register on the train and transmit a first signal characteristic of the distinct zone location in which the train is entering, means at the central office for receiving the first signal, means at the central office responsive to the reception by the receiving means of said first signal from said train carried means effective to transmit at times a clearing control signal having a distinct zone location characteristic corresponding to said first signal, a second train carried means operative to receive effectively said transmitted clearing control signal only when the zone location registered on the train corresponds to the distinct zone location characteristics of said clearing signal, and means responsive to the reception of the clearing control signal by the second train carried means to govern the train to proceed through said distinct zone location.

9. A system according to claim 8 including a third means on the train effective to initiate an automatic brake application of the train upon its entrance into each distinct zone, and circuit means responsive to the effective reception of said clearing control signal by said second train carried means operative to prevent the application of the brakes by said initiating means to permit the train to travel into the next distinct zone location.

10. A system as claimed in claim 9 wherein said circuit means includes address removal means operative to remove said registered zone location upon the prevention of said automatic brake application by said initiating means.

11. A system as claimed in claim 10 wherein said brake initiating means includes an acknowledging means required to be operated to render said circuit means effective to prevent said brake application, and said address removal means is operated upon operation of said acknowledging means.

12. A control system for controlling railway traffic from a central office over a stretch of railway track that is divided into a plurality of successive distinct zones, comprising first train carried means responsive to the movement of the train into each of said distinct zones effective to register on the train and transmit a first signal characteristic of the distinct zone location in which the train is entering and the distinct identification of the train, means at the central office for receiving said first signal, means responsive to the reception of said receiving means of said first signal from said train carried means effective to transmit at times a clearing control signal having distinct zone location and train identification characteristics corresponding to said first signal, a second train carried means operative to receive effectively said transmitted clearing control signal only when the zone location registered on the train and the distinct train identification corresponds to the characteristics of said clearing control signal, and means responsive to the reception of the clearing control signal to govern the train to proceed through the distinct zone location.

13. A system for controlling from a central office the operation of a plurality of trains over a stretch of track that is divided into a plurality of successive distinct zones, check-in means partly on the wayside and partly on each train effective to register on each train the distinct zone in which the train is entering, transmitting means on each train responsive to the registering of a zone location on the train effective to transmit a signal characteristic of that zone location, receiving means at the central office effective to receive a transmitted signal characteristic of each zone location, occupancy detection means at the central office responsive to said receiving means effective to register at the central office each occupied zone location, transmitting means at the central office effective when operated to transmit a clearing control characteristic of a particular zone location when the particular zone location is registered by said occupancy detection means, interlocking circuit means at the central office governed by said occupancy detection means effective to operate said central office transmitting means to transmit a clearing control for a particular zone location only when a predetermined number of zone locations in advance of the particular zone location are unoccupied, and receiving means on each train operative to receive effectively the transmitted clearing control only when the zone location corresponding to the characteristic of the clearing control signal is registered on the train.

14. A system for controlling from a central office the operation of railway trains over a stretch of track divided into successive distinct zones, comprising means partly on the wayside and partly on the train operative to store on the train a distinct zone location and transmit a signal characteristic of said distinct zone location when a train traveling over the stretch of track occupies a respective zone, means at the central office effective to receive each said distinct zone location signal, means responsive to the reception of said zone location signals effective to store in the central office the occupancy of each zone by a train while the train is occupying a respective zone, a signal clearing means at the central office, central office transmitting means governed by the occupancy storing means at the central office effective upon the operation of the signal clearing means to send a control signal characteristic of an occupied zone location stored in the central office, train carried receiving means for receiving said control signal, train stop means including cooperating means located at the wayside operative to apply the brakes of a train automatically upon the movement of the train into each successive zone location, train carried circuit means controlled by the storage of a distinct zone location on the train operative to cause the train carried receiving means to effectively receive a distinct control signal, and means governed by the effective reception of said control signal to render the train stop means ineffective to apply the brakes of the train.

15. A system for controlling the operation of railway trains from a central office over a stretch of track that is divided into a plurality of successive distinct zones, comprising means partly on the wayside and partly on each train operative to send information characteristic of a distinct zone location to the central office, means at the central office for receiving information characteristic of a distinct zone location, means responsive to the reception by said receiving means of said distinct zone location information to transmit a clearing control signal to the train sending said distinct location information, means on the train operative to receive the clearing control signal and means partly on the wayside and partly on each train effective to cancel a clearing control received by the train in the zone in which the train is located upon the entrance of the train into the succeeding zone.

16. A system for controlling from a central office railway trains traveling over a stretch of track that is divided into successive operating zones, a first means on each train for receiving and registering on the train while the train is in a preceding zone a control to proceed in the next successive zone, means partly on the wayside and partly on each train effective to govern the train to stop at the entrance to each zone, a second means on the train operatively connected to said train stop governing means effective when operated to render said stop means ineffective to govern said train to stop when said proceed control is registered on the train, and circuit means responsive to the operation of said second means upon the entrance of the train into the next successive zone effective to remove the proceed control registered on the train.

17. A system for controlling from a central office the operation of trains over a stretch of track that is divided into a plurality of distinct successive zones wherein means are provided on the wayside to determine the ends of each distinct zone, said system comprising communication means on each train responsive to its entrance into each zone effective to register on the train and transmit a signal characteristic of the distinct zone location the train is entering, receiving means at the central office responsive to said characteristic signals effective to register in the central office the occupancy of each of said zones contemporaneously while the trains are in each respective zone, a signal clearing means at the central office operable to designate selectively a proceed control for a train in a selected zone, transmitting means at the central office for at times sending a clearing control signal characteristic of a distinct zone location, interlocking circuit means governed by the registered occupancy by said central office receiving means effective to cause said central office transmitting means to send a proceed signal characteristic of a distinct zone location in response to the occupancy of the distinct zone location in the office by said central office receiving means when the signal clearing means for said registered zone location is operated and a predetermined number of zones in advance of said distinct zone location are unoccupied, receiving means on each train governed by the distinct zone location registered on each train by said communication means operative to effectively receive said clearing signal, train governing means partly on the wayside and partly on each train normally operative to govern said train to stop at the end of each distinct zone, means on each train effective when operated to render its train governing means ineffective to govern the train to stop when said clearing signal is effectively received by the receiving means, and circuit means effective to cancel the registered zone location on the train upon the operation of said last named means.

18. A system according to claim 17 further provided with means on each train effective to cancel the clearing signal on the train upon the operation of said means for rendering the train governing means ineffective to govern the train to stop.

19. A system according to claim 17 wherein each train is provided with receiving means effective to detect the transmission of a zone location signal by every other train, and circuit means on each train effective to prevent the transmission of its zone location when such transmission is detected by its receiving means.

20. A system for controlling a railway train from a central office over a stretch of track that is divided into a plurality of successive distinct zones, said system comprising communication means at the central office and on the train effective to communicate the zone location of the train to the central office, means at the central office responsive to the reception of the zone location information for sending a clearing signal to the train in a distinct zone location when a predetermined number of zones in advance of the distinct zone location are unoccupied, means on the train operative to effectively receive and register said clearing signal on the train when the train is in said distinct zone, train stop means partly on the train and partly on the wayside for initiating the automatic application of the brakes of the train at the end of each zone, a first circuit means including a plurality of relays operated in a predetermined sequence upon the operation of said train stop initiating means to cause the application of the brakes, acknowledging means effective when the clearing signal is registered on the train to render the train stop means ineffective to apply the brakes of the train, and a second circuit means including said first circuit means effective to render the train stop apparatus ineffective to stop the train upon operation of said acknowledging means only when said plurality of relays is operated in said predetermined sequence, whereby the train stop apparatus is checked to determine its proper operation even though it is rendered ineffective by the signal clearing means and the acknowledging means.

21. A system for controlling a railway train from a central office over a stretch of track that is divided into a plurality of successive distinct zones, said system comprising communication means at the central office and on the train effective to communicate the zone location of the train to the central office, means at the central office responsive to the reception of the zone location information for sending a clearing signal to the train in a distinct zone location when a predetermined number of zones in advance of the distinct zone location are unoccupied, means on the train operative to effectively receive and register said clearing signal on the train when the train is in said distinct zone, train stop means partly on the train and partly on the wayside for initiating the automatic application of the brakes of the train at the end of each zone, operable means including said train stop apparatus effective when operated to render the train stop means ineffective to stop the train when the clearing signal is registered on the train upon the trains entering a first of said zones, first circuit means governed by the operation of said operable means at the entrance to said first zone effective to render the train stop apparatus ineffective to stop the train upon operation of said operable means when the train enters the second zone and a clearing signal is not registered on the train, means on the train governed by said first circuit means operative to govern the train to more restrictive speed than in said first zone, a second circuit means governed by the operation of said first circuit means and the operation of said operable means when a clearing control is not registered on the train effective to govern the train to stop if the train is traveling above a predetermined speed when it enters the third zone, means operative upon the reception of a clearing signal to cause said first and second circuit means to be rendered ineffective, whereby a plurality of zones in which the train can enter with successive restrictive indications is governed by the reception of said clearing signal.

22. A zone control system for controlling from a central control office a railway train over a continuous stretch of railway track geographically allotted to a plurality of successive zones, said system comprising first, second and third wayside inductors located at spaced intervals along said track, a proceed signal transmitting means at the control office for at times sending a proceed signal to a train to permit the train to travel into the next zone, a control signal receiver on the train for receiving said proceed signal, proceed relay means on the train operated in response to the reception of a proceed signal by said signal control receiving means, a train stop means on the train normally effective when activated upon its passage of each of said wayside inductors to initiate the automatic application of the brakes of the train, acknowledging means, reset means, a first circuit means on the train responsive to the operation of the acknowledging means and the operated position of the proceed relay means effective to render the train stop means ineffective to stop said train when passing the first wayside inductor, a second circuit means on the train responsive to the operation of the acknowledging means and the operation of the reset means when the proceed relay is unoperated to render the train stop means ineffective to stop said train upon passing the next wayside inductor and to govern the train more restricted than after passing said first wayside inductor, and a third circuit means on the train responsive to the operation of the acknowledging means for rendering the train stop means ineffective to apply the brakes of said train only when traveling at a predetermined restricted speed past the next wayside inductor.

23. A centralized traffic control system for controlling from a central control office railway trains over a continuous stretch of single track railway having a passing siding connected thereto, said railway track being geographically allotted to a plurality of successive control zones, wayside inductive devices located at the ends of each zone, train carried transmitting means effective to send a zone location signal to the control office upon the movement of a train past each of said wayside devices, control office receiving means effective to receive said zone location signals, storage means responsive to the reception of a zone location signal by the control office receiving means for storing the occupancy of the train while the train is occupying a distinct zone, control office transmitting means controlled by said storage means for sending selectively a distinct proceed and take-siding control signal to a train in a particular zone location under safe traffic conditions only, train carried receiving means effective to receive said distinctive controls, and circuit means responsive to the transmission of a proceed control effective to render the control office means ineffective to effectively communicate a take-siding control while the train is in the same zone in which the proceed control is received.

References Cited in the file of this patent

UNITED STATES PATENTS

| | | |
|---|---|---|
| 1,824,135 | Hailes | Sept. 22, 1931 |
| 2,201,116 | Smith | May 14, 1940 |
| 2,354,602 | McCann | July 25, 1944 |
| 2,458,361 | Field | July 4, 1949 |
| 2,509,632 | Field | May 30, 1950 |
| 2,510,066 | Busignies | June 6, 1950 |
| 2,535,162 | Rodgers | Dec. 26, 1950 |
| 2,543,869 | Rees | Mar. 6, 1951 |
| 2,559,390 | Blaisdell | July 3, 1951 |
| 2,588,930 | Kendall | Mar. 11, 1952 |
| 2,588,931 | Kendall | Mar. 11, 1952 |
| 2,620,435 | Vogt | Dec. 2, 1952 |
| 2,636,113 | Deloraine | Apr. 21, 1953 |
| 2,817,012 | Kendall | Dec. 17, 1957 |
| 2,916,613 | Albrighton | Dec. 8, 1959 |
| 2,975,273 | King et al. | Mar. 14, 1961 |